United States Patent [19]
Joao et al.

[11] Patent Number: 6,047,270
[45] Date of Patent: Apr. 4, 2000

[54] APPARATUS AND METHOD FOR PROVIDING ACCOUNT SECURITY

[76] Inventors: Raymond Anthony Joao, 122 Bellevue Pl., Yonkers, N.Y. 10703; Robert Richard Bock, 123 Cornwall Meadows, Patterson, N.Y. 12563

[*] Notice: This patent issued on a continued prosecution application filed under 37 CFR 1.53(d), and is subject to the twenty year patent term provisions of 35 U.S.C. 154(a)(2).

[21] Appl. No.: 08/918,284

[22] Filed: Aug. 25, 1997

Related U.S. Application Data

[63] Continuation-in-part of application No. 09/169,053, Oct. 9, 1998, which is a continuation of application No. 08/873,945, Jun. 12, 1997, Pat. No. 5,878,337, which is a continuation of application No. 08/694,199, Aug. 8, 1996, abandoned.

[51] Int. Cl.[7] ........................................ G06F 17/60
[52] U.S. Cl. ..................... 705/44; 825/3; 825/31; 825/33; 825/34
[58] Field of Search ................... 340/825.34; 379/88.12; 705/38, 39, 40, 44

[56] References Cited

U.S. PATENT DOCUMENTS

| | | |
|---|---|---|
| 3,723,655 | 3/1973 | Zucker et al. . |
| 3,938,090 | 2/1976 | Borison et al. . |
| 4,485,300 | 11/1984 | Peirce ..................................... 235/380 |
| 4,758,714 | 7/1988 | Carlson et al. . |
| 4,947,027 | 8/1990 | Golightly . |
| 5,173,594 | 12/1992 | McClure . |
| 5,177,342 | 1/1993 | Adams . |
| 5,243,645 | 9/1993 | Bissell et al. ........................... 379/211 |
| 5,335,278 | 8/1994 | Matchett et al. . |
| 5,345,595 | 9/1994 | Johnson et al. . |
| 5,357,563 | 10/1994 | Hamilton et al. . |
| 5,406,619 | 4/1995 | Akhteruzzaman et al. . |
| 5,444,616 | 8/1995 | Nair et al. . |
| 5,444,763 | 8/1995 | Lazaridis et al. . |
| 5,473,667 | 12/1995 | Neustein . |
| 5,479,510 | 12/1995 | Olsen et al. ............................... 380/24 |
| 5,485,510 | 1/1996 | Colbert . |
| 5,513,250 | 4/1996 | McAllister . |
| 5,526,407 | 6/1996 | Russell et al. . |
| 5,530,438 | 6/1996 | Bickham et al. . |
| 5,615,110 | 3/1997 | Wong ....................................... 705/38 |
| 5,631,947 | 5/1997 | Wittstein et al. . |
| 5,655,007 | 8/1997 | McAllister . |
| 5,661,285 | 8/1997 | Elrick et al. . |
| 5,699,528 | 12/1997 | Hogan . |
| 5,708,422 | 1/1998 | Blonder et al. .................... 340/825.34 |
| 5,878,337 | 3/1999 | Joao et al. . |
| 5,903,830 | 5/1999 | Joao et al. . |

*Primary Examiner*—James P. Trammell
*Assistant Examiner*—Yehdega Retta
*Attorney, Agent, or Firm*—Raymond A. Joao

[57] ABSTRACT

An apparatus and method for providing account security which includes a receiver for receiving one of a limitation and a restriction on usage of an electronic money account, wherein the one of a limitation and a restriction are received from an account holder, a memory device for storing the one of a limitation and a restriction, and a processor for processing a transaction on the electronic money account in conjunction with the one of a limitation and a restriction. The processor generates a first signal which contains information for one of approving and disapproving the transaction. An apparatus and method for providing account security which includes a receiver for receiving one of a limitation and a restriction on usage of a brokerage account, wherein the one of a limitation and a restriction are received from an account holder in real-time, a memory device for storing the one of a limitation and a restriction, and a processor for processing a transaction on the brokerage account in conjunction with the one of a limitation and a restriction. The processor generates a first signal which contains information for one of approving and disapproving the transaction.

86 Claims, 32 Drawing Sheets

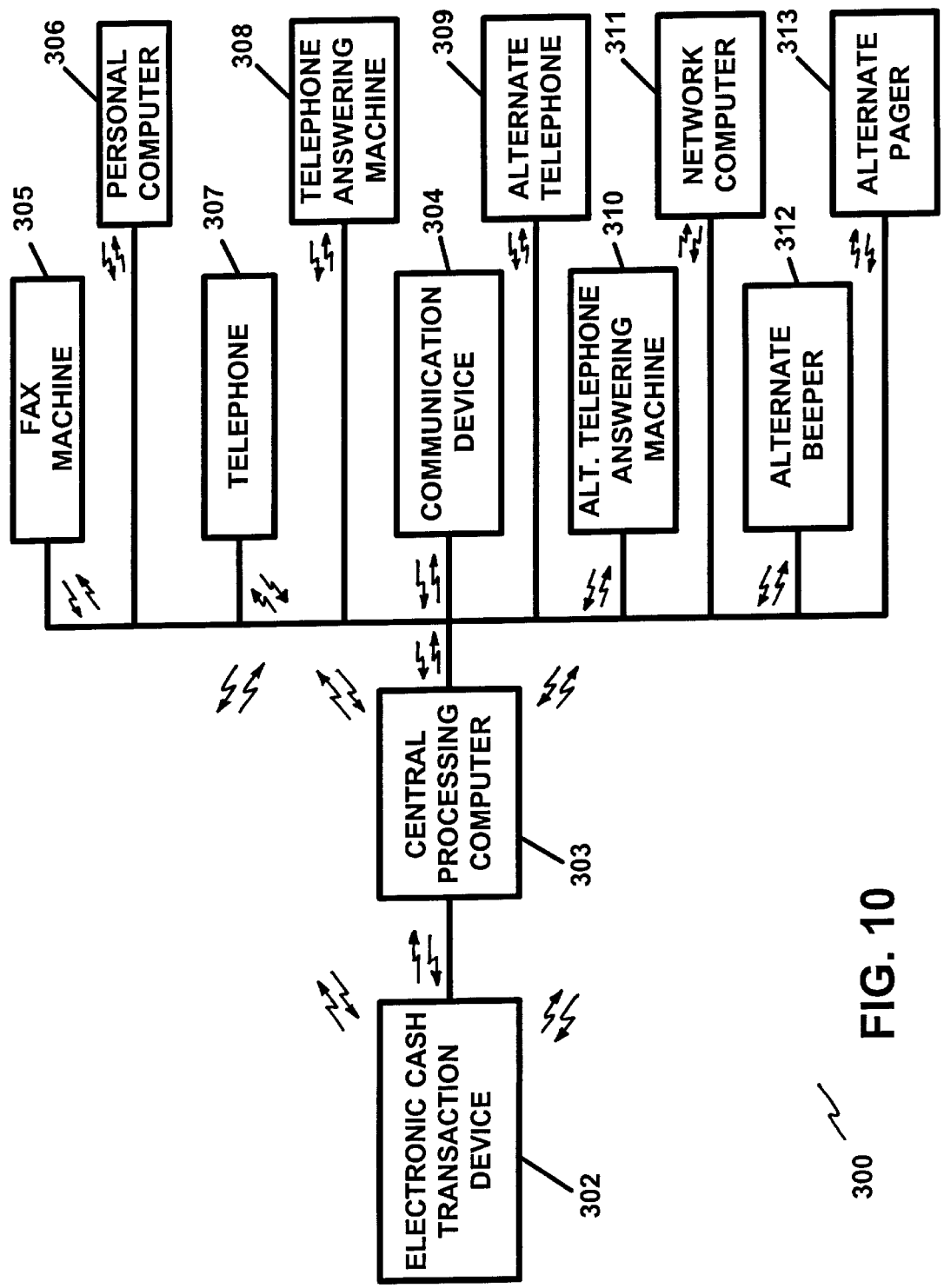

APPARATUS AND METHOD FOR PROVIDING ACCOUNT SECURITY

RELATED APPLICATIONS

This is a continuation-in-part application of U.S. patent application Ser. No. 09/169,053, filed Oct. 9, 1998, which is a continuation application of U.S. patent application Ser. No. 08/873,945, filed Jun. 12, 1997, now U.S. Pat. No. 5,878, 337, which is a continuation application of U.S. patent application Ser. No. 08/694,199, filed Aug. 8, 1996, abandoned.

FIELD OF THE INVENTION

The present invention pertains to a financial transaction and/or wireless communication device authorization, notification and/or security apparatus and method, and, in particular to a financial transaction and/or wireless communication device authorization, notification and/or security apparatus and method for use in providing authorization, notification and/or security in conjunction with credit card, charge card and/or debit card use, financial account, brokerage account, electronic money account, savings and/or checking account activity and/or use and/or wireless or cellular communication device or telephone activity or use.

BACKGROUND OF THE PRESENT INVENTION

Millions of individuals enjoy the convenience of utilizing credit cards, charge cards, debit cards, and/or currency or "smart" cards as a convenient way in which to purchase goods and/or services. By utilizing credit cards, charge cards, debit cards, and/or currency or "smart" cards, an individual may enter into a transaction without having to have cash or currency in hand or otherwise. In the case of credit cards, charge cards and debit cards, the individual, in effect obtains an instant loan of the funds needed to make a purchase and/or enter into a transaction. In the case of currency or "smart" cards, the individual may "store" an amount of money on the card(s) and, thereafter, utilize the card(s), instead of cash or currency, in order to make purchases and/or enter into transactions.

Millions of individuals also enjoy the benefits of having financial accounts, brokerage accounts, savings accounts, checking accounts and/or automated teller machine accounts which allow then to enjoy the security of saving their money in accounts which are usually insured and which allow them to, in some instances, earn interest on their money. In the case of checking accounts, individuals enjoy the convenience of writing checks and/or other transaction instruments which allow them to draw against their money without having to undergo the inconvenience of going to the bank or financial institution to withdraw their money, in currency form, and traveling to, in some cases, a distant location to either make a purchase, payment and/or to otherwise settle an account. In this regard, the ability to write checks, drafts and/or other instruments against an account is a very convenient manner in which to conduct transactions of any kind.

In the case of automated teller machines, individuals may conveniently withdraw and/or deposit money into a bank of other financial account.

It is envisioned that electronic money, electronic cash and/or digital cash accounts are also becoming a viable vehicle by which to conduct commerce.

Many individuals also enjoy the convenience of owning and/or using wireless or mobile telephones, wireless communication devices, cellular telephones and/or devices as a means by which to facilitate communications and/or to make telephone calls when a conventional line or permanent telephone is not within reach and/or when the individual is "on the go", such as in an automobile, on foot, and/or in any other type of environment, such as away from home, when a conventional line or permanently fixed telephone is not available.

Unfortunately, with the convenience of each of the above credit cards, charge cards, debit cards, and/or currency or "smart" cards, electronic money cards, electronic cash cards, and/or digital cash cards, financial accounts, brokerage accounts, savings accounts, checking accounts, automated teller machine (ATM) accounts, electronic money accounts, electronic cash accounts, digital cash accounts and wireless communication devices, wireless telephones, wireless communication devices, cellular telephones or cellular communications devices, comes many disadvantages and the opportunity for theft and/or fraud. In the case of credit cards, charge cards and/or debit cards, hundreds of millions, if not billions, of dollars a year are lost as a result of the theft of, and/or the fraudulent use of, credit cards, charge cards and/or debit cards, or the account numbers which correspond thereto.

A lost or stolen card may be utilized by an unauthorized individual to spend upwards of thousands of dollars before the unauthorized use is detected and/or before the cardholder can ascertain, and/or be notified, either by the card issuer or servicing institution, or when the cardholder detects the unauthorized transaction on his or her monthly account statement, that the card is lost or stolen. Similarly, even in the absence of the physical card, an unauthorized individual may utilize the account number which corresponds to the card in order to make certain transactions.

While card holders are usually protected by various coverages which shield them from the liabilities associated with the fraudulent use of a card or the corresponding account number, the card issuers, credit, charge and/or debit card issuing companies and/or institutions, and/or their insurance companies, end up paying for the above described thefts and/or fraudulent and/or unauthorized uses. Ultimately, the consumer also shoulders the burden of the costs associated with these thefts and/or fraudulent and/or unauthorized uses in the form of increased prices.

While authorization terminals and/or devices are utilized at a point-of-sale and/or at the vendor's, the seller's, or the service provider's, location, these authorization terminals and/or devices typically are utilized to obtain an authorization from the card issuer or account servicing institution which, usually entails a screening of whether the card has been lost, stolen, cancelled, de-activated and/or whether the cardholder has exceeded and/or will exceed his or her credit limit. This current authorization practice fails to prevent the use of a lost or stolen card, or the unauthorized use of either the card or the account number corresponding thereof, if the card has not been reported, and/or discovered, to be lost, stolen or used without authorization and/or if the account credit limit has not yet been reached.

Current practices do not entail and/or do not include the provision for obtaining an authorization, and/or for providing notice to the cardholder before, during and/or shortly after a transaction, which cardholder authorization and/or notification procedure would be helpful and prove to be essential in preventing the fraudulent use and/or unauthorized use of a card and/or the account number corresponding thereto in an unauthorized transaction and/or shortly thereafter an unauthorized transaction has occurred, thereby minimizing the fraudulent and/or unauthorized use of the card and/or the account number corresponding thereto.

In the case of currency or "smart" cards, which typically may serve as bearer instruments, the monetary credit on these cards may be completely depleted before the card owner even discovers same to be lost or stolen.

In the case of financial accounts, brokerage accounts, savings accounts, checking accounts, and/or automated teller machine accounts, electronic money, electronic cash, and/or digital cash accounts these accounts may be accessed, and funds be withdrawn, without the account owner's notification and/or knowledge. In the case of savings accounts and checking accounts, these accounts may be accessed, and/or funds may be withdrawn therefrom, when checks drawn on insufficient funds are returned, and/or when the account number is inadvertently and/or fraudulently utilized in an endorsement, or otherwise, by an individual attempting to cash or perform a transaction with a fraudulent instrument, a forged instrument and/or an otherwise "bad" check. In these instances, the accounts and/or funds involved are usually accessed, invaded, and/or withdrawn from the account involved without the account owner being notified and/or having a say in the matter. The above also holds true for financial accounts, brokerage accounts, electronic money accounts, electronic cash accounts and/or digital cash accounts especially in cases when an individual's investments are not properly executed or in instances when mistaken transfers, unauthorized transactions and/or unauthorized trading and/or withdrawals occurs.

The account owner is typically notified of the above-described activity involving his or her account days later when he or she either receives a mailed notice and/or when they receive and review their monthly or periodic statement, which notice may be received at a time when it may be too late for the account owner to stop or reverse the transaction and/or, in the case of a check or draft returned for insufficient funds, at a time which is too late for the account owner to attempt to collect the funds. In the case of automated teller machine accounts, these accounts may be accessed, such as with a lost, stolen, or counterfeit card and/or with a card account number(s) and/or associated personal identification number(s), by a thief or by any other unauthorized person who could then make an unauthorized withdrawal(s) therefrom.

Once again, the account owner would not receive notification and/or have knowledge of the unauthorized transaction until they are notified by the bank or financial institution either via a monthly and/or periodic statement, and/or when they attempt a transaction at the automated teller machine and, at that time, discover that funds are missing and/or have been withdrawn. In the case of savings accounts, checking accounts, automated teller machine accounts, electronic money accounts, electronic cash accounts and/or digital cash accounts, there is no present apparatus or method by which to provide notification to an account owner at the time of the unauthorized transaction and/or account activity and/or shortly thereafter same.

In the case of wireless telephones, wireless communication devices and/or cellular telephones, recent practices involving "cloning" wireless telephones, wireless communication devices and/or cellular telephones, which entails intercepting communication and/or telephone transmissions from the respective wireless or cellular communication device or telephone, which transmissions contain the telephone number of the transmitting device or telephone and/or the associated personal identification number (PIN), and utilizing the intercepted information to program a different wireless or cellular communications device or telephone which may then be utilized in conjunction with the account of the "cloned" device or telephone, has also resulted in widespread theft and fraudulent use of wireless telephones, wireless communication devices, cellular telephones and/or cellular communications devices. The "cloned" devices and/or telephones are typically sold on the "black" market. In these instances, the wireless or cellular device or telephone owner has no way of knowing whether, or when, his or her wireless or cellular transmissions are being intercepted and/or if and when a "cloned" wireless or cellular device or telephone is created and/or is utilized on, or over, his or her wireless or cellular device or telephone account.

Typically, the wireless or cellular device and/or telephone owner first becomes aware of the unauthorized usage of his or her wireless or cellular device and/or telephone account when he or she receives their device and/or telephone account statement. Once again, in the time between the "cloning" of the wireless or cellular device or telephone, and the discovery of same, hundreds, if not thousands, of dollars worth of wireless or cellular device or telephone calls may have been made before the unauthorized use is detected. At present, there is no apparatus or method for providing notification to the wireless and/or cellular device or telephone owner as to when his or her device or telephone and/or device number and/or telephone number is, or has been, utilized in an unauthorized manner.

SUMMARY OF THE INVENTION

The present invention provides an apparatus and a method for providing financial transaction authorization, notification and/or security, and, in particular, provides an apparatus and a method for providing financial transaction authorization, notification and/or security in conjunction with credit card, charge card, debit card, and/or currency or "smart" card use, financial account, brokerage account, electronic money account, electronic cash account and/or digital cash account, savings and/or checking account activity and use and/or wireless or cellular communication device and/or telephone use, which overcomes the shortcomings of the prior art.

The apparatus and method of the present invention, which is utilized in conjunction with a credit card, a charge card, a debit card and/or a currency or "smart" card authorization process comprises a point-of-sale authorization device which devices are found in various establishments and which are utilized in conjunction with the sale of goods and/or services and/or in other types of financial transactions. The point-of-sale device may be utilized at the location of the seller and/or service provider, such as at a retail store or office, and/or the point-of-sale device may be located at the site of the goods or service provider or vendor, such as in cases when the sale is a telephone order, mail order and/or other type of transaction, including transactions made on, or over, the INTERNET and/or other on-line services or communication networks or mediums.

The apparatus also comprises a central processing computer for processing the credit, charge, debit and/or currency or "smart" card, electronic money card, electronic cash card, and/or digital cash card, account and/or other transaction requests, and data and/or information pertaining thereto, and/or the authorization pertaining thereto. The central processing computer may service any predefined group of card holders and/or any pre-defined group(s) and/or type(s) of cards. The central processing computer may also process accounts for any of the various banks and/or financial institutions which issue and/or manage credit cards, charge cards, debit cards and/or currency or "smart" cards, electronic money cards, electronic cash cards, and/or digital cash cards and/or process or manage these accounts.

The point-of-sale device is linked and/or connected to the central processing computer via a communications system, link and/or medium, such as, for example, a communication network and/or a telephone network or line. The communications system which is utilized may be any communications system and may include telecommunication systems, satellite communications systems, radio communication systems, digital satellite communications systems, personal communications services communication systems, cable television systems, broadband communication systems, as well as any other appropriate communications system.

The point-of-sale device transmits signals and/or data to the central processing computer as well as receives signals and/or data from the central processing computer.

The apparatus also comprises a cardholder communication device which may receive signals and/or data from either or both of the point-of-sale device and/or the central processing computer. The communication device may also be equipped with a transmitter for transmitting signals and/or data to the central processing computer. In this regard, the central processing computer transmits signals and/or data to the communication device as well as receives signals and/or data from the communication device. The communication device may also transmit signals and/or data directly to the point-of-sale device and receive signals and/or data directly from the point-of-sale device.

The point-of-sale device may transmit signals and/or data to the central processing computer and to the communication device and may receive signals and/or data from the central processing computer and from the communication device.

The communication device may be a wireless device and/or wireless communication device. In this regard, the communication device may be a telephone signal receiving device which may be a beeper or pager or other device which may be carried by the cardholder and/or be kept on and/or close to the cardholder's person so that the central processing computer may transmit signals and/or data to the communication device so as to provide communication with the cardholder at any time and at any location.

The apparatus may also comprise a facsimile (fax) machine, a personal computer, a personal digital assistant, a telephone, a telephone answering machine, an alternate telephone, an alternate telephone answering machine, a network computer and/or an alternate beeper or pager. The central processing computer may be linked with the above fax machine, personal computer, personal digital assistant, telephone, associated answering machine, alternate telephone and associated answering machine, network computer, and/or alternate beeper or pager via any suitable communication system. The telecommunications link or telephone line or link, which may or may not be a wireless link depending on the device and/or the circumstances, is utilized in order to link the central processing computer with each of the fax machine, the personal computer, the personal digital assistant, the telephone, the associated answering machine, the alternate telephone, alternate telephone answering machine, the network computer and/or the alternate beeper or pager.

The apparatus and method of the present invention may be utilized in order to provide cardholder authorization, notification and/or security measures in financial transactions involving credit cards, charge cards, debit cards, and/or currency or "smart" cards, electronic money cards, electronic cash cards, and/or digital cash cards, and may be utilized in order to obtain cardholder authorization in a card-related transaction.

The apparatus and method of the present invention may commence operation when the card, which is to be utilized in a credit card, charge card, debit card, and/or currency or "smart" card, electronic money card, electronic cash card, and/or digital cash card, or number corresponding thereto, transaction, is offered at the point-of-sale or other appropriate location whereupon the attendant or point-of-sale device operator will activate the apparatus in any typical manner, such as by obtaining a phone line and entering card information into the point-of-sale device. Data entry may typically be performed by swiping the magnetic strip of the card through a card reader of the point-of-sale device. The information and/or data pertinent to the transaction and the card is then transmitted to the central processing computer.

The central processing computer will then process the information and/or data pertinent to the transaction and to the particular card account and may request, if needed, that the point-of-sale operator enter the transaction amount. The central processing computer will process the information and/or data pertinent to the transaction in conjunction with the card account information in order to determine if the card has been lost, stolen and/or cancelled and/or de-activated. Further, the central processing computer may perform a test in order to determine if the maximum credit, charge or debit account limit has been exceeded and/or if the card has been depleted of its currency value.

Once all of the information and/or data processing has been completed, the central processing computer will determine if the card has been lost, stolen, and/or cancelled and/or de-activated and/or if the credit, charge or debit account limit of the card has been reached and/or exceeded and/or if the currency value of the card has been depleted.

The central processing computer may also perform a test in order to determine if the predetermined maximum number of unauthorized transactions has occurred on the account. If any of the above listed conditions are found to exist (i.e. card is lost, stolen, cancelled and/or de-activated, or credit, charge or debit account limit has been reached or exceeded, currency value depleted, or unauthorized transaction limit reached or exceeded), the central processing computer may transmit a signal to the point-of-sale device indicating that the transaction is not approved and/or is not authorized. The point-of-sale device operator may then cancel the transaction. The point-of-sale device operator may then confiscate the card and/or alert the authorities.

If, however, the central processing computer should determine that the card is not lost, stolen, cancelled or de-activated, or that the credit, charge or debit account limit of the card has not been reached or exceeded, or that the of unauthorized transactions count has not reached a predefined limit, the central processing computer may transmit a signal and/or data to the communication device which is located with the cardholder. The central processing computer may then also transmit respective signals and/or data to any one or more of the cardholder's designated fax machine, personal computer, personal digital assistant, telephone, telephone answering machine, alternate telephone, alternate telephone answering machine, network computer, and/or alternate beeper or pager, either sequentially and/or simultaneously.

The information and/or data transmitted to the communication device includes information and/or data identifying the transaction and may include the name of the store or the service provider and the amount of the transaction. The information and/or data may also provide the time of the transaction, the location (i.e. city, town, village, state, country, etc.) of the transaction, and/or its origin. The information and/or data may also include the phone number of the central processing office and/or computer servicing the account so that the cardholder may telephone same in order to authorize or cancel the transaction. The information and/or data may also be supplemented to include the type of goods and/or services involved in the transaction, if such information can be entered at the point-of-sale device.

The information and/or data which is transmitted from the central processing computer, and received at the communication device, may be displayed to the cardholder on a display device of the communication device. The information displayed on the display device may include the name of the store or the service provider, the amount of the transaction, the time of the transaction and the location of the transaction. The information and/or data may also be supplemented to include the type of goods and/or services involved in the transaction, if such information can be entered at the point-of-sale device.

The apparatus, or the central processing computer, may then wait for the cardholder to respond to the transmission. During this time, the cardholder may either utilize the reply or two-way pager feature on the communication device in order to either approve, or authorize, the transaction or to disapprove, or void the transaction. The apparatus may then determine if the cardholder has made a reply or response within a pre-defined time limit. The cardholder may also transmit a signal via an appropriate key or button suspending use of the card such as when he or she may first be apprised of the fact that the card has been lost or stolen. If the cardholder has replied or responded to the notice, the response may then be transmitted to, and received by, the central processing computer. The cardholder may also simply telephone the central processing office or processing center, servicing the card, so as to personally notify the office or center of his or her response to the central processing computer transmission regarding the transaction.

If the cardholder does not reply to the central processing computer within a pre-specified time, the central processing computer may transmit a signal and/or data to the point-of-sale device indicating that, with the exception of receiving the authorization of the cardholder, the transaction is otherwise approved. The central processing computer may also simply transmit a signal indicating that the transaction is not authorized and, therefore, should be cancelled of voided. The point-of-sale device operator may then either proceed to complete the transaction, try to obtain additional information from the purchaser, or cancel the transaction.

The action taken by the point-of-sale device operator may be dictated by the specific agreement in effect between the sales or service establishment and the bank or financial institution administering the card accounts. Thereafter, the operation of the apparatus will cease. If the cardholder should reply or respond to the transaction notice at a later period, this information may then be utilized in order to approve, or to disapprove, and/or to dispute the transaction.

The central processing computer, after receiving the reply or response from the cardholder, may then identify the cardholder response. The apparatus, or the central processing computer, may then determine if the cardholder has replied or responded so as to authorize the transaction. If the cardholder's response is to cancel, to disapprove or not authorize, the transaction, the central processing computer may transmit a signal and/or data to the point-of-sale device which will notify and/or instruct the point-of-sale device operator that the transaction is not authorized and, therefore, should be cancelled or voided. The point-of-sale device operator may then cancel the transaction. The point-of-sale device operator may then confiscate the card and/or alert the authorities. Thereafter, the apparatus will cease operation.

If, however, the central processing computer identifies the cardholder reply or response as being one to authorize the transaction, the central processing computer may then transmit a signal and/or data to the point-of-sale device which may notify and/or instruct the point-of-sale device operator that the transaction is authorized and/or approved. The point-of-sale device operator may then complete the transaction. Thereafter, operation of the apparatus will cease.

In cases when the cardholder is the party to the transaction, he or she, having the communication device with, or on, his or her person, may authorize the transaction at the point-of-sale location or from his or her remote location. The cardholder may also program and/or set the communication device to automatically authorize or disapprove or disallow transactions.

In this regard, the communication device may be programmable so as to receive and/or to analyze the transaction information and/or data and reply or respond to same automatically and/or with preset or programmed replies and/or responses. The communication device and/or the central processing computer may also be programmable so as to limit and/or restrict the amounts and/or types of transactions, and/or the goods and/or services which may be purchased with the card, the stores or service providers which may be authorized to accept the card, limits on the dollar amounts of transactions pertaining to each authorized vendor, seller and/or service provider, daily spending limits, and/or the geographical area or location to which authorized use may be limited, and/or authorized times for card usage (i.e. specific days, dates, time of day, time of month, year, etc.), and/or any other limitation and/or restriction regarding amount of the transaction, the parties involved, the geographical area limitations, and/or the times of allowed usage. In this regard, the cardholder may provide for temporary transaction and/or purchasing amounts.

The communication device may also be provided with a memory device for storing any number of transactions so that the cardholder may review his account activity and/or transactions which have occurred involving his or her card. In this manner, the cardholder may "scroll" through and/or in other ways review account activity at any time and for any time period and/or interval. The communication device may also be equipped to service more than one card. For example, a plurality of cards may be serviced with or by a single communication device.

The apparatus and method of the present invention provides for the real-time authorization, notification and/or security of financial transactions involving credit cards, charge cards, debit cards, and/or currency or "smart" cards, electronic money cards, electronic cash cards and/or digital cash cards, which enables a cardholder to monitor, in real-time, all activity involving his or her card(s) and the corresponding account numbers. The apparatus and method of the present invention also provides a means and a mechanism by which to inform a cardholder that his or her card(s) are lost, stolen and/or are or have been fraudulently used, and/or when his or her card number(s) are or have been fraudulently used, and provides an indication to the cardholder of where his or her card(s) are being or have been utilized in transactions. The cardholder may then report the card lost or stolen and/or cancel and/or de-activate the card.

The present invention also provides a means and a mechanism by which to monitor the number of transactions which are unauthorized by the cardholder and determine whether or not to authorize transactions and/or to cancel or to de-activate the card(s). In the above manner, the present invention provides an apparatus and a method to prevent and/or to drastically limit fraudulent and/or unauthorized use of credit cards, charge cards, debit cards, and/or currency or "smart" cards, electronic money cards, electronic cash cards and/or digital cash cards, and/or the account numbers corresponding thereto.

The present invention, in an alternate embodiment, may be utilized so as to provide authorization, notification and/or security in banking, financial, brokerage and related financial transactions involving checking accounts, savings accounts and/or automated teller machine (ATM) transactions, brokerage accounts and/or transactions, financial accounts and/or transactions, electronic money accounts, electronic cash accounts and/or digital cash accounts, and/or other transactions wherein an account holder can be notified of a transaction and/or attempted transaction. In such an alternate embodiment, the apparatus comprises a respective banking transaction device, a financial transaction device, a brokerage transaction device or, an electronic money, electronic cash and/or digital cash device or terminal which devices or terminals are found in the respective banks, brokerage and financial and/or other suitable institutions, and which may be a teller device or terminal, a processing computer or device and/or an ATM device or terminal, a brokerage account computer or device, a trading computer or device and/or any other appropriate device (hereinafter "transaction device"). The apparatus also comprises a central processing computer and a communication device. The respective transaction device transmits an authorization request which may include the data pertaining to the particular account which is accessed and/or involved in the transaction and the type and the amount of the transaction, over a communications medium, to the central processing computer for processing the transaction request and/or the authorization pertaining thereto.

The central processing computer may transmit signals and/or data pertaining to the transaction to the communication device. The apparatus may then operate and/or be utilized in a manner similar to, or analogous to, the apparatus utilized in conjunction with credit cards, charge cards, debit cards, and/or currency or "smart" cards, electronic money cards, electronic cash cards and/or digital cash cards, and/or the account numbers corresponding thereto, as described above.

In this manner, the apparatus and method of the present invention may provide for the real-time notification of banking, financial, brokerage, electronic money, electronic cash and/or digital cash, transactions involving respective bank financial, brokerage and electronic currency accounts and enable an account owner to monitor, in real-time, all activity involving his or her bank, financial, brokerage and/or electronic currency accounts. The apparatus and method of the present invention also provides a means and a mechanism by which to inform an account owner that his or her account is overdrawn, has been charged against and/or that his or her ATM card(s), and other respective account cards, are lost, stolen, cancelled or de-activated and/or provides an indication to the account owner of when and/or where his or her accounts are being accessed in transactions and/or are being otherwise compromised. The account owner may then report the unauthorized activity, or the discovery of a lost or stolen ATM card, and/or other respective account card, and/or cancel and/or de-activate the respective account(s) and/or card(s).

In another alternate embodiment, the apparatus and method of the present invention may also be utilized so as to provide authorization, notification and/or security for, and in conjunction with wireless communication devices, wireless telephones, cellular communication devices and/or cellular telephones, wireless and/or mobile telephones and/or communication systems, wherein a wireless, cellular and/or mobile communication devices and/or telephone owner and/or account holder can be notified of a transmission and/or an attempted transmission and/or telephone call made with his or her wireless, cellular, or mobile communication device and/or telephone and/or with the telephone number and/or account information, which information may include, but not be limited to, transmission codes and/or associated signatures and/or data which corresponds to his or her wireless, cellular, or mobile communication device and/or telephone.

The apparatus utilized in conjunction with a wireless communication device or telephone comprises a wireless or cellular communication device or telephone which serves as the transaction device, a central processing computer and a communication device. The wireless or cellular communication device or telephone transmits signals and/or data which are received by the central processing computer. The central processing computer may then transmit signals and/or data which are received by the communication device. The apparatus may then operate and/or be utilized in a manner similar to, or analogous to, the apparatus utilized in conjunction with credit cards, charge cards, debit cards, and/or currency or "smart" cards, electronic money cards, financial accounts, brokerage accounts, electronic cash, electronic money and/or digital cash, accounts, savings accounts, checking accounts and/or automated teller machine accounts, and/or the account numbers corresponding thereto, as described above.

The apparatus and method of the present invention provides for the real-time notification of wireless or cellular communication device and/or telephone usage, including mobile usage which enables a wireless or cellular device and/or telephone owner and/or account holder to monitor, in real-time, all activity involving his or her wireless or cellular device or telephone. The apparatus and method of the present invention also provides a means and a mechanism by which to inform a wireless or cellular device and/or telephone owner and/or account holder that his or her wireless or cellular device and/or telephone is lost, stolen and/or is being fraudulently used, and/or that the telephone number is being used in an unauthorized manner, and provides an indication to the wireless or cellular device or telephone owner and/or account holder of how, when and where his or her wireless or cellular device or telephone, or the account number which corresponds thereto, is being utilized in wireless or cellular communication transactions. The wireless or cellular device or telephone owner and/or account holder may then report the wireless or cellular device or telephone lost or stolen and/or cancel and/or de-activate the wireless or cellular device or telephone and/or the corresponding account and/or the account number.

The present invention also provides an apparatus and a method by which to monitor the number of wireless or cellular communication device or telephone transactions, including mobile transactions, which are unauthorized by the wireless, cellular or mobile device telephone owner and to determine whether or not a central processing computer should cancel or de-activate the wireless or cellular device or telephone and/or the account. In the above manner, the present invention provides an apparatus and a method for preventing and/or for drastically limiting fraudulent use and/or unauthorized use of wireless, cellular, or mobile devices or telephones and/or wireless, cellular, or mobile telephone numbers. The present invention also provides an apparatus and a method for combating wireless or cellular device or telephone "cloning."

The apparatus and method of the present invention may also be utilized in connection with an on-line service and/or on, or over, the Internet and/or the World Wide Web, so as to provide for a means by which the authorized user or operator may utilize the apparatus in conjunction with a home and/or a personal computer and/or a commercial or industrial computer system (i.e., an internet server computer) and/or any other appropriate device, including a personal communication and/or computing device, in a network environment, and which may be utilized over any suitable and/or appropriate communications network or medium.

The communications system utilized in conjunction with the present invention may operate anywhere in the electromagnetic and/or the radio spectrum. Personal communication service (PCS) systems and devices, including stationary, portable and/or handheld devices, and digital signal communications devices and systems, may also be utilized. The communication system or medium should provide for the transmission and for the reception of a multitude of remote electrical, electronic, electromagnetic, and/or other suitable signals, over long distances and/or in a mobile and/or a wireless communications environment.

The apparatus and method of the present invention may be utilized in conjunction any appropriate communications device which may be utilized with any appropriate communications system and/or medium.

The present invention may also be equipped with, and be utilized with, hardware and software necessary for providing self-monitoring functions, automatic control and/or responses to occurrences, automatic notice of an occurrence and/or a situation, to an owner, user and/or authorized individual. In this regard, any and all of the embodiments described herein may comprise a monitoring device, a triggering device and/or any other suitable device for detecting an occurrence and/or for identifying a situation which may warrant providing notice to a card holder, account owner, wireless or cellular device or telephone owner and/or an authorized individual.

In this regard, the apparatus and method may provide a transmission of any appropriate signal from a transmitter and, if desired, from a voice synthesizer to the card holder, account owner and/or wireless or cellular device or telephone owner. The signal utilized could be in the form of a communication transmission, depending upon the communication medium utilized, a telephone call, a voice message, a beeper and/or a pager message, an electronic mail message, a fax transmission, and/or any other mode of communication which may be utilized with any of the apparatuses, devices and/or components described herein.

In this regard, the apparatus may be designed or programmed to telephone the cardholder, account owner and/or wireless or cellular device or telephone owner, and/or other authorized individual, at a primary phone number, at an alternate or forwarding phone number, and/or at a business phone number, send a beeper or pager message to the individual, and/or send a fax message, an electronic mail (e-mail) message, a voice mail message and/or an answering service message to, or for, the card holder, account owner and/or wireless or cellular device or telephone owner or authorized individual. In this manner, the apparatus may communicate with the desired individual by utilizing multiple notification and/or reporting avenues and/or devices so as to provide and to ensure that best efforts are to be made to communicate with the desired individual as soon as possible.

The apparatus and method of the present invention may also be programmable for programmed and/or automatic activation, self-activation, programmed and/or automatic operation and/or self-operation. The apparatus and method of the present invention may provide for an immediate, as well as for a deferred, authorization, notification and/or security in any of the above-described transactions, financial transactions and/or wireless communication transactions.

The present invention may also be utilized in such a manner that a communication device may receive and/or transmit signals, data and/or information which pertains to multiple accounts and/or multiple types of accounts in order to provide authorization, notification and/or security for a plurality of any of the accounts described herein.

The present invention, in any of the embodiments described herein, may also be designed to be user-friendly. In this regard, the present invention may be menu-driven, and/or its operation may be menu-selected, from audio menus, video or visual menus, or both audio and video menus.

Accordingly, it is an object of the present invention to provide an apparatus and a method for providing authorization, notification and/or security in financial transactions involving credit cards, charge cards, debit cards, and/or currency or "smart cards, electronic currency cards, financial accounts, brokerage accounts, savings accounts, checking accounts and/or automated teller machine accounts, electronic money accounts, electronic cash accounts, digital cash accounts, and for providing authorization, notification and/or security in wireless communications transactions involving wireless devices or telephones, wireless communication devices, cellular telephones and/or other wireless or cellular communications devices.

It is another object of the present invention to provide an apparatus and a method for providing authorization, notification and/or security in financial transactions involving credit cards, charge cards, debit cards, ATM cards, electronic currency cards and/or "smart" cards, wherein the cardholder may authorize or disapprove of a transaction, in real time.

It is another object of the present invention to provide an apparatus and a method for providing authorization, notification and/or security in financial transactions involving financial accounts, brokerage accounts, savings accounts, checking accounts, automated teller machine accounts, and/or electronic and/or digital money or currency accounts, wherein the account owner may authorize or disapprove of a transaction, in real time.

It is another object of the present invention to provide an apparatus and a method for providing authorization, notification and/or security in wireless communications transactions involving wireless telephones, wireless communication devices, cellular telephones and/or other cellular communications devices, wherein the wireless or cellular device or telephone communication device owner may authorize or disapprove of a transaction, in real-time.

It is another object of the present invention to provide an apparatus and a method for providing authorization, notification and/or security in financial transactions and/or in wireless communication transactions, which may be utilized on, over, or in conjunction with, an on-line service and/or the Internet, the World Wide Web, and/or any other suitable communication network or medium.

It is still another object of the present invention to provide an apparatus and a method for providing authorization, notification and/or security in financial transactions and/or in wireless communications transactions, which is programmable and/or which may provide for pre-programmed and/or pre-specified transaction authorization and/or transaction disapproval.

It is still another object of the present invention to provide an apparatus and a method for providing authorization, notification and/or security in financial transactions and/or in wireless communications transactions, which may be utilized over any suitable communications network or medium.

It is still another object of the present invention to provide an apparatus and a method for providing authorization, notification and/or security in financial transactions and/or in wireless communication transactions, wherein the respective cardholder, account owner or wireless or cellular device or telephone owner may increase or decrease the respective account credit limits, account activity, funds available, calling areas and/or usage limits at any time and/or from any location.

It is still another object of the present invention to provide an apparatus and a method for providing authorization, notification and/or security in financial transactions and/or in wireless communications transactions, which is programmable with respect to authorized times of usage (i.e. specific days, dates, time of day, time of month, year, etc.), and/or any other limitations regarding amount of transaction limitations, parties involved, and/or geographical area and/or location of allowed usage.

It is yet another object of the present invention to provide an apparatus and a method for providing authorization, notification and/or security in financial transactions, and/or in wireless communication transactions, for a plurality of accounts and types of accounts.

Other objects and advantages of the present invention will be apparent to those skilled in the art upon a review of the Description of the Preferred Embodiment taken in conjunction with the Drawings which follow.

BRIEF DESCRIPTION OF THE DRAWINGS

In the Drawings:

FIG. 10 illustrates a block diagram of an alternate embodiment of the apparatus of the present invention which is utilized in conjunction with an electronic and/or a digital cash account;

DESCRIPTION OF THE PREFERRED EMBODIMENT

Figure 1:
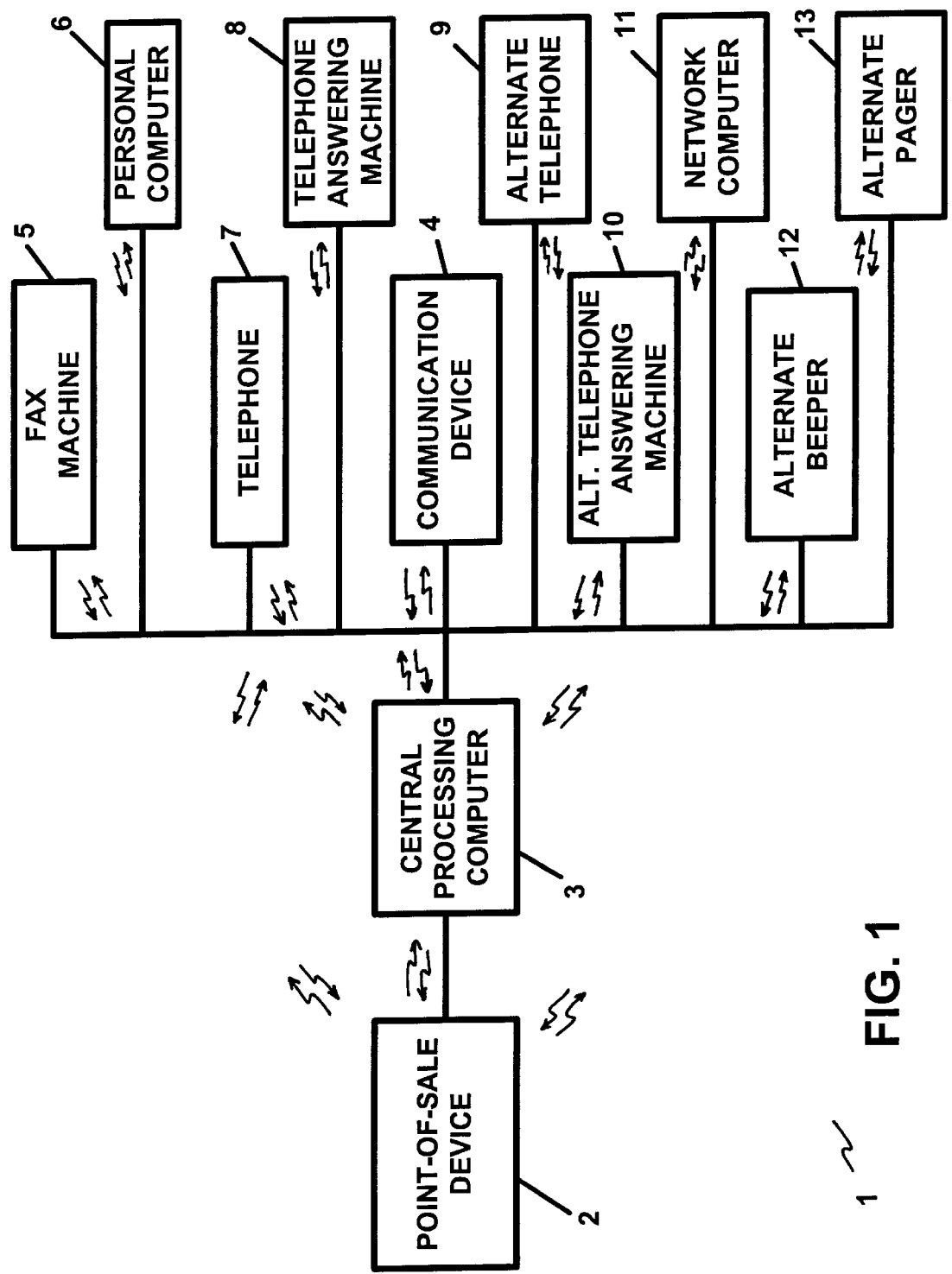
FIG. 1 illustrates a block diagram of the apparatus of the present invention which is utilized in conjunction with a credit card, a charge card, a debit card, and/or on electronic currency and/or "smart" card authorization process.

FIG. 1 illustrates a block diagram of a preferred embodiment of the apparatus of the present invention, which is utilized in conjunction with a credit card, a charge card a debit card, an electronic currency card and/or a "smart" card authorization process. The apparatus of FIG. 1 is denoted generally by the reference numeral 1. With reference to FIG. 1, the apparatus consists of a point-of-sale authorization device 2 which devices are found in various establishments and utilized in conjunction with the sale of goods and/or services and in other financial transactions.

The point-of-sale authorization device 2 (hereinafter referred to as "point-of-sale device") may be any of the widely used and well known devices, terminals, or computers for providing point-of-sale authorization for transactions involving credit cards, charge cards, debit cards and/or other currency cards, electronic currency cards and/or "smart" cards. The point-of-sale device 2 may be utilized at the location of the goods and/or service provider, such as the retail store or office, and/or the point-of-sale device 2 may be located at the site of the goods or service provider or vendor, such as in cases when the sale is a telephone order, mail order and/or other type of transaction, including transactions made over the INTERNET and/or other on-line mediums.

Typically, the devices and terminals for providing point-of-sale authorization comprise and utilize a magnetic card reader and/or magnetic strip card reader, for reading data from the magnetic strip located on credit cards, charge cards, debit cards and/or currency cards, electronic currency cards and/or "smart" cards. The present invention can also be utilized in conjunction with telephone calling cards, prepaid or otherwise. The point-of-sale device 2 transmits an authorization request which may include the data pertaining to the particular card utilized in the transaction and the amount of the transaction, over a communications medium, to a central processing computer for processing the credit, charge, debit and/or other transaction card request and/or the authorization request pertaining thereto.

The point-of-sale device 2 also receives the authorization and/or authorization data and/or information from the central processing computer. A printed transaction receipt may also be provided at and/or obtained via the point-of-sale device 2, or peripheral device associated therewith, for printing a transaction receipt which is usually or typically signed by the card holder in completing the transaction. The point-of-sale device 2 may be designed to read other data besides and/or in addition to magnetic card data. The point-of-sale device 2 may also comprise, or have associated therewith, a keypad for the manual entry of transaction information and/or data, such as the amount of the transaction. The point-of-sale device 2 may also be an integral component of a cash register or other transaction device which may provide for the automatic entry of transaction information and/or data.

The apparatus 1 also comprises a central processing computer 3 which services any predefined group of cardholders. For example, the central processing computer 3 may handle all MASTERCARD transactions for a given financial and/or credit institution. The central processing computer 3, for example, may process credit cards, charge cards, debit cards, currency cards, electronic currency cards and/or "smart" cards and/or combinations of same, such as, for example, VISA®, MASTERCARD®, and/or AMERICAN EXPRESS® cards and process and/or mange account information pertaining thereto. The central processing computer 3 may also process accounts for any of the various banks and/or financial institutions which issue and/or manage credit cards, charge cards, debit cards and/or currency or "smart" cards, and/or other transaction cards (hereinafter referred to as "card" or "cards") and/or process or manage these accounts.

The central processing computer 3 may be a mainframe computer, a mini-computer, a micro-computer, a server computer, such as those utilized in conjunction with on-line services and/or in a network environment, and/or any other suitable computer or computer system.

In the preferred embodiment, the point-of-sale device 2 is linked and/or connected to the central processing computer 3 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems, cable television systems, broadband communications systems, as well as any other appropriate communications system. The point-of-sale device 2 transmits signals and/or data to the central processing computer 3 as well as receives signals and/or data from the central processing computer 3.

The apparatus 1 also comprises a cardholder communication device 4 which may receive signals and/or data from either or both of the point-of-sale device 2 and/or the central processing computer 3. In the preferred embodiment of FIG. 1, the communication device 4 receives signals and data from the central processing computer 3 with said signals being transmitted via a suitable communication system. In the preferred embodiment, the communications system utilized for transmitting signals and/or data to the communication device 4 is a wireless telephone line and the communication device 4 is a telephone signal receiving device such as a telephone beeper or pager. The communication device 4 or pager receives the wireless telephone signals and/or data from the central processing computer 3 during the authorization procedure as will be described in more detail below.

In the preferred embodiment, the communication device 4 is also equipped with a transmitter for transmitting signals and/or data to the central processing computer 3. In this regard, the central processing computer 3 transmits signals and/or data to the communication device 4 as well as receives signals and/or data from the communication device 4. The communication device 4 may also transmit signals and/or data directly to the point-of-sale device 2 and receive signals and/or data directly from the point-of-sale device 2. In the preferred embodiment, the point-of-sale device 2 transmits signals and/or data to the central processing computer 3 and receives signals and/or data from the central processing computer 3. Further, in the preferred embodiment, the communication device 4 receives signals and/or data from the central processing computer 3 and transmits signals and/or data to the central processing computer 3.

As noted above, the communication device 4 is a wireless device. In this regard, the communication device 4 or pager may be carried by the cardholder and/or be kept on and/or close to the cardholder's person so that the central processing computer 3 may transmit signals and/or data to the communication device 4 so as to communicate with the cardholder at any time. The communication device 4 may also comprise any one or more of a facsimile (fax) machine, a personal communications device, a personal computer, a personal digital assistant, a telephone, a telephone answering machine, an alternate telephone, an alternate telephone answering machine, a network computer, and/or an alternate beeper or pager. The central processing computer 3 may be linked with each of the above devices via any suitable communication system.

In the preferred embodiment, the apparatus 1 also comprises a facsimile (fax) machine 5, a personal computer or personal digital assistant 6, a telephone 7, a telephone answering machine 8, an alternate telephone 9, an alternate telephone answering machine 10, a network computer 11, an alternate beeper 12 and an alternate pager 13. The central processing computer 3 may be linked with the above fax machine 5, personal computer or personal digital assistant 6, telephone 7, associated answering machine 8, alternate telephone 9, alternate telephone answering machine 10, network computer 11, and/or alternate beeper 12 or pager 13, via any suitable communication system. In the preferred embodiment, a telecommunications link or telephone network, line or link, which may or may not be a wireless link depending on the device and/or the circumstances, is utilized in order to link the central processing computer 3 with each of the fax machine 5, the personal computer or personal digital assistant 6, the telephone 7, the associated answering machine 8, the alternate telephone 9, alternate telephone answering machine 10, the network computer 11, and/or the alternate beeper 12 and the alternate pager 13.

Figure 2:
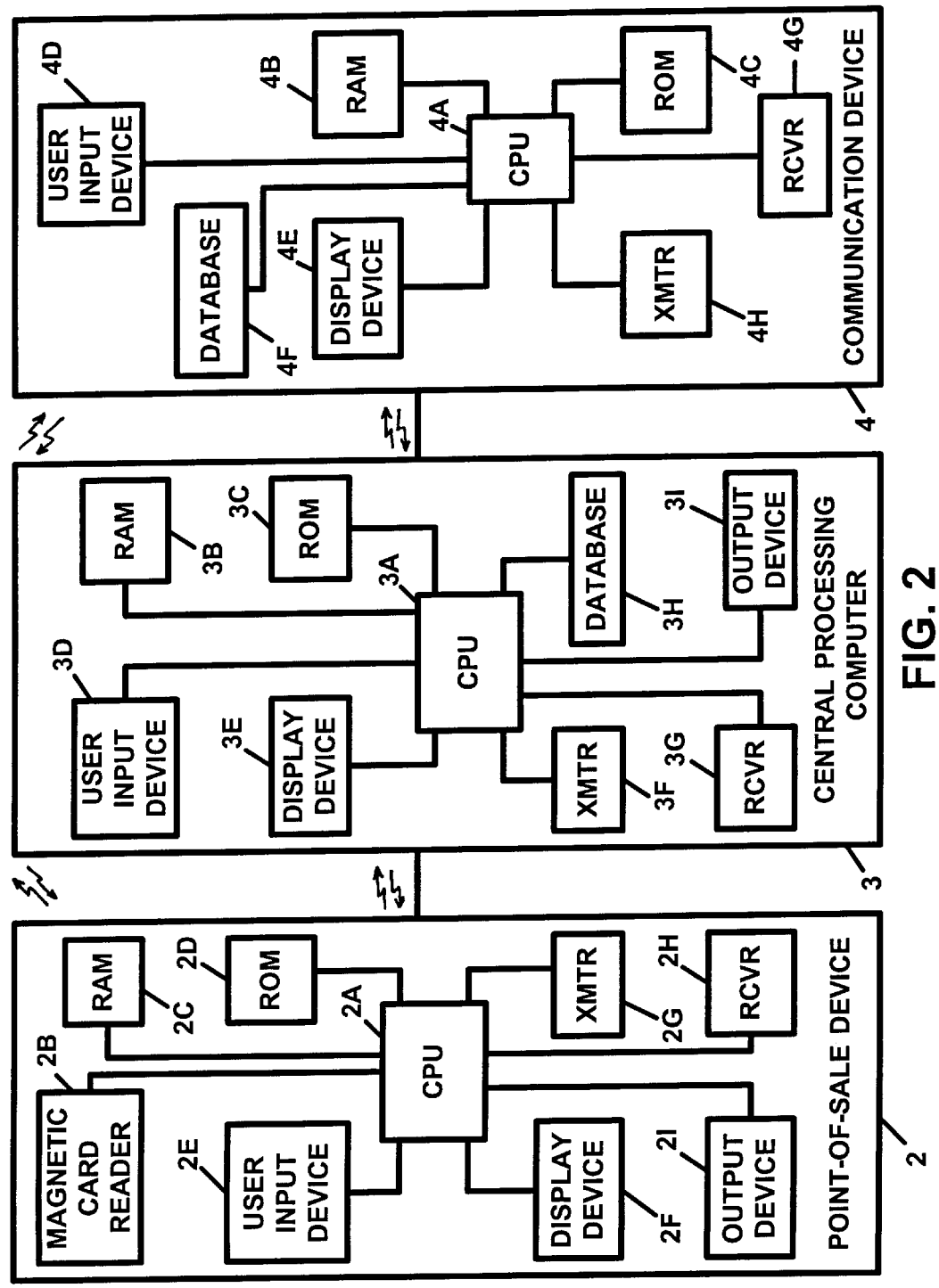
FIG. 2 illustrates the various components of the apparatus of FIG. 1.

FIG. 2 illustrates the various components of the apparatus 1 of FIG. 1. In FIG. 2, the point-of-sale device 2, in the preferred embodiment, comprises a central processing unit or CPU 2A, a magnetic card reader 2B, which is connected to the CPU 2A, associated random access memory 2C (RAM) and read only memory 2D (ROM) devices, which are also connected to the CPU 2A, a user input device 2E, which is typically a keypad or other suitable input device for inputting data into the device 2 and which is also connected to the CPU 2A, and a display device 2F for displaying information and/or data to a user.

The point-of-sale device 2 also comprises a transmitter 2G for transmitting signals and/or data to the central processing computer 3, and/or to the communication device 4 and/or to any other device associated with the cardholder and/or the apparatus, if desired. The transmitter 2G is also connected to the CPU 2A. The point-of-sale device 2 also comprises a receiver 2H for receiving signals and/or data from the central processing computer 3, and from the communication device 4 and/or any other associated device which may be utilized, if desired. The receiver 2H is also connected to the CPU 2A. The point-of-sale device 2 also comprises a printer 2I or other appropriate output device for outputting data to the user. The printer 2I is also connected to the CPU 2A. In the preferred embodiment, the printer 2I prints receipts corresponding to the transaction.

In FIG. 2, the central processing computer 3, in the preferred embodiment, comprises a central processing unit or CPU 3A, associated random access memory 3B (RAM) and read only memory 3C (ROM) devices, which are connected to the CPU 3A, a user input device 3D, which is a keypad and/or any other suitable input device for inputting data into the central processing computer 3 and which is also connected to the CPU 3A and a display device 3E for displaying information and/or data to a user or operator.

The central processing computer 3 also comprises a transmitter(s) 3F for transmitting signals and/or data to the point-of-sale device 2 and to the communication device 4 and/or to any one or more of the fax machine 5, personal computer or personal digital assistant 6, telephone 7, telephone answering machine 8, alternate telephone 9, alternate telephone answering machine 10, network computer 11 and/or alternate beeper 12 or alternate pager 13. The transmitter(s) 3F is also connected to the CPU 3A. The central processing computer 3 also comprises a receiver(s) 3G for receiving signals and/or data from the point-of-sale device 2 and from the communication device 4 and/or from any other suitable device which may be utilized in conjunction with the apparatus 1. The receiver(s) 3G is also connected to the CPU 3A. The central processing computer 3, in any and/or all of the embodiments described herein, may utilize a fax/modem and/or any other suitable computer communication device.

The central processing computer also comprises a database(s) 3H which contains account information and data pertaining to the cardholders and/or to the cardholder accounts. The database 3H contains information about the cardholder, the cardholders account number, credit and/or account limits, previous purchases, number of unauthorized purchases made to the account and other information and/or data necessary to manage and/or process an account transaction as described herein.

The database 3H may also comprise data and/or information regarding specific limitations and/or restrictions which may be placed on a particular account, which may be pre-selected and/or programmed by the cardholder and which may include limitations and/or restrictions on the usage of the card. The limitations and/or restrictions may include the types of transactions which are allowed and/or authorized, the goods and/or services which may be purchased with the card, the vendors, stores and/or service provider which may be authorized to accept the card, limits on the dollar amounts of transactions pertaining to each authorized vendor, seller and/or service provider, daily spending limits, and/or the geographical area or location wherein authorized card use may be limited, and/or authorized times for card usage (i.e. specific days, dates, time of day, time of month, year, etc.), and/or any other limitation and/or restriction regarding amount of transaction, parties involved, geographical area, and/or times of allowed usage. The database 3H is also connected to the CPU 3A. The central processing computer 3 also comprises a printer 3I or other appropriate output device for outputting information and/or data to a user or operator.

In FIG. 2, the communication device 4, in the preferred embodiment, comprises a central processing unit or CPU 4A, associated random access memory 4B (RAM) and read only memory 4C (ROM) devices, which are connected to the CPU 4A, a user input device 4D, which is a keypad or a plurality of keys and/or switches for inputting data into the communication device 4 and which is also connected to the CPU 4A, and a display device 4E, for displaying information and/or data to the cardholder, and a database 4F, which are also connected to the CPU 4A. The communication device 4 also comprises a receiver 4G for receiving signals and/or data from the central processing computer 3 and which is also connected to the CPU 4A, a transmitter 4H for transmitting signals and/or data to the central processing computer 3 and which is also connected to the CPU 4A.

In the preferred embodiment, the communication device 4 which is utilized is a pager with a reply feature and/or device. A two-way pager and/or pager systems may also be utilized for implementing the respective component system (s) in the communication device 4/central processing computer 3 combination and/or link.

The apparatus 1 of the present invention, in the preferred embodiment, may be utilized in order to facilitate cardholder authorization, notification and/or security measures in financial transactions involving credit cards, charge cards, debit cards, currency cards, electronic currency cards, telephone account cards and/or "smart" cards, in the manner described below and with reference to FIGS. 3A, 3B and 3C. In this manner, the apparatus 1 of the present invention may be utilized to obtain cardholder authorization in a card-related transaction.

Figure 3A:
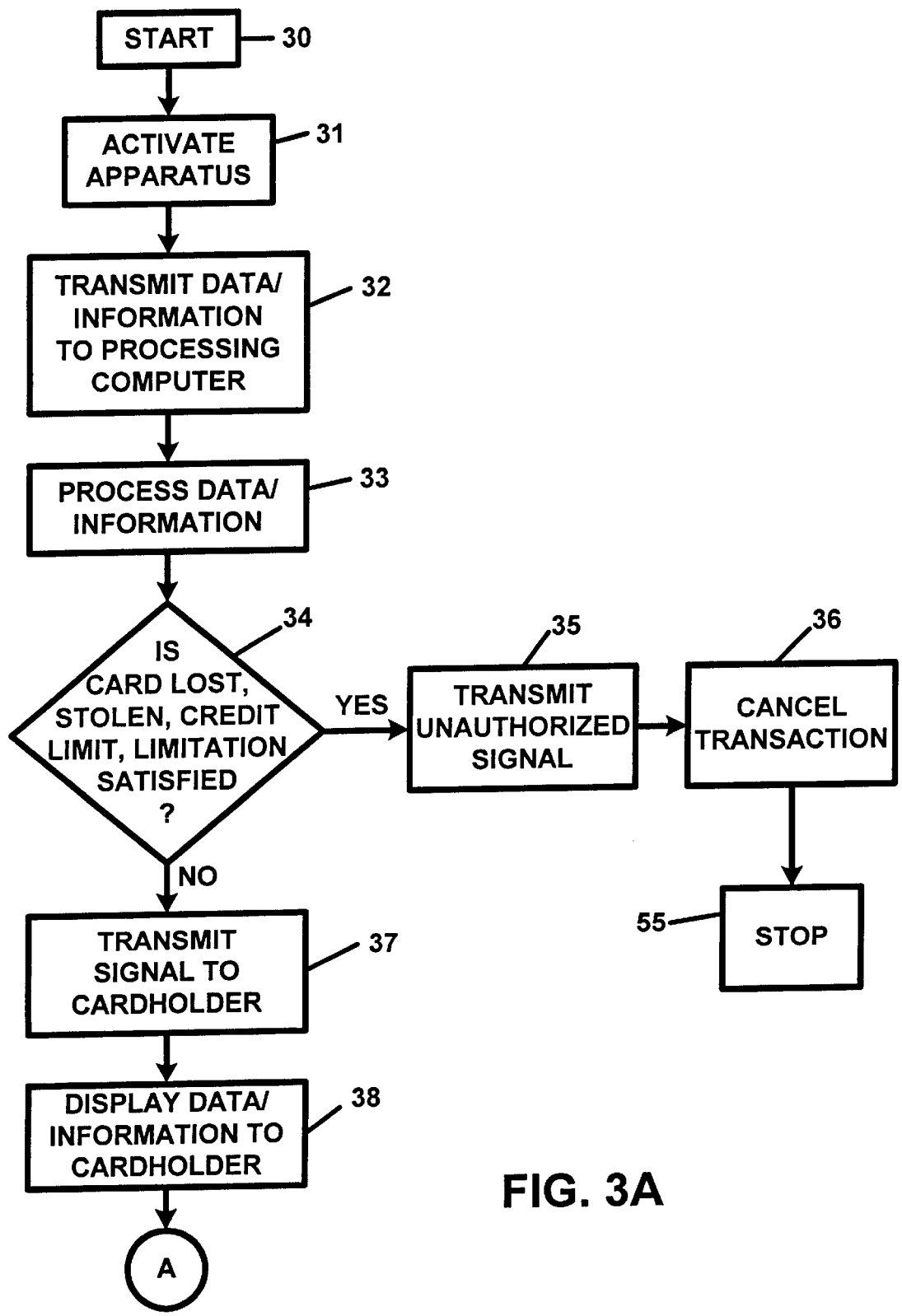
FIGS. 3A, 3B and 3C illustrate the operation of the apparatus of FIG. 1 in flow diagram form.
Figure 3B:
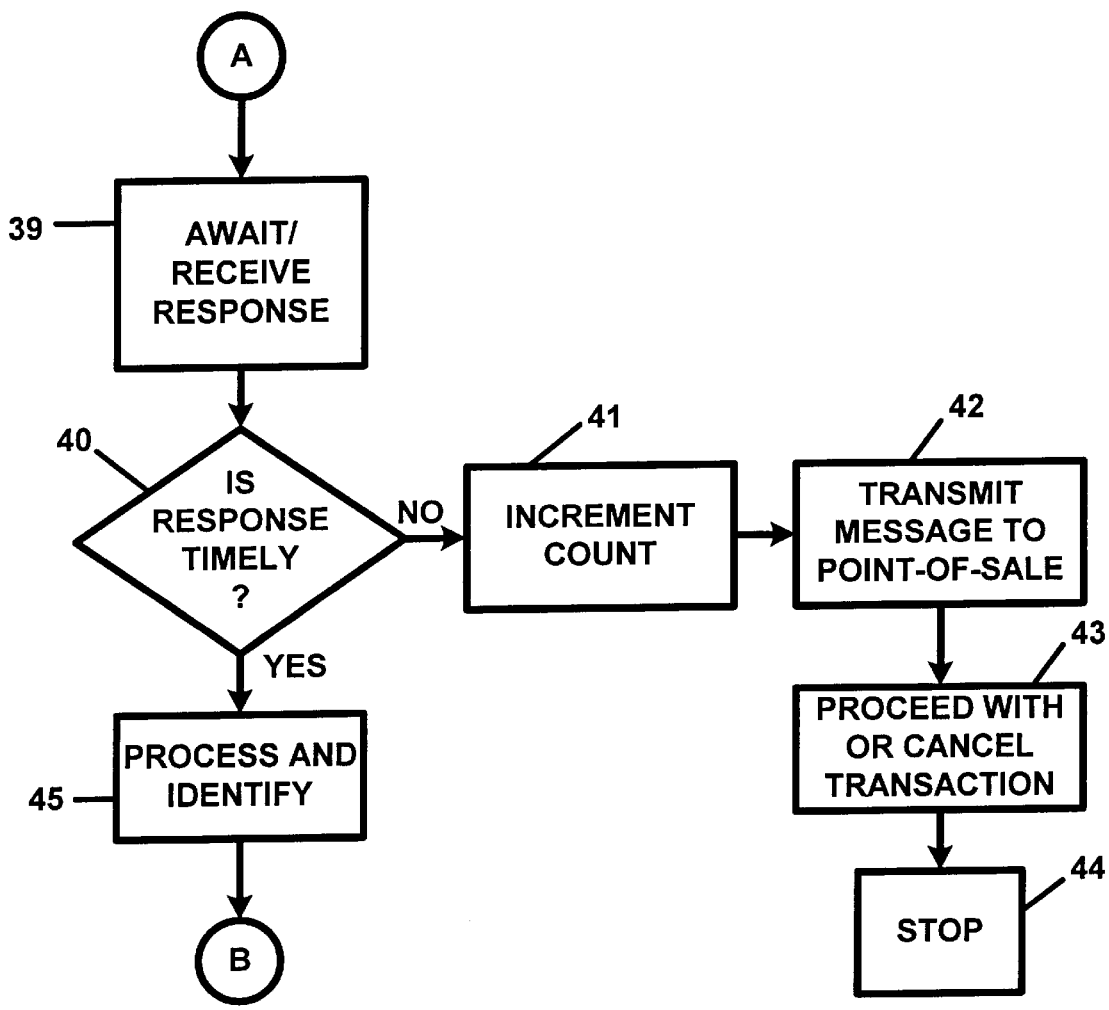
Figure 3C:
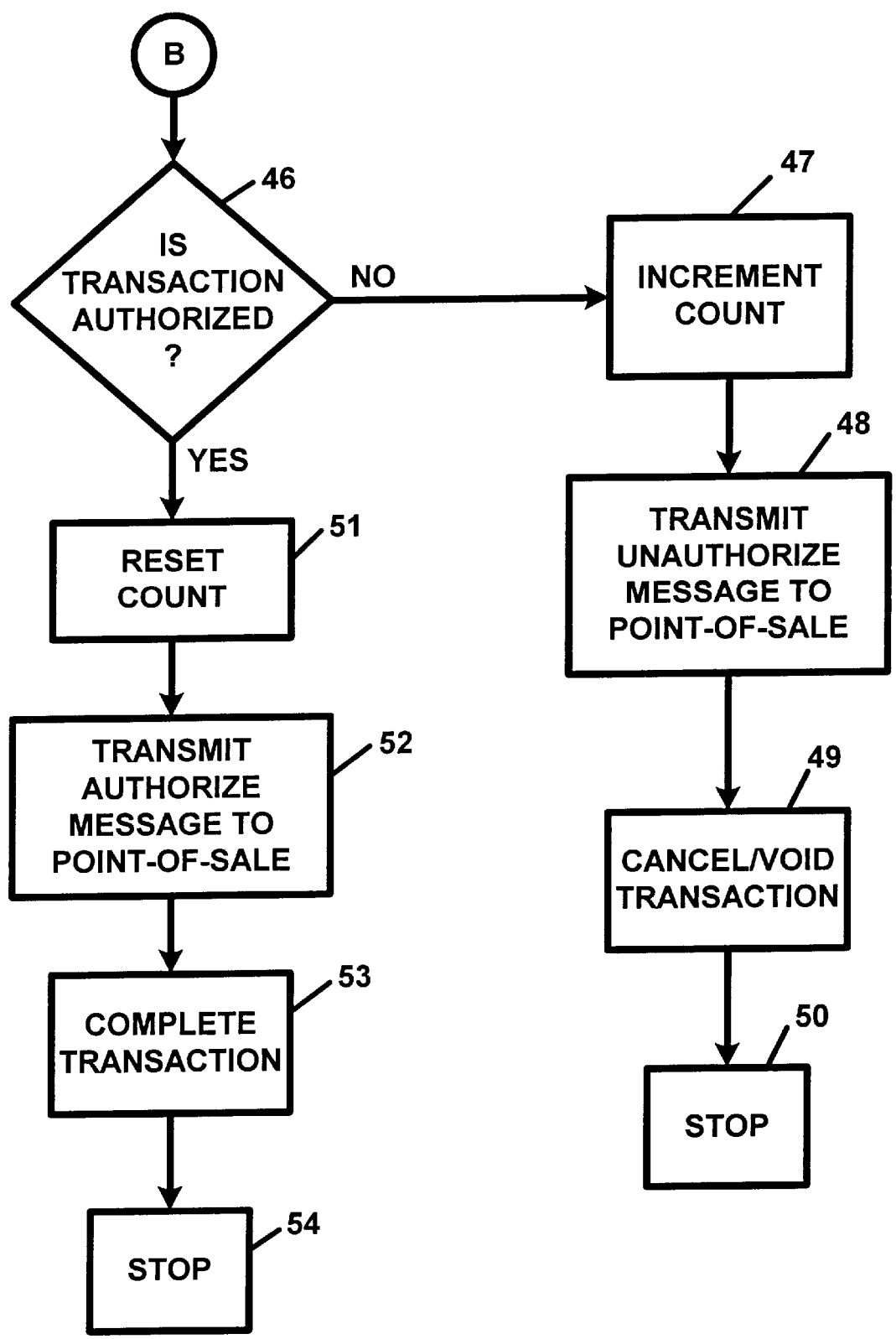

FIGS. 3A, 3B and 3C illustrate the operation of the apparatus 1 in flow diagram form. With reference to FIGS. 3A, 3B and 3C, the operation of the apparatus 1 commences at step 30 when the card, which is to be utilized in a credit card, charge card, debit card, and/or currency card, electronic currency card and/or "smart" card transaction, is presented in the transaction. At step 31, the sales or service attendant or point-of-sale device operator will activate the apparatus 1 in any typical manner, such as by obtaining a phone line and entering card information into the point-of-sale device 2. This data entry is typically performed by swiping the magnetic strip of the card through the card reader 2B. The information and/or data pertinent to the transaction, and/or the card, is then transmitted, at step 32, to the central processing computer 3.

The central processing computer 3 will, at step 33, process the information and/or data pertinent to the transaction and/or to the particular card account and may request, if needed, that the point-of-sale operator enter the transaction amount. The central processing computer 3 will then process the information and/or data pertinent to the transaction in conjunction with the card account information in order to determine if the card has been lost, stolen and/or cancelled and/or de-activated. Further, the central processing computer 3 will perform a test to determine if the card has reached and/or exceeded the maximum credit, charge or debit limit and/or if the card has been depleted of its currency value.

The central processing computer 3 may utilize any of the widely known data processing and/or software routines, which are known to those skilled in that art, in order to process transaction requests and/or authorizations involving the use of the respective card(s). Once the information and/or data processing has been completed at step 33, the central processing computer 3, at step 34, will determine if the card has been lost, stolen, and/or cancelled and/or de-activated, or if the credit, charge or debit limit of the card has been reached and/or exceeded, or if the currency value of the card has been depleted.

The central processing computer 3 will, at step 34, also perform a test in order to determine if the predetermined maximum number of unauthorized transactions have occurred on the account. The unauthorized transactions count refers to transactions which are not authorized by the cardholder as will be described herein. The authorized transaction count (UNAUTHCT) is a variable which is pre-set to zero (0) at the time the card account is issued. Each time an unauthorized transaction occurs, the unauthorized transaction count is incremented by one (1). Once the unauthorized transaction count reaches a pre-defined limit of, for example, three (3), the central processing computer 3 will cancel the transaction and de-activate the card. The central processing computer 3 will then notify the cardholder. In this manner, the apparatus 1 will enable the central processing computer 3 of an issuing and/or card servicing institution to cancel and/or de-activate the card, either permanently and/or temporarily, in cases when the cardholder may have failed to respond or to reply to transaction notices, which may be the case when the cardholder is not aware that the card has been lost or stolen, or when the card or account number has been duplicated, "cloned", or in other ways utilized without the cardholder's authorization, and/or when the cardholder is unable to respond or reply to the transaction notices for some other reason(s). This feature of the present invention serves to put a usage limit on the use of the card(s). The central processing computer 3, at step 34, will also perform a test(s) to determine if any additional limitations and/or restrictions have been met and/or satisfied.

If any of the above listed conditions exist (i.e. card is lost, stolen, cancelled and/or de-activated, or credit, charge or debit limit is reached and/or exceeded, currency value depleted, unauthorized transaction limit reached or exceeded limitations and/or restrictions violated, etc.), the central processing computer 3 will, at step 35, transmit a signal to the point-of-sale device 2 indicating that the transaction is not approved and/or is not authorized. The point-of-sale device operator may then cancel the transaction, at step 36. The point-of-sale device operator may then confiscate the card and/or alert the authorities. Upon the completion of step 36, the apparatus will cease operation at step 55.

If, at step 34, the central processing computer 3 determines that the card is not lost, stolen, cancelled or de-activated, or that the credit, charge or debit limit of the card has not been reached or exceeded, or that the of unauthorized transactions count (UNAUTHCT) has not reached a pre-defined limit, or whether any other pre-defined, pre-selected and/or programmed limitation(s) and/or restriction(s) have been met, have been satisfied and/or have been reconciled, the central processing computer 3 will, at step 37, transmit a signal and/or data to the communication device 4 which is located at the cardholder.

At step 37, the central processing computer 3 will then also transmit respective signals and/or data to any one or more of the cardholder's designated fax machine 5, personal computer or personal digital assistant 6, telephone 7, telephone answering machine 8, alternate telephone 9, alternate telephone answering machine 10, network computer 11, and/or alternate beeper 12 or alternate pager 13.

The information and/or data which is transmitted to the communication device 4 includes information and/or data identifying the transaction and may include the name of the store or the service provider and the amount of the transaction. The information and/or data may also provide the time of the transaction, the location (i.e. city, town, village, state, country etc.) of the transaction. The information and/or data may also include the phone number of the central processing office and/or computer servicing the account so that the cardholder may telephone same in order to authorize or cancel the transaction. The information and/or data may also be supplemented to include the type of goods and/or services involved in the transaction, if such information can be entered at the point-of-sale device 2.

At step 38, the information and/or data which is transmitted from the central processing computer 3 and received at the communication device 4 is displayed to the cardholder on the display device 4E of the communication device 4. The information displayed on the display device 4E includes the name of the store or the service provider, the amount of the transaction, the time of the transaction and the location of the transaction. The information and/or data may also be supplemented to include the type of goods and/or services involved in the transaction, if such information can be entered at the point-of-sale device 2.

The apparatus 1 will then, at step 39, wait for the cardholder to respond to the transmission. During this time, the cardholder may either utilize the reply or two-way pager feature on the communication device 4 in order to either approve or authorize the transaction or disapprove of or void the transaction. At step 39, the central processing computer 3 will also receive the response if one is sent. At step 40, the apparatus 1 will determine if the cardholder has made a reply or response within the pre-defined time limit which is chosen, in the preferred embodiment, to be one (1) minute. The cardholder may also transmit a signal via an appropriate key or button suspending use of the card such as when he or she may first be apprised of the fact that the card has been lost or stolen. In instances when the communication device 4 does not have a reply or two-way pager feature, the cardholder may simply telephone the central processing office or a processing center for the card in order to personally appraise the center or office of his or her response to the central processing computer transmission regarding the transaction.

If the cardholder does not respond or reply to the central processing office within the pre-specified time, chosen, in the preferred embodiment, to be one (1) minute, the central office computer will, at step 41, increment the unauthorized transaction count (UNAUTHCT) by one (1) and will, at step 42, transmit a signal and/or data to the point-of-sale device 2 indicating that, with the exception of receiving the authorization of the cardholder, the transaction is otherwise approved. The point-of-sale device operator may then, at step 43, either proceed to consummate the transaction, try to obtain additional information from the purchaser, or cancel the transaction. The action taken by the point-of-sale device operator may be dictated by the specific agreement in effect between the sales and/or service provider establishment and the bank or financial institution administering the card account. Upon the completion of step 43, the operation of the apparatus 1 will cease at step 44. If the cardholder should reply or respond to the transaction notice at a later period, the response or reply information may then be utilized in order to approve of, or to disapprove and/or to dispute, the transaction.

If, at step 40, the response or reply is determined to be timely, the central processing computer 3 will, at step 45, process and identify the cardholder response. At step 46, the central processing computer 3 will determine if the cardholder has replied or responded so as to authorize the transaction. If the cardholder's response is to cancel, disapprove or, or not to authorize, the transaction, the central processing computer 3 will, at step 47, increment an unauthorized transaction count by 1. At this juncture, it is important to note that the unauthorized count (UNAUTHCT) is set to zero at the time of the issuance of the card. After the unauthorized transaction count has been incremented, the central processing computer 3 will, at step 48, transmit a signal and/or data to the point-of-sale device 2 which will notify and/or instruct the point-of-sale device operator that the transaction is not authorized and should, therefore, be cancelled or voided. The point-of-sale device operator may then cancel the transaction at step 49. The point-of-sale device operator may then confiscate the card and/or alert the authorities. Upon the completion of step 49, the apparatus will cease operation at step 50.

If, at step 46, the central processing computer 3 identifies the cardholder reply or response as being one to authorize the transaction, the central processing computer 3, at step 51, will reset the unauthorized transaction count (UNAUTHCT) to 0. An unauthorized transaction count (UNAUTHCT) of 0 will signify that any string of unauthorized transactions has now been broken by the cardholder, and further, that the present transaction is approved by the cardholder. The central processing computer 3 will then, at step 52, transmit a signal and/or data to the point-of-sale device 2 which will notify and/or instruct the point-of-sale device operator that the transaction is authorized and/or approved.

The point-of-sale device operator may then complete the transaction, at step 53. After the transaction has been completed at step 53, the operation of the apparatus 1 will cease at step 54.

In instances when the cardholder is a party to the transaction, he or she, having the communication device 4 on his or her person, may authorize the transaction at the point-of-sale location. If the transaction is a telephone and/or other remotely made transaction, the cardholder may authorize the transaction from his or her remote location. The cardholder may also program and/or set the communication device 4 to automatically authorize or disapprove or disallow transactions. In this regard, the communication device 4 may be programmable so as to receive and analyze the transaction information and/or data and reply and/or respond to same automatically and/or with preset and/or programmed relies and/or responses. The communication device 4 may also be programmable so as to limit the amounts of transactions. In this regard, the cardholder may provide for temporary transaction and/or purchasing amounts.

The communication device 4, in the preferred embodiment, is provided with a memory device for storing any number of transactions so that the cardholder may review his or her card and/or account activity and/or transactions which have occurred involving his or her card. In this manner, the cardholder may "scroll" through and/or in other ways review card and/or account activity. The communication device 4 may also be equipped to service more than one card. For example, a cardholder's MASTERCARD®, VISA®, and/or AMERICAN EXPRESS® card or cards and the accounts corresponding thereto may all be serviced with or by a single communication device 4.

The apparatus and method of the present invention provides for the real-time notification of financial transactions involving credit cards, charge cards, debit cards, and/or currency cards, electronic currency cards, "smart" cards and/or telephone account cards which enables a cardholder to monitor, in real-time, activity involving his or her card(s) and the corresponding accounts. The apparatus and method of the present invention also provides a means and a mechanism by which to inform a cardholder that his or her card(s) are lost or stolen, and/or that his or her card(s), and/or the account numbers corresponding thereto, are utilized without his or her authorization and also provides an indication to the cardholder of where his or her card(s) or corresponding account number(s) is being utilized in transactions. The cardholder may then report the card lost or stolen and/or cancel and/or de-activate the card and/or the account.

The present invention also provides a means and a mechanism by which to monitor the number of transactions which are unauthorized by the cardholder and to determine whether or not to authorize transactions and/or cancel or de-activate the card(s) and/or the account. In the above manner, the apparatus and method of the present invention provides an apparatus and a method for preventing and/or for drastically limiting fraudulent and/or unauthorized use of credit cards, charge cards, debit cards, and/or currency or "smart" cards and/or the account numbers corresponding thereto.

The present invention, in an alternate embodiment, may be utilized so as to provide authorization, notification and/or security in banking and related financial transactions involving checking accounts, savings accounts and/or automated teller machine (ATM) accounts and transactions and other transactions wherein an account owner may be notified of a transaction and/or an attempted transaction.

Figure 4:
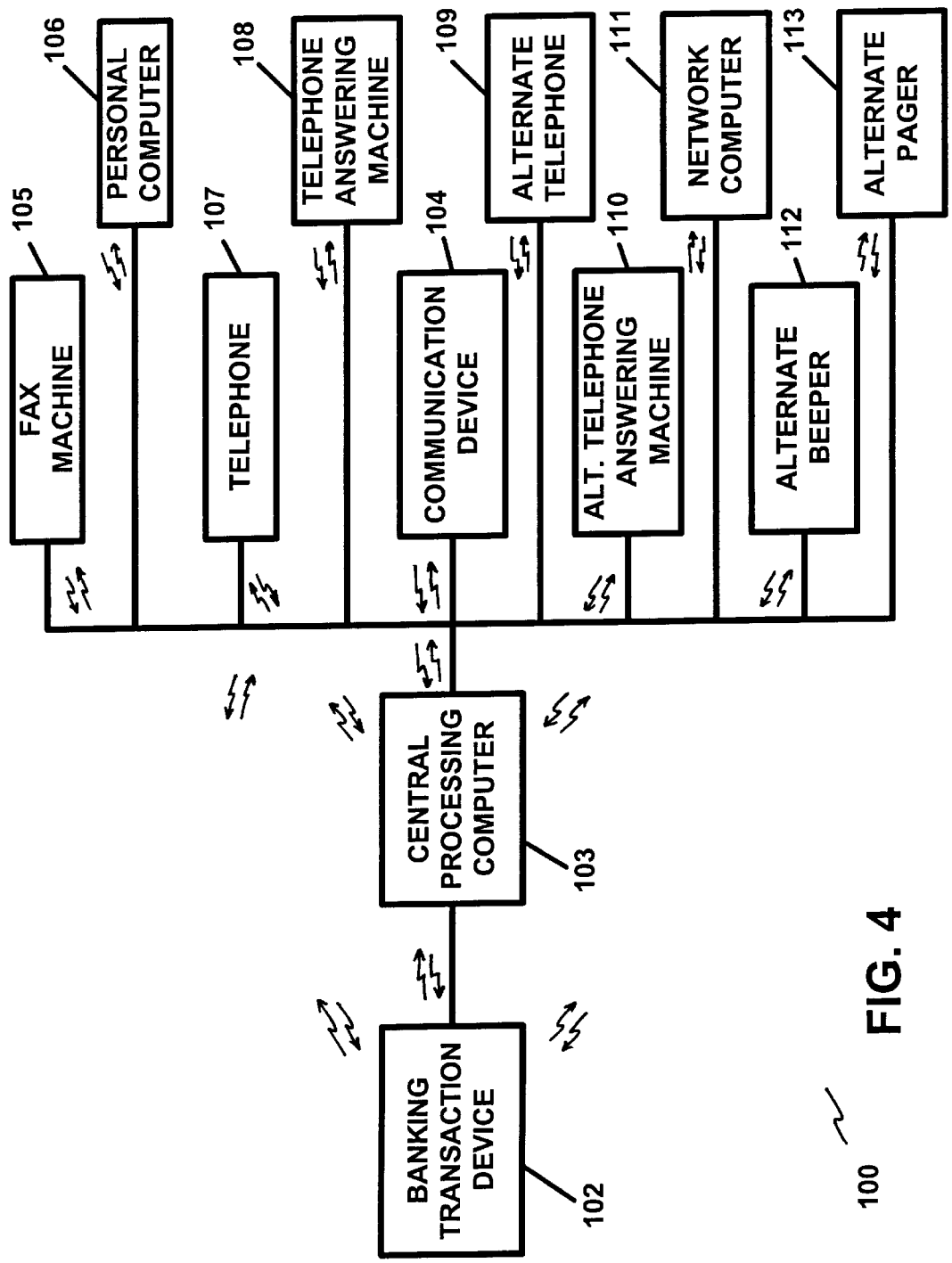
FIG. 4 illustrates a block diagram of an alternate embodiment of the apparatus of the present invention which is utilized in conjunction with a checking account, a savings account and/or an automated teller machine transaction.

FIG. 4 illustrates a block diagram of an alternate embodiment of the apparatus of the present invention which is utilized in conjunction with a checking account, savings account and/or ATM account and/or transaction (hereinafter referred to as a "banking transaction") and/or the authorization process involved therewith. The apparatus of FIG. 4 is denoted generally by the reference numeral 100. In FIG. 4, the apparatus 100 consists of a banking transaction device which devices or terminals are found in banks and financial establishments. In the preferred embodiment, the banking transaction device 102 is a teller device, a processing computer device or terminal and/or an ATM terminal. Any other device or similar device may also be utilized as the banking transaction device 102 depending upon the application and/or the transaction.

The banking transaction device 102 (hereinafter referred to as "banking device") may be any of the widely used and well known devices, terminals or computers for providing banking transactions over-the-counter, ATM transactions and/or in any other type of financial transactions, including clearing transactions, check clearing and/or account charging and/or charge-back transactions, which transactions banks and financial institutions perform and/or engage in.

Typically, the banking devices and/or terminals comprise a computer terminal having an input device such as a keyboard and/or various reader and/or scanning device for reading and/or scanning, respectively, information and/or data necessary in order to perform the transaction. The banking device 102 transmits an authorization request which may include the data pertaining to the particular account which is accessed and/or involved in the transaction and the type and the amount of the transaction, over a communications medium, to a central processing computer for processing the transaction, the transaction request and/or the authorization request pertaining thereto. The banking device 102 may transmit the transaction authorization request and/or notice to a central processing computer via a central bank computer (not shown) which may be a central computer at the particular bank or financial institution. The central processing computer may also be a central computer system which is not located at the bank or financial institution, but rather, services the particular bank or financial institution or a group of banks or financial institutions.

The banking device 102 also receives the transaction and/or authorization data and/or information from the central processing computer. If a central bank computer is utilized, the data transmitted from the central processing computer would be transmitted to the banking device 102 via the central bank computer. A printed transaction receipt may also be provided at and/or obtained via the banking device 102, or peripheral device associated therewith, for printing a transaction receipt which is usually provided to the account holder at the time and/or location of the transaction.

The banking device 102 may also comprise, and/or have associated therewith, a keypad for the manual entry of transaction information and/or data, such as the amount of the transaction, account number, etc. The banking device 102 may also be an integral component of a teller and/or cashier work station and/or other transaction terminals and/or devices, including those which may provide for the automatic entry of transaction information and/or data.

The apparatus 100 also comprises a central processing computer 103 which services any bank and/or financial institution and/or any pre-defined group of banks and/or financial institutions and/or any number of accounts associated therewith. For example, the central processing computer 103 may handle all checking accounts, savings accounts and/or other accounts for a given bank or banks. The central processing computer 103, for example, may process and maintain records of deposits, withdrawals, checks cashed, drafts, ATM deposits, ATM withdrawals, charges made against an account, credits made to an account, etc., and/or any combinations of same. The central processing computer 103 may process accounts for any of the various banks and/or financial institutions.

In the preferred embodiment, the banking device 102 is linked and/or connected to the central processing computer 103 via a telecommunications system, link and/or medium (hereinafter referred to as "communications system") such as, for example, a telephone network or line. As noted above, the banking device 102 may or may not be linked to the central processing computer 103 via a central bank computer. It is important to note that the communications system which is utilized may be any communications system and may include telecommunication systems, satellite communications systems, radio communication systems, digital communications systems, digital satellite communications systems, personal communications services communication systems, cable television systems, broadband communication systems, as well as any other appropriate communications system. The banking device 102 transmits signals and/or data to the central processing computer 103 as well as receives signals and/or data from the central processing computer 103.

The central processing computer 103 may be a mainframe computer, a mini-computer, a micro-computer, a server computer, such as those utilized in conjunction with on-line services and/or in a network environment, and/or any other suitable computer or computer system.

The apparatus 100 also comprises an account owner communication device 104 which may receive signals and/or data from either or both of the banking transaction device 102 and/or the central processing computer 103. In the preferred embodiment of FIG. 4, the communication device 104 receives signals and/or data from the central processing computer 103 with said signals being transmitted via a suitable communication system. In the preferred embodiment, the communications system utilized for transmitting signals and/or data to the communication device 104 is a wireless telephone line and the communication device 104 is a wireless telephone signal receiving device such as a telephone beeper or pager. The communication device 104, which may be a pager, receives the wireless telephone signals and/or data from the central processing computer 103 during the authorization procedure as will be described in more detail below.

In the preferred embodiment, the communication device 104 is also equipped with a transmitter for transmitting signals and/or data to the central processing computer 103. In this regard, the central processing computer 103 transmits signals and/or data to the communication device 104 as well as receives signals and/or data from the communication device 104. The communication device 104 may also transmit signals and/or data directly to the banking device 102 and receive signals and/or data directly from the banking device 102. In the preferred embodiment, the banking device 102 transmits signals and/or data to the central processing computer 103 and receives signals and/or data from the central processing computer 103. Further, in the preferred embodiment, the communication device 104 receives signals and/or data from the central processing computer 3 and transmits signals and/or data to the central processing computer 103.

As noted above, the communication device 104 is a wireless device. In this regard, the communication device 104 or pager may be carried by the account owner and/or be kept on and/or close to the account owner's person so that the central processing computer 103 may transmit signals and/or data to the communication device 104 so as to communication with the account owner at any time.

In the preferred embodiment, the apparatus 100 also comprises a facsimile (fax) machine 105, a personal computer or personal digital assistant 106, a telephone 107, a telephone answering machine 108, an alternate telephone 109, an alternate telephone answering machine 110, a network computer 111, and/or an alternate beeper 112 or alternate pager 113. The central processing computer 103 may be linked with the above fax machine 105, personal computer or personal digital assistant 106, telephone 107, associated answering machine 108, alternate telephone 109, alternate telephone answering machine 110, network computer 111 alternate beeper 112 and alternate pager 113, via any suitable communication system. In the preferred embodiment, a telecommunications link or telephone line or link, which may or may not be a wireless link, depending on the device and/or the circumstances, is utilized in order to link the central processing computer 103 with each of the fax machine 105, the personal computer or personal digital assistant 106, the telephone 107, the associated answering machine 108, the alternate telephone 109, the alternate telephone answering machine 110, the network computer 111, the alternate beeper 112 and the alternate pager 113.

Figure 5:
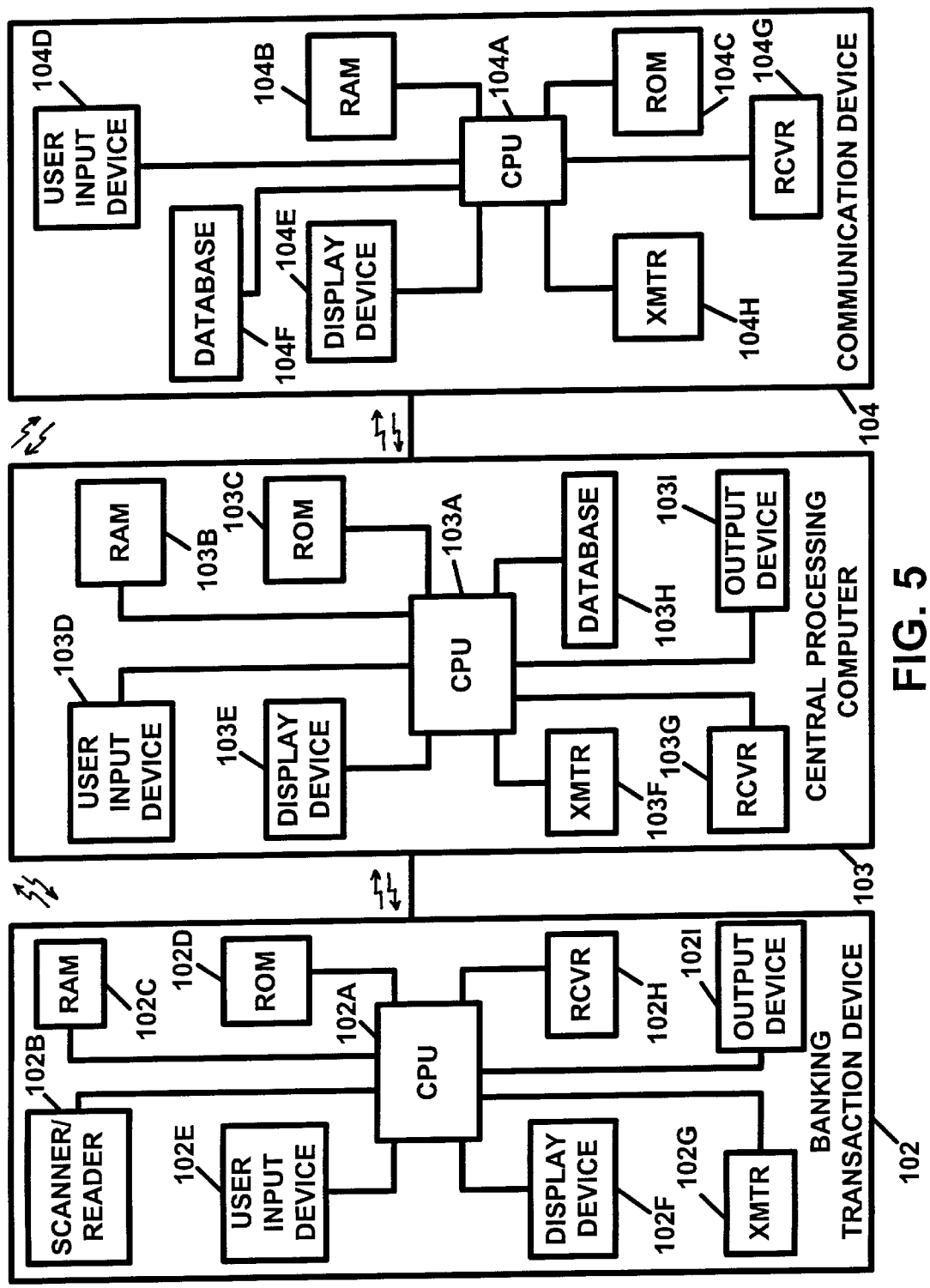
FIG. 5 illustrates the various components of the apparatus of FIG. 4.

FIG. 5 illustrates the various components of the apparatus 100 of FIG. 4. In FIG. 5, the banking device 102, in the preferred embodiment, comprises a central processing unit or CPU 102A, a scanner or reader 102B, which is connected to the CPU 102A, associated random access memory 102C (RAM) and read only memory 102D (ROM) devices, which are also connected to the CPU 102A, a user input device 102E, which is typically a keypad or other suitable input device for inputting data into the banking device 102 and which is also connected to the CPU 102A, and a display device 102F for displaying information and/or data to a user or operator, which display device 102F is also connected to the CPU 102A.

The banking device 102 also comprises a transmitter 102G for transmitting signals and/or data to the central processing computer 103, and/or to the communication device 104 and/or to any other device associated with the account owner and/or the apparatus, if desired. The transmitter 102G is also connected to the CPU 102A. The banking device 102 also comprises a receiver 102H for receiving signals and/or data from the central processing computer 103, and from the communication device 104 and/or from any other associated device which may be utilized, if desired. The receiver 102H is also connected to the CPU 102A. The banking device 102 also comprises a printer 102I or other appropriate output device for outputting data to the operator. The printer 102I is also connected to the CPU 102A. In the preferred embodiment, the printer 102I prints receipts corresponding to the transaction.

In FIG. 5, the central processing computer 103, in the preferred embodiment, comprises a central processing unit or CPU 103A, associated random access memory 103B (RAM) and read only memory 103C (ROM) devices, which are connected to the CPU 103A, a user input device 103D, which is a keypad or any other suitable input device, for inputting data into the central processing computer 103 and which is also connected to the CPU 103A, and a display device 103E for displaying information and/or data to a user or operator.

The central processing computer 103 also comprises a transmitter(s) 103F for transmitting signals and/or data to the banking device 102 and to the communication device 104 and/or to any one or more of the fax machine 105, the personal computer or personal digital assistant 106, the telephone 107, the telephone answering machine 108, the alternate telephone 109, the alternate telephone answering machine 110, the network computer 111, the alternate beeper 112, and/or the alternate pager 113. The transmitter(s) 103F is also connected to the CPU 103A. The central processing computer 103 also comprises a receiver(s) 103G for receiving signals and/or data from the banking transaction device 102 and from the communication device 104 and/or from any other suitable device which may be utilized in conjunction with the apparatus 100. The receiver(s) 103G is also connected to the CPU 103A.

The central processing computer 103 also comprises a database(s) 103H which contains account information and data pertaining to the account owner's account(s). The database 103H contains information about the account owner, the account number, etc., and any other information and/or data necessary to the manage and/or process an account and/or account transaction as described herein. The database 103H is also connected to the CPU 103A. The central processing computer 103 also comprises a printer 103I or other appropriate output device for outputting information and/or data to a user or operator, which printer 103I or other output device is also connected to the CPU 103A.

In FIG. 5, the communication device 104, in the preferred embodiment, comprises a central processing unit or CPU 104A, associated random access memory 104B (RAM) and read only memory 104C (ROM) devices, which are also connected to the CPU 104A, a user input device 104D, which is a keypad or a plurality of keys and/or switches for inputting data into the communication device 104 and which is also connected to the CPU 104A, and a display device 104E, for displaying information and/or data to the account owner, and a database 104F. This display device 104E and the database 104F are also connected to the CPU 104A. The communication device 104 also comprises a receiver 104G for receiving signals and/or data from the central processing computer 103 and which is also connected to the CPU 104A, and a transmitter 104H for transmitting signals and/or data to the central processing computer 103 and which is also connected to the CPU 104A.

In the preferred embodiment, the communication device 104, which is utilized, is a pager with a reply feature and/or device. A two-way pager and/or pager system(s) may also be utilized for implementing the respective component systems in the communication device 104/central processing computer 103 combination and/or link.

The apparatus 100 of the present invention, in the preferred embodiment, may be utilized in order to facilitate account owner authorization, notification and/or security, in financial transactions involving checking accounts, savings accounts and Electronic money accounts, electronic cash accounts, ATM accounts, and/or any transactions involving same in the manner described below and with reference to FIGS. 6A, 6B and 6C. In this manner, the apparatus and method of the present invention may be utilized to obtain account owner authorization in a banking and/or financial transaction.

The apparatus 100 can be utilized in conjunction with an account card or cards which correspond to, or which are associated with, banking and/or financial accounts.

Figure 6A:
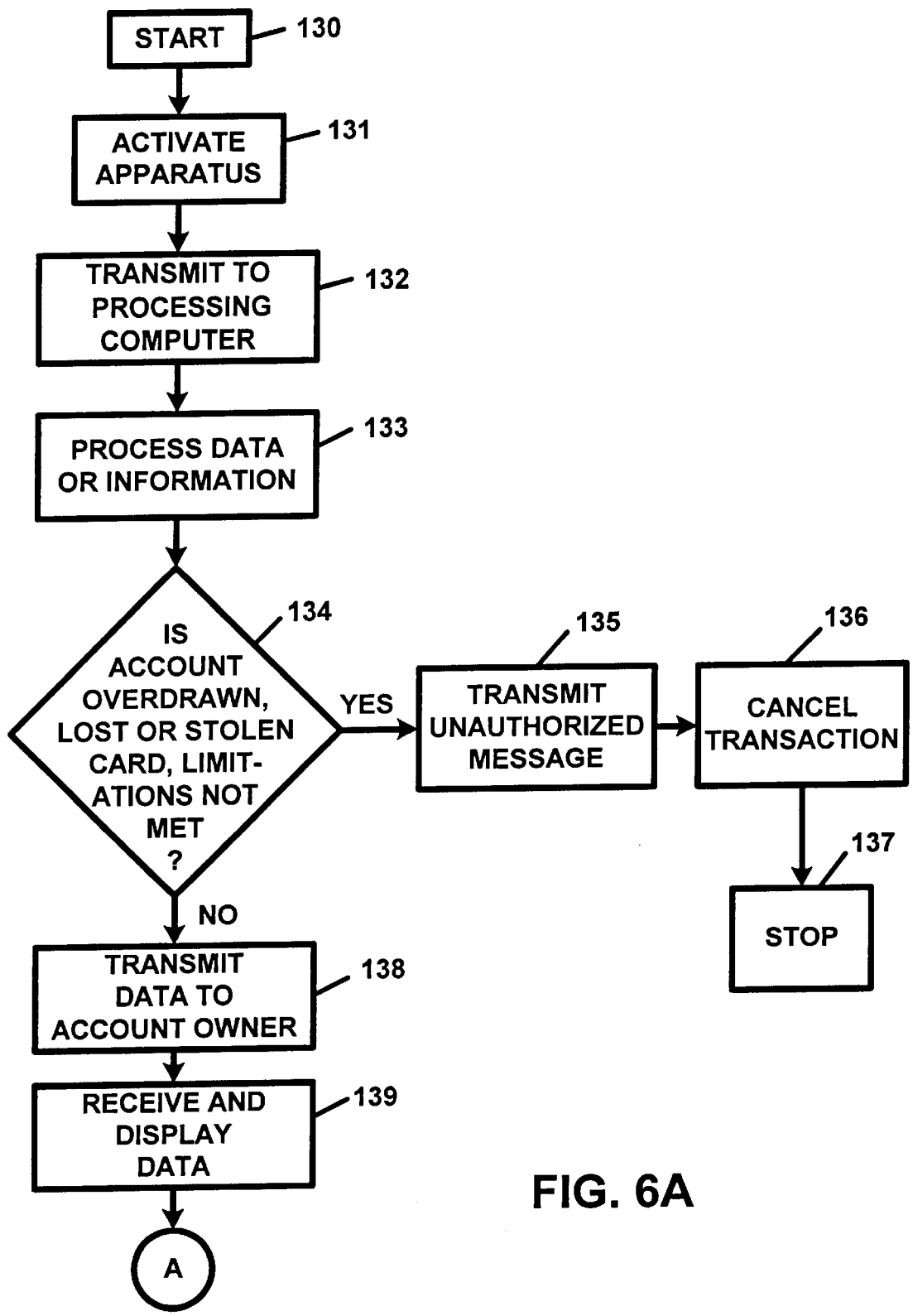
FIGS. 6A, 6B and 6C illustrate the operation of the apparatus of FIG. 4 in flow diagram form.
Figure 6B:
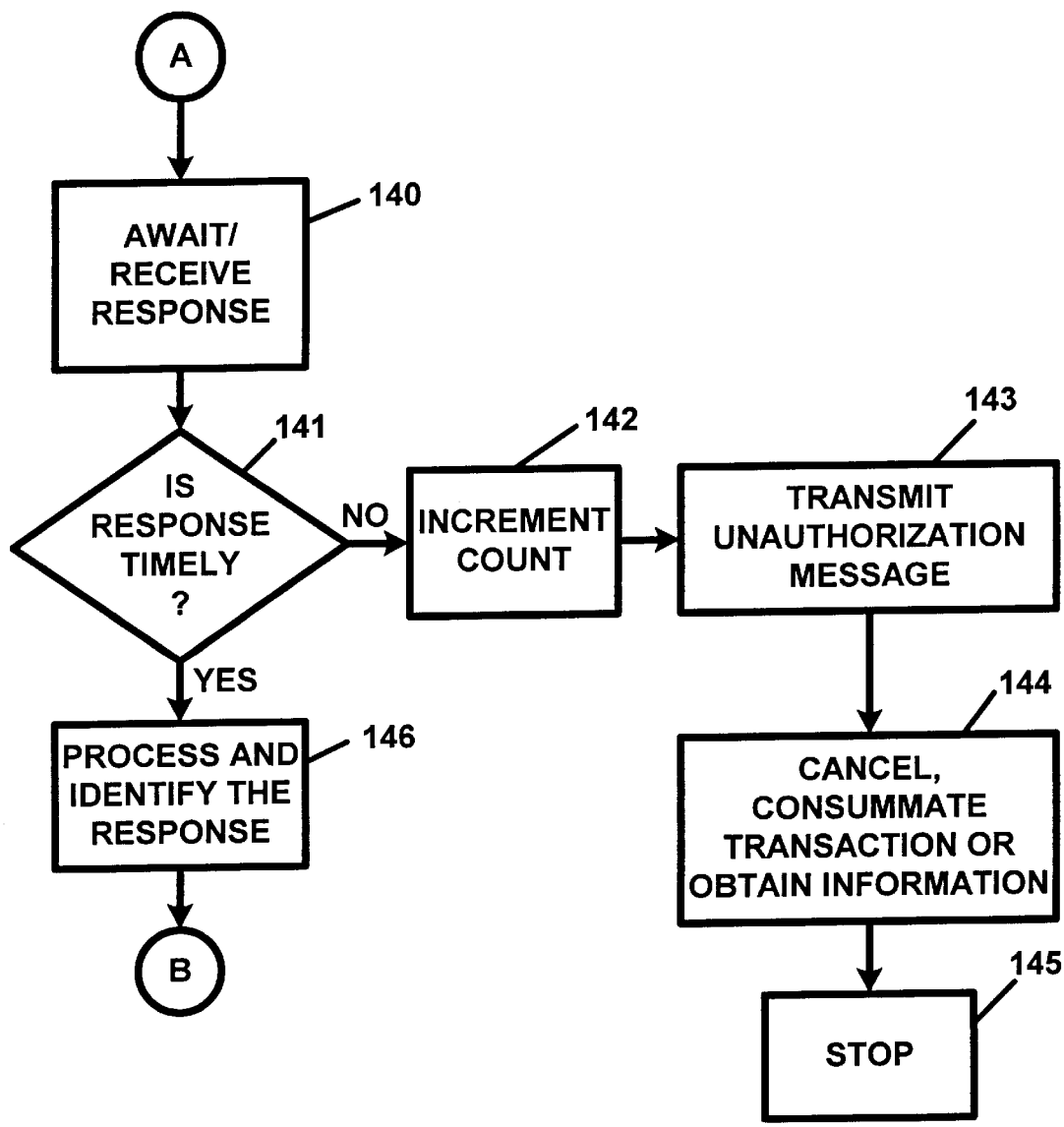
Figure 6C:
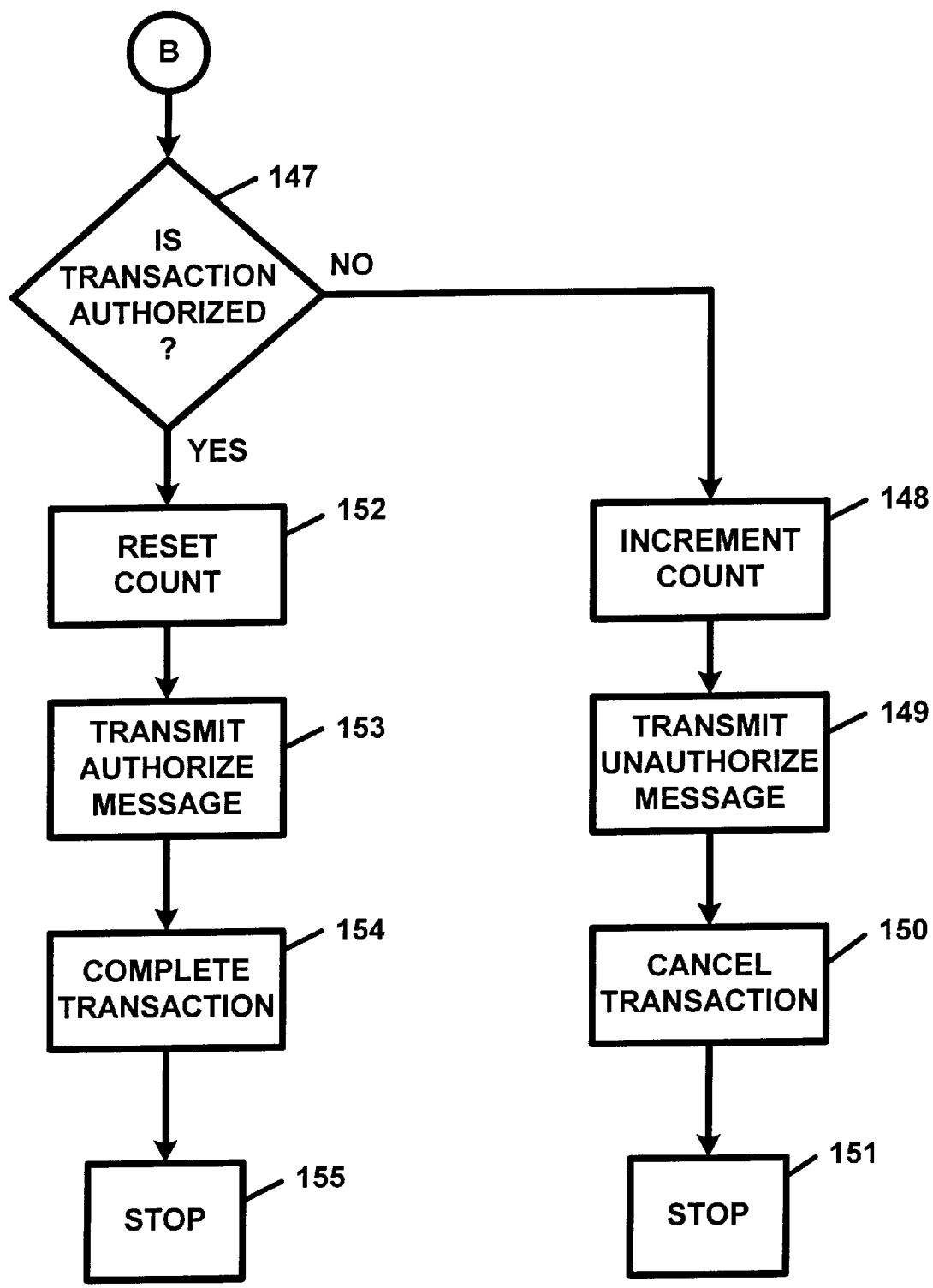

FIGS. 6A, 6B and 6C illustrate the operation of the apparatus 100 in flow diagram form. With reference to FIGS. 6A, 6B and 6C, the operation of the apparatus 100 commences at step 130 when the financial transaction and/or instrument or ATM card is presented to the bank or financial institution employee, representative and/or placed in a card reader, respectively. At step 131, the employee or representative of the bank or financial institution will activate the apparatus, via the banking transaction device 102, in any typical manner, such as by entering account and/or card information, into the banking transaction device 102. This data entry is typically performed by manual data entry and/or via a card reader, depending upon the transaction. For example, if a person offers a check for cashing and provides a savings account or a checking account number, as the means by which to endorse the check, the employee or representative will enter the savings account or checking account number into the banking device 102 for processing. Similarly, if one desires to withdraw money from an ATM account, the card reader will read and enter the account number and/or information for processing. The information and/or data pertinent to the transaction and the card is then transmitted, at step 132, to the central processing computer 103.

The central processing computer 103 will then, at step 133, process the information and/or data pertinent to the transaction and to the particular account. The central processing computer 103 may utilize any of the widely known data processing and/or software routines, which are known to those skilled in that art, in order to process transaction requests and/or authorizations involving the use of the respective account(s) and/or related card(s).

The central processing computer 103 will process the information and/or data pertinent to the transaction in conjunction with the account information in order to determine the status of the account (i.e. whether any holds have been placed on the account, such as those prohibiting withdrawals). Further, the central processing computer 103 will then perform a test, at step 134, in order to determine if the transaction amount has reached and/or exceeded the amount available in the account and/or if the ATM card has been reported lost, stolen, cancelled and/or de-activated, and/or determine whether any other pre-defined, pre-selected and/or programmed limitation(s) and/or restriction (s) have been met, satisfied and/or reconciled. The central processing computer 103 will also perform a test in order to determine if the predetermined maximum number count of unauthorized transactions, pre-defined in the preferred embodiment to be one (1), has occurred on the account.

The unauthorized transaction count refers to a count of the transactions which are not authorized by the account owner as will be described herein. The authorized transaction count (UNAUTHCT) is a variable which is pre-set to zero (0) at the time the account is opened. Each time an unauthorized transaction occurs, the unauthorized transaction count is incremented by one. Once the unauthorized transaction count reaches a pre-defined limit of, for example, one (1), although it may be pre-defined to be zero (0), the central processing computer 103 will cancel the transaction and de-activate the account and/or the ATM card. The central processing computer 103 will then notify the account owner. In this manner, the apparatus 100 will enable the central processing computer 103 of a banking and/or financial institution to cancel and/or de-activate the account and/or the ATM card, either permanently or temporarily, in cases when the account owner may have failed to respond or to reply to transaction notices, which may be the case when the account owner is not aware that the account has been charged, overdrawn, and/or that the ATM card has been lost or stolen, cancelled or de-activated, duplicated, "cloned", or in other ways utilized without the account owner's knowledge or authorization, or when the account owner is unable to respond or reply to the transaction notices for some other reason(s). This feature of the present invention serves to place a transaction stop limit on the account and/or on the use of the ATM card.

If any of the above listed conditions exist (i.e. account overdrawn and/or ATM card is lost, stolen, cancelled and/or de-activated), the central processing computer 103 will, at step 135, transmit a signal to the banking transaction device 102 indicating that the transaction is not approved and/or is not authorized. The banking device operator, or employee, or representative, may then cancel the transaction at step 136. The employee or representative may then alert the authorities and/or confiscate the ATM card. In the case when an ATM machine is utilized as the banking device 102, the ATM machine may confiscate the ATM card automatically. Upon the completion of step 136, the apparatus will cease operation at step 137.

If, at step 134, the central processing computer 103 determines that the account is not overdrawn or that the ATM card is not lost, stolen, cancelled or de-activated, or that the of unauthorized transactions count (UNAUTHCT) has not reached a predefined limit, and/or that pre-defined or pre-specified limitations and/or restrictions have been met, the central processing computer 103 will, at step 138, transmit a signal and/or data to the communication device 104 which is located at the account owner.

At step 138, the central processing computer 103 will then also transmit respective signals and/or data to any one or more of the cardholder's designated fax machine 105, personal computer or personal digital assistant 106, telephone 107, telephone answering machine 108, alternate telephone 109, alternate telephone answering machine 110, network computer 111, and/or alternate beeper 112 or alternate pager 113.

The information and/or data transmitted to the communication device 104 includes information and data identifying the transaction and may include the name of the bank or financial institution where the transaction is taking place, the account number and/or description, the amount of the transaction, the time of the transaction and the location (i.e. city, town, village, state, country etc.) of the transaction. The information and/or data may also include the phone number of the central processing office and/or computer servicing, and/or the banking and/or financial institution handling, the account so that the account owner may telephone same in order to authorize or cancel the transaction. The information and/or data may also be supplemented to include a description of the person seeking to make the transaction and the type of transaction sought (i.e. cash withdrawal, cashing of check, etc.).

At step 139, the information and/or data which is transmitted from the central processing computer 103, and received at the communication device 104, is displayed to the account owner on the display device 104E of the communication device 104. The information displayed on the display device 104 includes the name of the banking and/or financial institution, the amount of the transaction, the time of the transaction and the location of the transaction. The information and/or data may also include the type of transaction and a description of the person seeking to make the transaction, etc.

The apparatus 100, at step 140, will then wait for the account owner to respond to the transmission. During this time, the account owner may either utilize the reply or two-way pager feature on the communication device 104 in order to either approve or authorize the transaction or disapprove of, or void, the transaction. At step 140, the apparatus 100 will receive the reply or response from the account owner. At step 141, the central processing computer 103 will determine if the account owner has made a reply or response within the pre-defined time limit which is chosen, in the preferred embodiment, to be one (1) minute. The account owner may also transmit a signal via an appropriate key or button suspending use of the account or ATM card, such as when he or she may first be apprised of the fact that the account is being unlawfully accessed, or the use thereof is unauthorized, or that the ATM card has been lost or stolen.

In instances when the communication device 104 does not have a reply or two-way pager feature, the account owner may simply telephone the central processing office or processing center and/or the banking or financial institution so as to personally reply or respond to the authorization request.

If, at step 141, it is determined that the account owner's reply or response was not made within the pre-specified time, chosen in the preferred embodiment to be one (1) minute, the central processing computer 103 will, at step 142, increment the unauthorized transaction count (UNAUTHCT) by one (1) and will, at step 143, transmit a signal and/or data to the banking transaction device 102 indicating that the transaction is not authorized by the account owner. The banking device operator may then, at step 144, either cancel the transaction, proceed to consummate the transaction, and/or attempt to obtain additional information or identification from the customer and/or obtain an alternate account number from which to draw against.

The action taken by the banking transaction device operator may be dictated by the specific agreement in effect between the account owner and the bank or financial institution administering the accounts. Upon the completion of step 144, the operation of the apparatus will cease at step 145. If the account owner should reply or respond to the transaction notice at a later period, this information may then be utilized to approve of or to disapprove and/or to dispute the transaction.

If, at step 141, it is determined that the reply or response was timely, the central processing computer 103 will, at step 146, process and identify the account owner response. At step 147, the central processing computer 103 will determine if the account owner has authorized the transaction. If the account owner's response is to cancel, to disapprove, or to not authorize, the transaction, the central processing computer 103 will, at step 148, increment the unauthorized transaction count (UNAUTHCT) by 1. At this juncture, it is important to note that the unauthorized count (UNAUTHCT) is set to zero at the time of the opening of the account.

After the unauthorized transaction count has been incremented, the central processing computer 103 will, at step 149, transmit a signal and/or data to the banking device 102 which will notify and/or instruct the banking device operator that the transaction is not authorized and should, therefore, be cancelled or voided. The banking device operator may then cancel the transaction at step 150. The banking transaction device operator or the ATM machine may then confiscate the ATM card and/or alert the authorities. Upon the completion of step 150, the apparatus will cease operation at step 151.

If, at step 147, the central processing computer 103 identifies the account owner's reply or response as being one to authorize the transaction, the central processing computer 103 will, at step 151, reset the unauthorized transaction count (UNAUTHCT) to zero (0). The central processing computer 103 will then, at step 153, transmit a signal and/or data to the banking device 102 which will notify and/or instruct the banking device operator, and/or the ATM machine, that the transaction is authorized and/or approved.

The banking device operator, and/or the ATM machine, may then complete the transaction, at step 154. After the transaction has been completed at step 154, the operation of the apparatus 100 will cease at step 155.

In instances when the account owner is a party to the transaction, which should typically be the case in banking and/or financial transactions, the account owner, having the communication device 104 on his or her person, may authorize the transaction at the point of the transaction. If the transaction is an overnight or other remotely made transaction, such as in clearing and/or account settling transactions, the account owner may authorize the transaction from his or her remote location.

The account owner may also program and/or set the communication device 104 so as to automatically authorize or disapprove or disallow transactions. In this regard, the communication device 104 may be programmable so as to receive and analyze the transaction information and/or data and reply or respond to same automatically and/or with preset or programmed replies and/or responses. The communication device 104 may also be programmable so as to limit the amounts of transactions. In this regard, the account owner may provide for temporary transaction types and/or amounts.

The communication device 104, in the preferred embodiment, is provided with a memory device for storing any number of transactions so that the account owner may review his or her account activity and/or transactions which have occurred involving his or her accounts and/or ATM card. In this manner, the account owner may "scroll" through and/or in other ways review account activity. The communication device 104 may also be equipped to service more than one bank and/or financial account and/or ATM card. For example, any number and/or types of accounts may be serviced with or by a single communication device 104.

The apparatus and method of the present invention provides for the real-time notification of banking and/or financial transactions involving various bank and/or financial accounts and enables an account owner to monitor, in real-time, activity involving his or her bank and/or financial accounts and/or ATM card(s).

The apparatus and method of the present invention also provides a means and a mechanism by which to inform an account owner that his or her account is overdrawn, has been charged against and/or that his or her ATM card(s) are lost, stolen, cancelled or de-activated and/or provides an indication to the account owner of when and/or where his or her accounts are being accessed in transactions. The account owner may then report the unauthorized activity, and/or the discovery of a lost or stolen ATM card, and/or cancel and/or de-activate the respective account(s) and/or ATM card(s).

Figure 7:
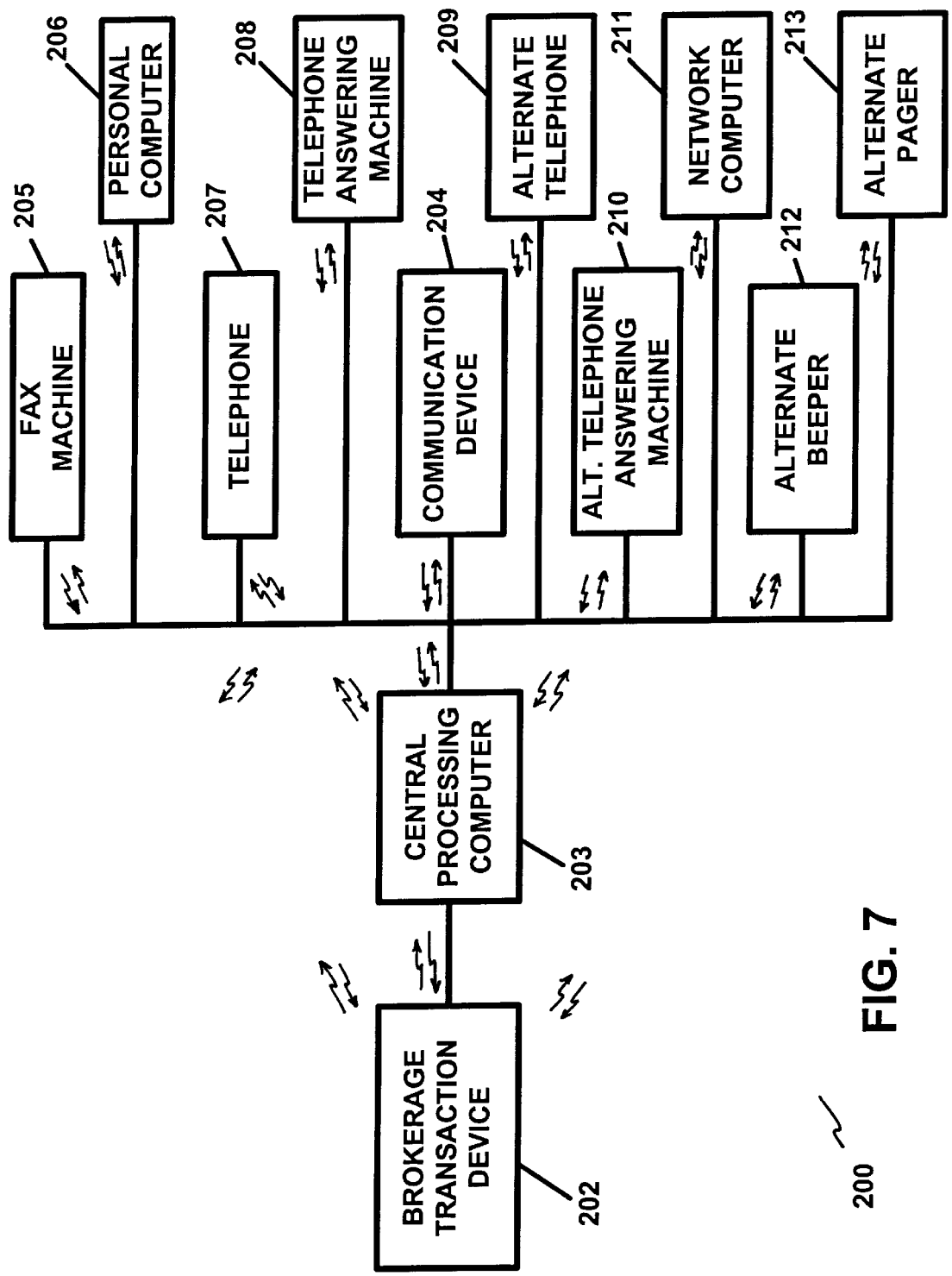
FIG. 7 illustrates a block diagram of an alternate embodiment of the apparatus of the present invention which is utilized in conjunction with a brokerage account.

FIG. 7 illustrates a block diagram of an alternate embodiment of the apparatus of the present invention which is utilized in conjunction with a brokerage account and/or a financial services account and/or transaction (hereinafter referred to as a "brokerage account") and/or the authorization process involved therewith. The apparatus of FIG. 7 is denoted generally by the reference numeral 200. In FIG. 7, the apparatus 200 consists of a brokerage and/or financial services transaction device (hereafter "brokerage transaction device") which devices are found in brokerage and/or financial services establishments. In the preferred embodiment, the brokerage transaction device 202 is a device and/or a processing computer terminal which is utilized by a broker, a trader, an account manager and/or assistant and/or any other individual authorized to execute the transaction. Any other terminal or similar device may also be utilized as the brokerage transaction device 202 depending upon the application and/or the transaction.

The brokerage transaction device 202 may be any of the widely used and well known devices, computers, or terminals for providing brokerage transactions, including transactions in cash, cash instruments, cash derivative instruments, stocks, bonds, stock derivative instruments, bond derivative instruments, commodities, mutual fund shares and instruments, futures, options, index funds and their related and/or derivative instruments and derivative securities as well as securities and instruments of any kind, and further including financial transactions related to an account, including clearing transactions, check clearing and/ or account charging and/or charge-back transactions, which transactions brokerage and financial institutions perform and/or engage in for their account owner and/or clients.

Typically, the brokerage transaction device 202 and/or device will comprise a computer terminal having an input device such as a keyboard and/or various reader(s) and/or scanning device(s) for reading and/or scanning, respectively, information and/or data necessary in order to perform the transaction. The brokerage transaction device 202 transmits an authorization request which may include the data pertaining to the particular account which is accessed and/or involved in the transaction and the type and the amount of the transaction, over a communications medium, to a central processing computer 203 for processing the transaction, the transaction request and/or the authorization request pertaining thereto. The brokerage device 202 may transmit the transaction authorization request and/or notice to a central processing computer via a central computer which may be a central computer at the particular brokerage or financial institution. The central processing computer may also be a central computer system which is not located at the brokerage or financial institution, but rather, services the particular brokerage or financial institution or a group of brokerage or financial institutions.

The brokerage device 202 also receives the transaction and/or authorization data and/or information from the central processing computer. If a central brokerage computer is utilized, the data transmitted from the central processing computer would be transmitted to the brokerage device 202 via the central bank computer. A printed transaction receipt may also be provided at and/or obtained via the brokerage device 202, or peripheral device associated therewith, for printing a transaction receipt which is usually provided to the account holder.

The brokerage device 202 may also comprise, and/or have associated therewith, a keypad for the manual entry of transaction information and/or data, such as the amount of the transaction, account number, etc. The brokerage device 202 may also be an integral component of a broker, trader, teller and/or cashier work station and/or other transaction devices and/or terminals, including those which may provide for the automatic entry of transaction information and/or data.

The apparatus 200 also comprises a central processing computer 203 which services any brokerage and/or financial institution and/or any pre-defined group of brokerages and/ or financial institutions and/or any number of accounts associated therewith. For example, the central processing computer 203 may handle all brokerage and/or financial accounts for a given brokerage or brokerages. The central processing computer 203, for example, may process and maintain records of transactions, trades, deposits, withdrawals, checks cashed, drafts, ATM deposits, ATM withdrawals, charges made against an account, credits made to an account, etc., and/or any combinations of same. The central processing computer 203 may process accounts for any of the various brokerages and/or financial institutions.

In the preferred embodiment, the brokerage device 202 is linked and/or connected to the central processing computer 203 via a telecommunications system, link and/or medium (hereinafter referred to as "communications system") such as, for example, a telephone network or line. As noted above, the brokerage device 202 may or may not be linked to the central processing computer 203 via a central brokerage computer. It is important to note that the communications system which is utilized may be any communications system and may include telecommunication systems, satellite communications systems, radio communication systems, digital communications systems, digital satellite communications systems, personal communications services communication systems, cable television communications systems, broadband communication systems, as well as any other appropriate communications system. The brokerage device 202 transmits signals and/or data to the central processing computer 203 as well as receives signals and/or data from the central processing computer 203.

The central processing computer 203 may be a mainframe computer, a mini-computer, a micro-computer, a server computer, and/or a personal computer, such as those utilized in conjunction with on-line services and/or in a network environment, and/or any other suitable computer or computer system.

The apparatus 200 also comprises an account owner communication device 204 which may receive signals and/ or data from either or both of the brokerage transaction device 202 and/or the central processing computer 203. In the preferred embodiment of FIG. 7, the communication device 204 receives signals and/or data from the central processing computer 203 with said signals being transmitted via a suitable communication system. In the preferred embodiment, the communications system utilized for transmitting signals and/or data to the communication device 204 is a wireless telephone line and the communication device 204 is a wireless telephone signal receiving device such as a telephone beeper or pager. The communication device 204, which may be a pager, receives the wireless telephone signals and/or data from the central processing computer 203 during the authorization procedure as will be described in more detail below.

In the preferred embodiment, the communication device 204 is also equipped with a transmitter for transmitting signals and/or data to the central processing computer 203. In this regard, the central processing computer 203 transmits signals and/or data to the communication device 204 as well as receives signals and/or data from the communication device 204. The communication device 204 may also transmit signals and/or data directly to the brokerage device 202 and receive signals and/or data directly from the brokerage device 202. In the preferred embodiment, the brokerage device 202 transmits signals and/or data to the central processing computer 203 and receives signals and/or data from the central processing computer 203. Further, in the preferred embodiment, the communication device 204 receives signals and/or data from the central processing computer 203 and transmits signals and/or data to the central processing computer 203.

As noted above, the communication device 204 is a wireless device. In this regard, the communication device 204 or pager may be carried by the account owner and/or be kept on and/or close to the account owner's person so that the central processing computer 203 may transmit signals and/or data to the communication device 204 so as to facilitate communication with the account owner at any time.

In the preferred embodiment, the apparatus 200 also comprises a facsimile (fax) machine 205, a personal computer or personal digital assistant 206, a telephone 207, a telephone answering machine 208, an alternate telephone 209, an alternate telephone answering machine 210, a network computer 211, and/or an alternate beeper 212 or alternate pager 213. The central processing computer 203 may be linked with the above fax machine 205, personal computer or personal digital assistant 206, telephone 207, associated answering machine 208, alternate telephone 209, alternate telephone answering machine 210, network computer 211 alternate beeper 212 and alternate pager 213, via any suitable communication system. In the preferred embodiment, a telecommunications link or telephone line or link, which may or may not be a wireless link, depending on the device and/or the circumstances, is utilized in order to link the central processing computer 203 with each of the fax machine 205, the personal computer or personal digital assistant 206, the telephone 207, the associated answering machine 210, the alternate telephone 209, the alternate telephone answering machine 210, the network computer 211, the alternate beeper 212 and the alternate pager 213.

Figure 8:
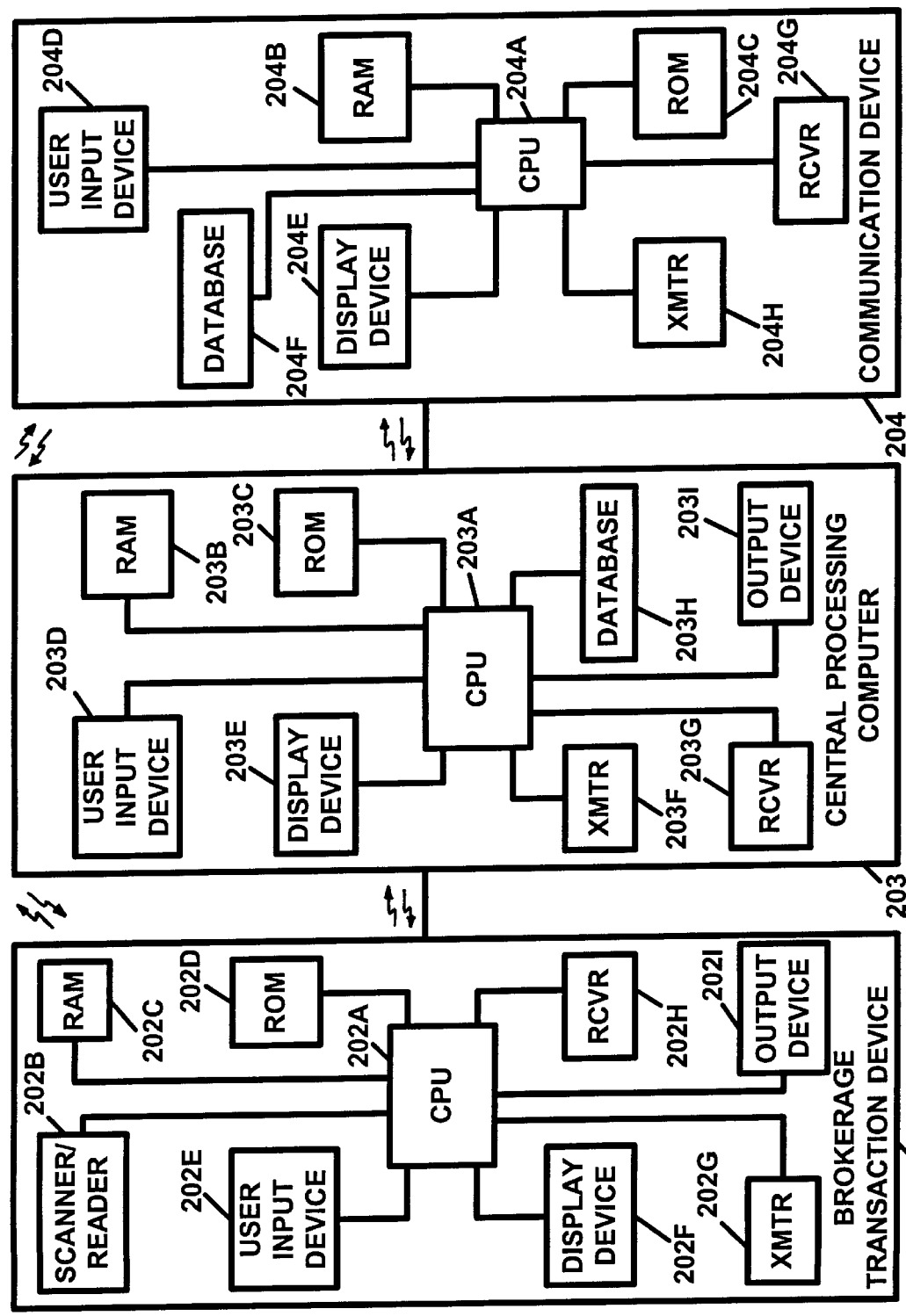
FIG. 8 illustrates the various components of-the apparatus of FIG. 7.

FIG. 8 illustrates the various components of the apparatus 200 of FIG. 7. In FIG. 8, the brokerage device 202, in the preferred embodiment, comprises a central processing unit or CPU 202A, a scanner or reader 202B, which is connected to the CPU 202A, associated random access memory 202C (RAM) and read only memory 202D (ROM) devices, which are also connected to the CPU 202A, a user input device 202E, which is typically a keypad or other suitable input device for inputting data into the brokerage device 202 and which is also connected to the CPU 202A, and a display device 202F for displaying information and/or data to a user or operator, which display device 202F is also connected to the CPU 202A.

The brokerage device 202 also comprises a transmitter 202G for transmitting signals and/or data to the central processing computer 203, and/or to the communication device 204 and/or to any other device associated with the account owner and/or the apparatus, if desired. The transmitter 202G is also connected to the CPU 202A. The brokerage device 202 also comprises a receiver 202H for receiving signals and/or data from the central processing computer 203, and from the communication device 204 and/or from any other associated device which may be utilized, if desired. The receiver 202H is also connected to the CPU 202A. The brokerage device 202 also comprises a printer 202I or other appropriate output device for outputting data to the operator. The printer 202I is also connected to the CPU 202A. In the preferred embodiment, the printer 202I prints receipts corresponding to the transaction.

In FIG. 8, the central processing computer 203, in the preferred embodiment, comprises a central processing unit or CPU 203A, associated random access memory 203B (RAM) and read only memory 203C (ROM) devices, which are connected to the CPU 203A, a user input device 203D, which is a keypad or any other suitable input device, for inputting data into the central processing computer 203 and which is also connected to the CPU 203A, and a display device 203E for displaying information and/or data to a user or operator.

The central processing computer 203 also comprises a transmitter(s) 203F for transmitting signals and/or data to the brokerage device 202 and to the communication device 204 and/or to any one or more of the fax machine 205, the personal computer or personal digital assistant 206, the telephone 207, the telephone answering machine 208, the alternate telephone 209, the alternate telephone answering machine 210, the network computer 211, the alternate beeper 212, and/or the alternate pager 213. The transmitter(s) 203F is also connected to the CPU 203A. The central processing computer 203 also comprises a receiver(s) 203G for receiving signals and/or data from the brokerage transaction device 202 and from the communication device 204 and/or from any other suitable device which may be utilized in conjunction with the apparatus 200. The receiver(s) 203G is also connected to the CPU 203A.

The central processing computer 203 also comprises a database(s) 203H which contains account information and data pertaining to the account owner's account(s). The database 203H contains information about the account owner, the account number, etc., and any other information and/or data necessary to manage and/or process an account and/or account transaction as described herein. The database 203H is also connected to the CPU 203A. The central processing computer 203 also comprises a printer 203I or other appropriate output device for outputting information and/or data to a user or operator, which printer 203I or other output device is also connected to the CPU 203A.

In FIG. 8, the communication device 204, in the preferred embodiment, comprises a central processing unit or CPU 204A, associated random access memory 204B (RAM) and read only memory 204C (ROM) devices, which are also connected to the CPU 204A, a user input device 204D, which is a keypad or a plurality of keys and/or switches for inputting data into the communication device 204 and which is also connected to the CPU 204A, and a display device 204E, for displaying information and/or data to the account owner, and a database 204F. This display device 204E and the database 204F are also connected to the CPU 204A. The communication device 204 also comprises a receiver 204G for receiving signals and/or data from the central processing computer 203 and which is also connected to the CPU 204A, and a transmitter 204H for transmitting signals and/or data to the central processing computer 203 and which is also connected to the CPU 204A.

In the preferred embodiment, the communication device 204, which is utilized, is a pager with a reply feature and/or device. A two-way pager and/or pager system(s) may also be utilized for implementing the respective component systems in the communication device 204/central processing computer 203 combination and/or link.

Figure 9A:
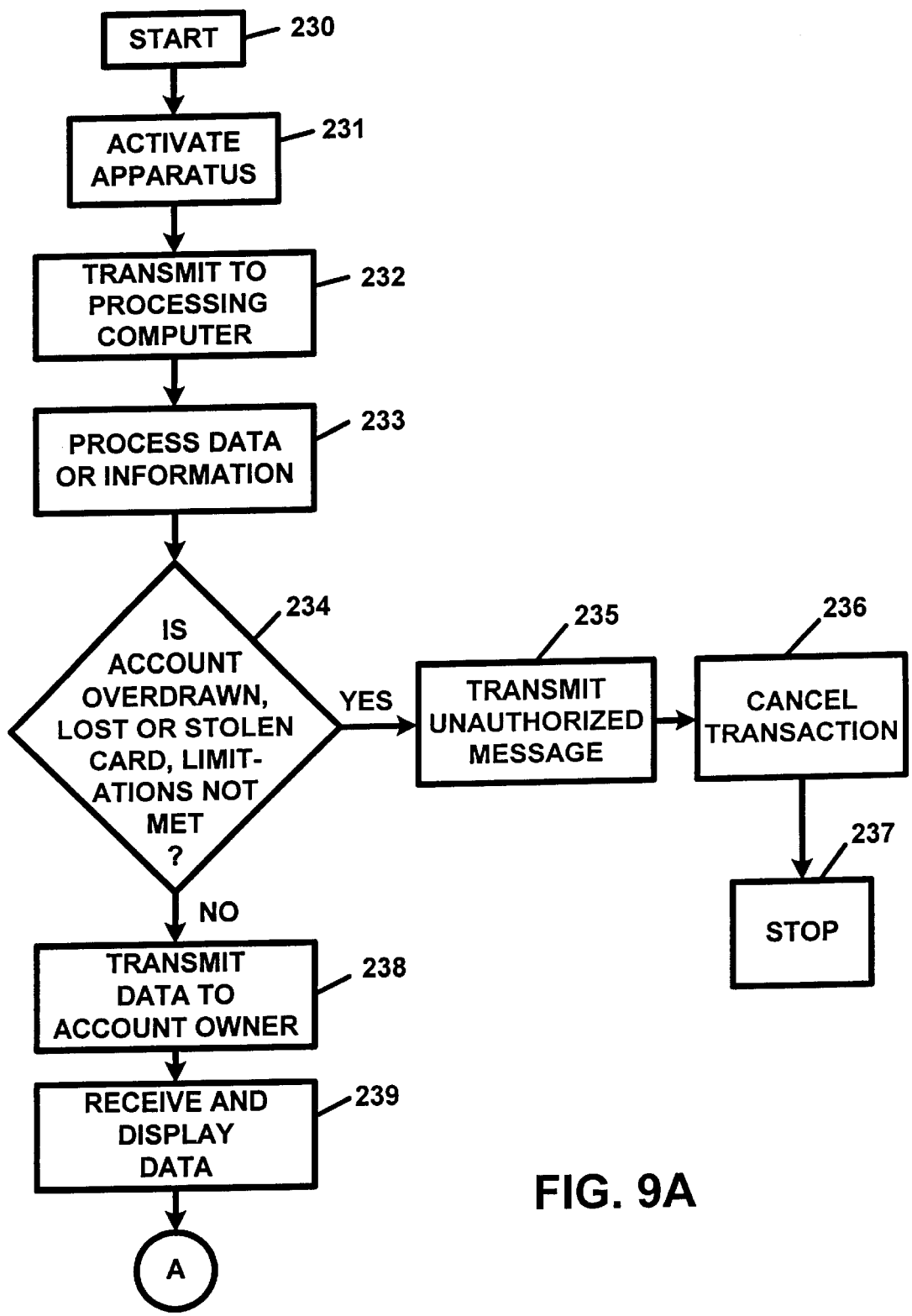
FIGS. 9A, 9B and 9C illustrate the operation of the apparatus of FIG. 7 in flow diagram form.
Figure 9B:
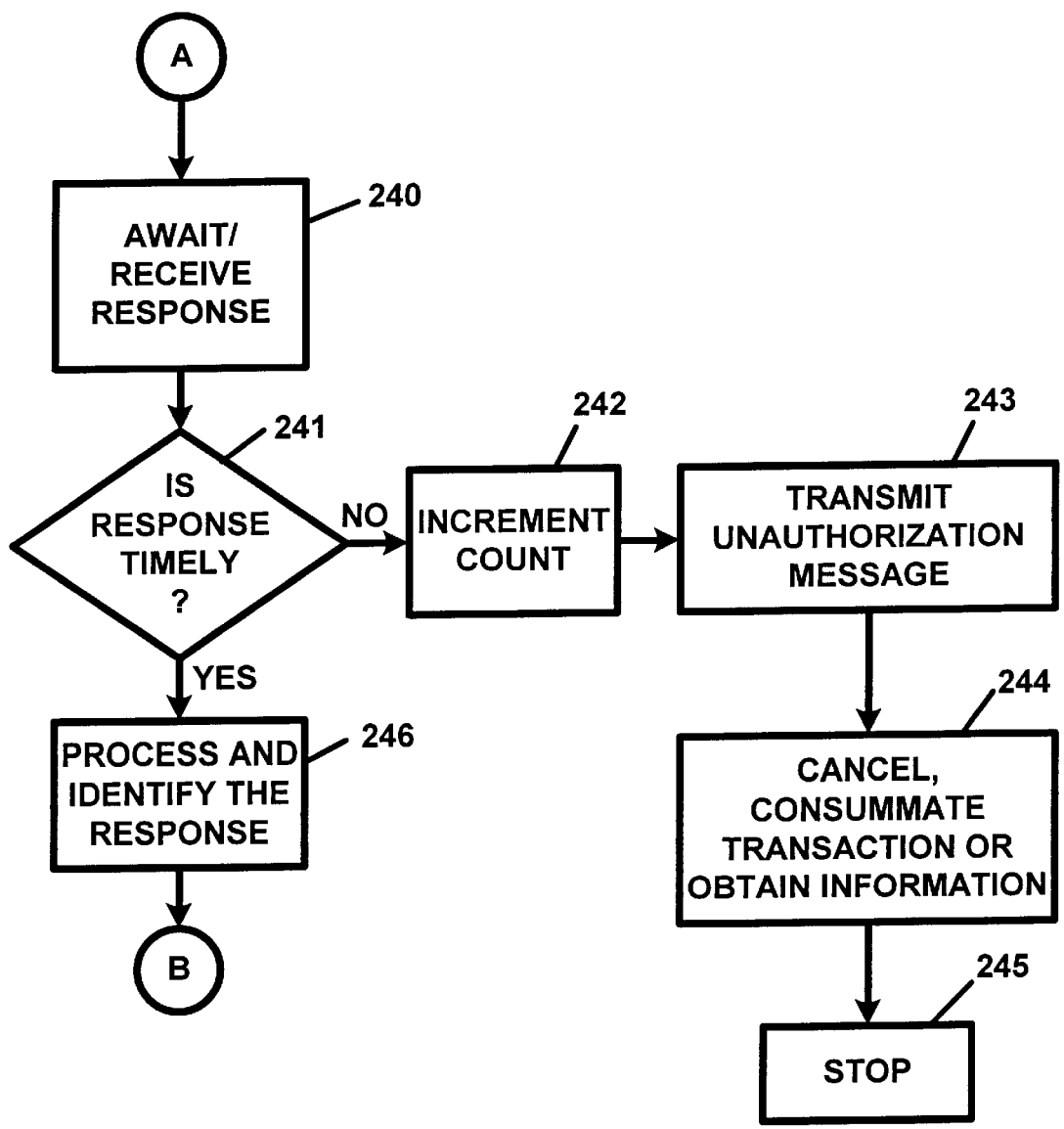
Figure 9C:
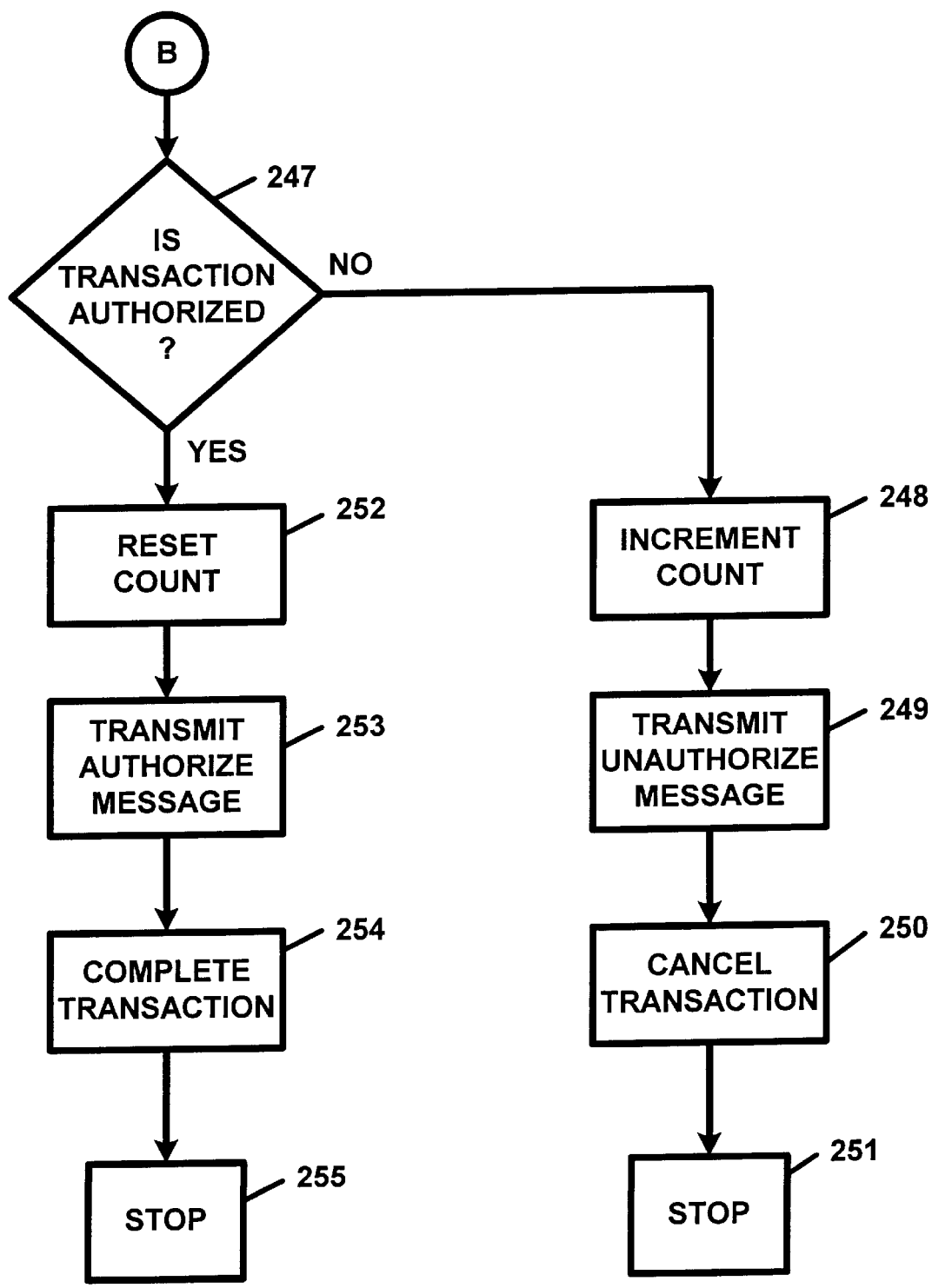

The apparatus 200 of the present invention, in the preferred embodiment, may be utilized in order to facilitate account owner authorization, notification and/or security, in brokerage and/or financial transactions involving cash, cash instruments, cash derivative instruments, stocks, bonds, stock derivative instruments, bond derivative instruments, commodities, mutual fund shares and instruments, futures, options, index funds and their related and/or derivative instruments and derivative securities as well as securities and instruments of any kind, and further including financial transactions related to an account, including clearing transactions, check clearing and/or account charging and/or charge-back transactions, and in transactions involving checking accounts, savings accounts and electronic money accounts, electronic cash accounts, ATM accounts, and/or any transactions involving same in the manner described below and with reference to FIGS. 9A, 9B and 9C. In this manner, the apparatus and method of the present invention may be utilized to obtain account owner authorization in a brokerage and/or financial account transaction.

The apparatus 200 can be utilized in conjunction with an account card or cards which correspond to, or which are associated with, brokerage and/or financial accounts.

FIGS. 9A, 9B and 9C illustrate the operation of the apparatus 200 in flow diagram form. With reference to FIGS. 9A, 9B and 9C, the operation of the apparatus 200 commences at step 230 when the brokerage transaction is presented to and/or handled by the brokerage institution broker, trader, account executive, and/or teller, etc. (hereinafter brokerage representative) employee. At step 231, the brokerage representative will activate the apparatus, via the brokerage transaction device 202, in any typical manner, such as by entering account information, into the brokerage transaction device 202. This data entry is typically performed by manual data entry and/or via a card reader, depending upon the transaction. For example, if a person offers a check for purchasing securities or a charge is made to the account, the brokerage representative will enter the brokerage account number and the associated transaction information into the brokerage device 202 for processing. Similarly, if one desires to sell securities, information corresponding thereto will be entered into the brokerage device 202. The information and/or data pertinent to the transaction is then transmitted, at step 232, to the central processing computer 203.

The central processing computer 203 will then, at step 233, process the information and/or data pertinent to the transaction and to the particular account. The central processing computer 203 may utilize any of the widely known data processing and/or software routines, which are known to those skilled in that art, in order to process brokerage transaction requests and/or authorizations involving the use of the respective account(s).

The central processing computer 203 will process the information and/or data pertinent to the brokerage transaction in conjunction with the account information in order to determine the status of the account (i.e. whether any blocks or holds have been placed on the account, such as those prohibiting transactions, trades, withdrawals, etc.). Further, the central processing computer 203 will then perform a test, at step 234, in order to determine if the transaction amount has reached and/or exceeded the amount which is available in the account and/or which has been presented with the brokerage institution and/or if the account has been cancelled and/or de-activated, and/or determine whether any other pre-defined, pre-selected and/or programmed limitation(s) and/or restriction(s) have been met, satisfied and/or reconciled. The central processing computer 203 will also perform a test in order to determine if the predetermined maximum number count of unauthorized transactions, pre-defined in the preferred embodiment to be one (1), has occurred on the account.

The unauthorized transaction count refers to a count of the transactions which are not authorized by the account owner as will be described herein. The unauthorized transaction count (UNAUTHCT) is a variable which is pre-set to zero (0) at the time the account is opened. Each time an unauthorized transaction occurs, the unauthorized transaction count is incremented by one. Once the unauthorized transaction count reaches a pre-defined limit of, for example, one (1), although it may be pre-defined to be zero (0), the central processing computer 203 will cancel the transaction and de-activate the account. The central processing computer 203 will then notify the account owner. In this manner, the apparatus 200 will enable the central processing computer 203 of a brokerage and/or financial institution to cancel and/or de-activate the account either permanently or temporarily, in cases when the account owner may have failed to respond or to reply to transaction notices, which may be the case when the account owner is not aware that the account has been accessed, charged, overdrawn, and/or cancelled or de-activated, or in other way utilized without the account owner's knowledge or authorization, or when the account owner is unable to respond or reply to the transaction notices for some other reason(s). This feature of the present invention serves to place a transaction stop limit on transactions involving the account.

If any of the above listed conditions exist (i.e. account blocked, hold placed thereon, overdrawn, cancelled and/or de-activated), the central processing computer 203 will, at step 235, transmit a signal to the brokerage transaction device 202 indicating that the transaction is not approved and/or is not authorized. The brokerage device operator, or employee, or representative, may then cancel the transaction at step 236. The employee or representative may then alert the authorities. In the case when an account card is utilized in a publicly accessible brokerage device 202, the machine may confiscate the account card automatically. Upon the completion of step 236, the apparatus will cease operation at step 237.

If, at step 234, the central processing computer 203 determines that the account is not blocked, subject to a hold, cancelled and/or re-activated or that the account is not overdrawn or that the account card is not lost, stolen, cancelled or de-activated, or that the of unauthorized transactions count (UNAUTHCT) has not reached a predefined limit, and/or that predefined or pre-specified limitations and/or restrictions have been met, the central processing computer 203 will, at step 238, transmit a signal and/or data to the communication device 204 which is located at the account owner.

At step 238, the central processing computer 203 will then also transmit respective signals and/or data to any one or more of the cardholder's designated fax machine 205, personal computer or personal digital assistant 206, telephone 207, telephone answering machine 208, alternate telephone 209, alternate telephone answering machine 210, network computer 211, and/or alternate beeper 212 or alternate pager 213.

The information and/or data transmitted to the communication device 204 includes information and data identifying the transaction and may include the name of the brokerage or financial institution where the transaction is taking place, the account number and/or description, the amount of the transaction, the nature of the transaction, the time of the transaction and the location (i.e. city, town, village, state, country etc.) of the transaction. The information and/or data may also include the phone number of the central processing office and/or computer servicing, and/or the brokerage and/or financial institution handling the account so that the account owner may telephone same in order to authorize or cancel the transaction. The information and/or data may also be supplemented to include a description of the person seeking to make the transaction and the type of transaction sought (i.e. securities trade, cash withdrawal, cashing of check, etc.).

At step 239, the information and/or data which is transmitted from the central processing computer 203, and received at the communication device 204, is displayed to the account owner on the display device 204E of the communication device 204. The information displayed on the display device 204 includes the name of the brokerage and/or financial institution, the amount of the transaction, the nature of the transaction, the time of the transaction and the location of the transaction. The information and/or data may also include the type of transaction and a description of the person seeking to make the transaction, etc.

The apparatus 200, at step 240, will then wait for the account owner to respond to the transmission. During this time, the account owner may either utilize the reply or two-way pager feature on the communication device 204 in order to either approve, or authorize, the transaction or disapprove of, or void, the transaction. At step 240, the apparatus 200 will receive the reply or response from the account owner. At step 241, the central processing computer 203 will determine if the account owner has made a reply or response within the pre-defined time limit which is chosen, in the preferred embodiment, to be one (1) minute. The account owner may also transmit a signal via an appropriate key or button suspending use of the account or account card, such as when he or she may first be apprised of the fact that the account is being unlawfully accessed, or the use thereof is unauthorized, or that the account card has been lost or stolen.

In instances when the communication device 204 does not have a reply or two-way pager feature, the account owner may simply telephone the central processing office or processing center and/or the brokerage or financial institution so as to personally reply or respond to the authorization request.

If, at step 241, it is determined that the account owner's reply or response was not made within the pre-specified time, chosen in the preferred embodiment to be one (1) minute, the central processing computer 203 will, at step 242, increment the unauthorized transaction count (UNAUTHCT) by one (1) and will, at step 243, transmit a signal and/or data to the brokerage transaction device 202 indicating that the transaction is not authorized by the account owner. The brokerage device operator may then, at step 244, either cancel the transaction, proceed to consummate the transaction, and/or attempt to obtain additional information or identification from the client or customer and/or obtain an alternate account number from which to draw against.

The action taken by the brokerage transaction device operator may be dictated by the specific agreement in effect between the account owner and the brokerage or financial institution administering the accounts. Upon the completion of step 244, the operation of the apparatus will cease at step 245. If the account owner should reply or respond to the transaction notice at a later period, this information may then be utilized to approve of or to disapprove and/or to dispute the transaction.

If, at step 241, it is determined that the reply or response was timely, the central processing computer 203 will, at step 246, process and identify the account owner response. At step 247, the central processing computer 203 will determine if the account owner has authorized the transaction. If the account owner's response is to cancel, to disapprove, or to not authorize, the transaction, the central processing computer 203 will, at step 248, increment the unauthorized transaction count (UNAUTHCT) by 1. At this juncture, it is important to note that the unauthorized count (UNAUTHCT) is set to zero at the time of the opening of the account.

After the unauthorized transaction count has been incremented, the central processing computer 203 will, at step 249, transmit a signal and/or data to the brokerage device 202 which will notify and/or instruct the brokerage device operator that the transaction is not authorized and should, therefore, be cancelled or voided. The brokerage device operator may then cancel the transaction at step 250. The brokerage transaction device operator or the account machine may then confiscate the account card, if pertinent, and/or alert the authorities. Upon the completion of step 250, the apparatus will cease operation at step 257.

If, at step 247, the central processing computer 203 identifies the account owner's reply or response as being one to authorize the transaction, the central processing computer 203 will, at step 257, reset the unauthorized transaction count (UNAUTHCT) to zero (0). The central processing computer 203 will then, at step 253, transmit a signal and/or data to the brokerage device 202 which will notify and/or instruct the brokerage device operator that the transaction is authorized and/or approved. The brokerage device operator may then complete the transaction, at step 254. After the transaction has been completed at step 254, the operation of the apparatus 200 will cease at step 255.

In instances when the account owner is a party to the transaction, which may be the case in brokerage and/or financial transactions, the account owner, having the communication device 204 on his or her person, may authorize the transaction. If the transaction is an overnight or other remotely made transaction, such as in clearing and/or account settling transactions, the account owner may authorize the transaction from his or her remote location.

The account owner may also program and/or set the communication device 204 so as to automatically authorize or disapprove or disallow transactions. In this regard, the communication device 204 may be programmable so as to receive and analyze the transaction information and/or data and reply or respond to same automatically and/or with preset or programmed replies and/or responses. The communication device 204 may also be programmable so as to limit the amounts of transactions. In this regard, the account owner may provide for temporary transaction types and/or amounts.

The communication device 204, in the preferred embodiment, is provided with a memory device for storing any number of transactions so that the account owner may review his or her account activity and/or transactions which have occurred involving his or her account(s) and/or account card(s). In this manner, the account owner may "scroll" through and/or in other ways review account activity. The communication device 204 may also be equipped to service more than one brokerage and/or financial services account and/or account card. For example, any number and/or types of accounts may be serviced with or by a single communication device 204.

The apparatus and method of the present invention provides for the real-time notification of brokerage and/or financial transactions involving various brokerage and/or financial accounts and enables an account owner to monitor, in real-time, activity involving his or her brokerage and/or financial account(s) and/or account card(s).

The apparatus and method of the present invention also provides a means and a mechanism by which to inform an account owner that his or her account is being accessed and/or is overdrawn, has been charged against and/or that his or her account card(s) are lost, stolen, cancelled or de-activated and/or provides an indication to the account owner of when and/or where his or her accounts are being accessed in transactions. The account owner may then report the unauthorized activity, and/or the discovery of a lost or stolen account card, and/or cancel and/or de-activate the respective account(s) and/or account card(s).

The present invention, in an alternate embodiment, may also be utilized so as to provide authorization, notification and/or security for, and in conjunction with electronic money, electronic cash and/or digital cash transactions and/or accounts.

FIG. 10 illustrates a block diagram of an alternate embodiment of the apparatus of the present invention which is utilized in conjunction with a electronic and/or digital cash account (hereinafter "electronic cash account"), which may include, among other things, electronic cash and/or currency accounts, digital cash accounts, alternate value media accounts and accounts and systems for the storing, maintenance and recordkeeping of same involving cash or money in an electronic or digital form. The apparatus of FIG. 10 is denoted generally by the reference numeral 300. In FIG. 10, the apparatus 300 consists of an electronic cash or electronic transaction device (hereafter "electronic cash device") which devices may be found at establishments and/or entities which perform commercial and/or other transactions with electronic cash. In the preferred embodiment, the electronic transaction device 302 is a terminal computer or other device which is utilized by an operator in performing transactions involving electronic cash. Any other terminal or similar device may also be utilized as the electronic cash device 302 depending upon the application and/or the transaction.

The electronic cash transaction device 302 may be any of the widely used and well known devices, computers or terminals for providing electronic cash transactions, of any kind, and further including financial transactions related to a savings account and/or checking account for electronic cash, including electronic clearing transactions, electronic check clearing and/or account charging and/or charge-back transactions and/or on-line commerce transactions, which transactions institutions and/or establishments may perform and/or engage in the utilization of electronic cash transactions and commerce.

Typically, the electronic cash device and/or devices comprise a computer terminal having an input device such as a keyboard and/or various reader and/or scanning device for reading and/or scanning, respectively, information and/or data necessary in order to perform the transaction. The electronic cash device transmits an authorization request which may include the data pertaining to the particular electronic cash account which is accessed and/or involved in the transaction and the type and the amount of the transaction, over a communications medium, to a central processing computer for processing the electronic cash transaction, the transaction request and/or the authorization request pertaining thereto. The electronic cash device 302 may transmit the transaction authorization request and/or notice to a central processing computer via a central computer which may be a central computer at the particular institution which services the electronic cash accounts. The central processing computer may also be a central computer system which is not located at the institution, but rather, which services the particular electronic cash institution and/or account and/or group institutions and/or accounts.

The electronic cash device 302 also receives the transaction and/or authorization data and/or information from the central processing computer. If a central electronic cash computer is utilized, the data transmitted from the central processing computer would be transmitted to the electronic cash device 302 via the central computer. A printed transaction receipt may also be provided at and/or obtained via the electronic cash device 302, or peripheral device associated therewith, for printing a transaction receipt.

The electronic cash device 302 may also comprise, and/or have associated therewith, a keypad for the manual entry of electronic cash transaction information and/or data, such as the amount of the electronic cash transaction, account number, etc. The electronic cash device 302 may also be an integral component of a cashier or operator work station and/or other transaction terminals and/or devices, including those which may provide for the automatic entry of electronic cash transaction information and/or data.

The apparatus 300 also comprises a central processing computer 303 which services any institution, account, and/or any pre-defined group of institutions which services electronic cash accounts and/or any number of accounts associated therewith. For example, the central processing computer 303 may handle all electronic cash accounts and savings accounts, checking accounts and/or related thereto for a given institution or institutions. The central processing computer 303, for example, may process and maintain records of deposits, withdrawals, checks cashed, drafts, digital cash deposits, digital cash withdrawals, charges made against an account, credits made to an account, etc., and/or any combinations of same as they relate to electronic cash accounts. The central processing computer 303 may process accounts for any of the various electronic cash accounts and/or institutions.

In the preferred embodiment, the electronic cash device 302 is linked and/or connected to the central processing computer 303 via a telecommunications system, link and/or medium (hereinafter referred to as "communications system") such as, for example, a telephone network or line. As noted above, the electronic cash device 302 may or may not be linked to the central processing computer 303 via a central computer. It is important to note that the communications system which is utilized may be any communications system and may include telecommunication systems, satellite communications systems, radio communication systems, digital communications systems, digital satellite communications systems, personal communications services communication systems, cable television communications systems, broadband communication systems, as well as any other appropriate communications system. The electronic cash device 302 transmits signals and/or data to the central processing computer 303 as well as receives signals and/or data from the central processing computer 303.

The central processing computer 303 may be a mainframe computer, a mini-computer, a micro-computer, a personal computer and/or a server computer, such as those utilized in conjunction with on-line services and/or in a network environment, and/or any other suitable computer or computer system.

The apparatus 300 also comprises an account owner communication device 304 which may receive signals and/or data from either or both of the electronic cash device 302 and/or the central processing computer 303. In the preferred embodiment of FIG. 10, the communication device 304 receives signals and/or data from the central processing computer 303 with said signals being transmitted via a suitable communication system. In the preferred embodiment, the communications system utilized for transmitting signals and/or data to the communication device 304 is a wireless telephone line and the communication device 304 is a wireless telephone signal receiving device such as a telephone beeper or pager. The communication device 304, which may be a pager, receives the wireless telephone signals and/or data from the central processing computer 303 during the authorization procedure as will be described in more detail below.

In the preferred embodiment, the communication device 304 is also equipped with a transmitter for transmitting signals and/or data to the central processing computer 303. In this regard, the central processing computer 303 transmits signals and/or data to the communication device 304 as well as receives signals and/or data from the communication device 304. The communication device 304 may also transmit signals and/or data directly to the electronic cash device 302 and receive signals and/or data directly from the electronic cash device 302. In the preferred embodiment, the electronic cash device 302 transmits signals and/or data to the central processing computer 303 and receives signals and/or data from the central processing computer 303. Further, in the preferred embodiment, the communication device 304 receives signals and/or data from the central processing computer 303 and transmits signals and/or data to the central processing computer 303.

As noted above, the communication device 304 is a wireless device. In this regard, the communication device 304 or pager may be carried by the account owner and/or be kept on and/or close to the account owner's person so that the central processing computer 303 may transmit signals and/or data to the communication device 304 so as to communication with the account owner at any time.

In the preferred embodiment, the apparatus 300 also comprises a facsimile (fax) machine 305, a personal computer or personal digital assistant 306, a telephone 307, a telephone answering machine 308, an alternate telephone 309, an alternate telephone answering machine 310, a network computer 311, and/or an alternate beeper 312 or alternate pager 313. The central processing computer 303 may be linked with the above fax machine 305, personal computer or personal digital assistant 306, telephone 307, associated answering machine 308, alternate telephone 309, alternate telephone answering machine 310, network computer 311, alternate beeper 312 and alternate pager 313, via any suitable communication system. In the preferred embodiment, a telecommunications link or telephone line or link, which may or may not be a wireless link, depending on the device and/or the circumstances, is utilized in order to link the central processing computer 303 with each of the fax machine 305, the personal computer or personal digital assistant 306, the telephone 307, the associated answering machine 308, the alternate telephone 309, the alternate telephone answering machine 310, the network computer 311, the alternate beeper 312 and the alternate pager 313.

Figure 11:
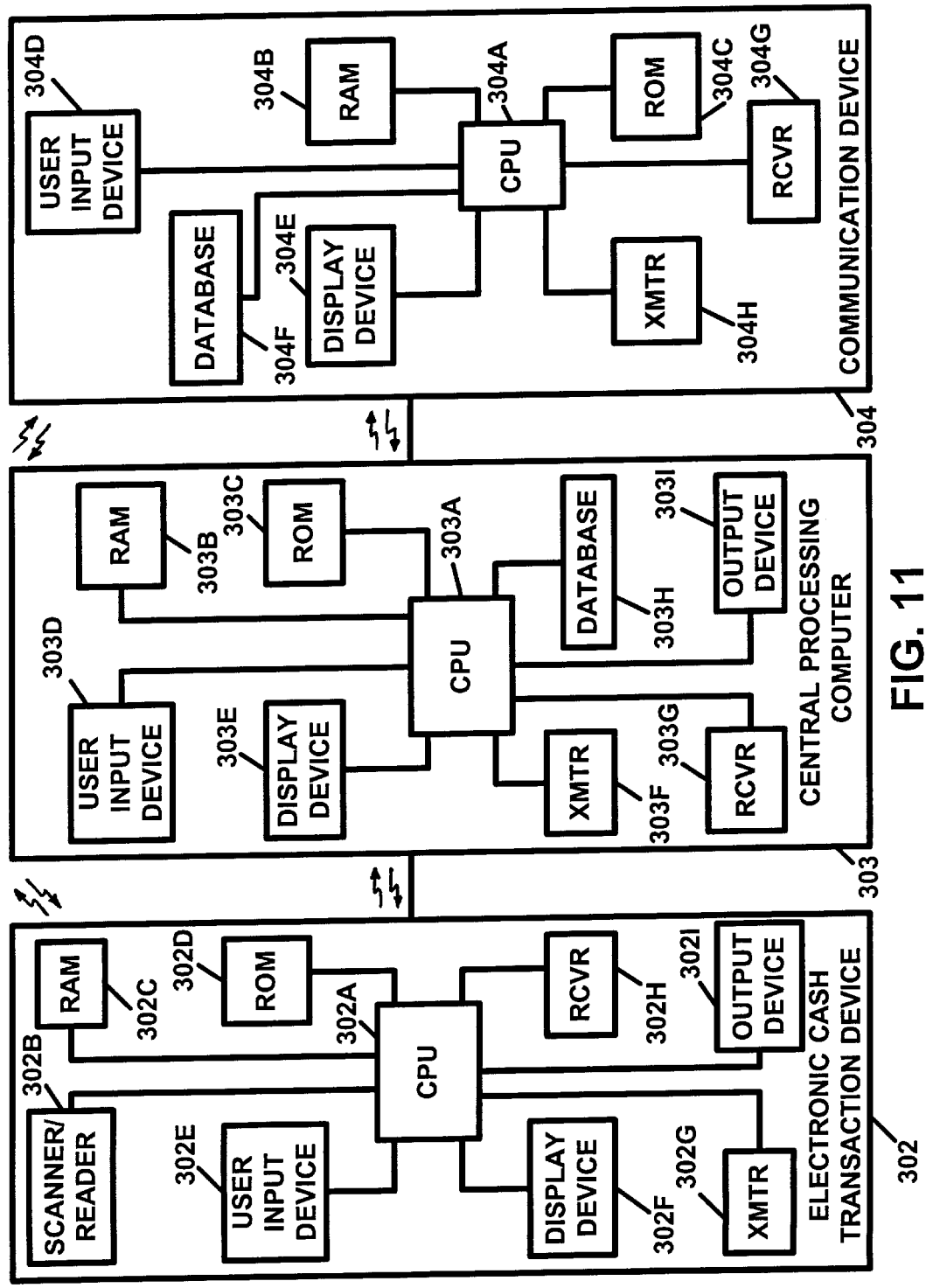
FIG. 11 illustrates the various components of the apparatus of FIG. 10.

FIG. 11 illustrates the various components of the apparatus 300 of FIG. 10. In FIG. 11, the electronic cash device 302, in the preferred embodiment, comprises a central processing unit or CPU 302A, a scanner or reader 302B, which is connected to the CPU 302A, associated random access memory 302C (RAM) and read only memory 302D (ROM) devices, which are also connected to the CPU 302A, a user input device 302E, which is typically a keypad or other suitable input device for inputting data into the electronic cash device 302 and which is also connected to the CPU 302A, and a display device 302F for displaying information and/or data to a user or operator, which display device 302F is also connected to the CPU 302A.

The electronic cash device 302 also comprises a transmitter 302G for transmitting signals and/or data to the central processing computer 303, and/or to the communication device 304 and/or to any other device associated with the account owner and/or the apparatus, if desired. The transmitter 302G is also connected to the CPU 302A. The electronic cash device 302 also comprises a receiver 302H for receiving signals and/or data from the central processing computer 303, and from the communication device 304 and/or from any other associated device which may be utilized, if desired. The receiver 302H is also connected to the CPU 302A. The electronic cash device 302 also comprises a printer 302I or other appropriate output device for outputting data to the operator. The printer 302I is also connected to the CPU 302A. In the preferred embodiment, the printer 302I prints receipts corresponding to the electronic cash transaction.

In FIG. 11, the central processing computer 303, in the preferred embodiment, comprises a central processing unit or CPU 303A, associated random access memory 303B (RAM) and read only memory 303C (ROM) devices, which are connected to the CPU 303A, a user input device 303D, which is a keypad or any other suitable input device, for inputting data into the central processing computer 303 and which is also connected to the CPU 303A, and a display device 303E for displaying information and/or data to a user or operator.

The central processing computer 303 also comprises a transmitter(s) 303F for transmitting signals and/or data to the electronic cash device 302 and to the communication device 304 and/or to any one or more of the fax machine 305, the personal computer or personal digital assistant 306, the telephone 307, the telephone answering machine 308, the alternate telephone 309, the alternate telephone answering machine 310, the network computer 311, the alternate beeper 312, and/or the alternate pager 313. The transmitter (s) 303F is also connected to the CPU 303A. The central processing computer 303 also comprises a receiver(s) 303G for receiving signals and/or data from the electronic cash device 302 and from the communication device 304 and/or from any other suitable device which may be utilized in conjunction with the apparatus 300. The receiver(s) 303G is also connected to the CPU 303A.

The central processing computer 303 also comprises a database(s) 303H which contains electronic cash account information and data pertaining to the account owner's account(s). The database 303H contains information about the account owner, the account number, etc., and any other information and/or data necessary to the manage and/or process an account and/or account transaction as described herein. The database 303H is also connected to the CPU 303A. The central processing computer 303 also comprises a printer 303I or other appropriate output device for outputting information and/or data to a user or operator, which printer 303I or other output device is also connected to the CPU 303A.

In FIG. 11, the communication device 304, in the preferred embodiment, comprises a central processing unit or CPU 304A, associated random access memory 304B (RAM) and read only memory 304C (ROM) devices, which are also connected to the CPU 304A, a user input device 304D, which is a keypad or a plurality of keys and/or switches for inputting data into the communication device 304 and which is also connected to the CPU 304A, and a display device 304E, for displaying information and/or data to the account owner, and a database 304F. This display device 704E and the database 304F are also connected to the CPU 304A. The communication device 304 also comprises a receiver 304G for receiving signals and/or data from the central processing computer 303 and which is also connected to the CPU 304A, and a transmitter 304H for transmitting signals and/or data to the central processing computer 303 and which is also connected to the CPU 304A.

In the preferred embodiment, the communication device 304, which is utilized, is a pager with a reply feature such as a two-way pager and/or pager system(s).

The apparatus 300 of the present invention, in the preferred embodiment, may be utilized in order to facilitate account owner authorization, notification and/or security, in transactions involving electronic cash accounts and checking accounts, savings accounts and electronic currency accounts, ATM accounts and/or any transactions involving and/or related to same in the manner described below and with reference to FIGS. 12A, 12B and 12C. In this manner, the apparatus and method of the present invention may be utilized to obtain account owner authorization in an electronic cash transaction.

The apparatus 300 can be utilized in conjunction with an account card or cards which correspond to, or which are associated with electronic money, electronic cash and/or digital cash accounts.

Figure 12A:
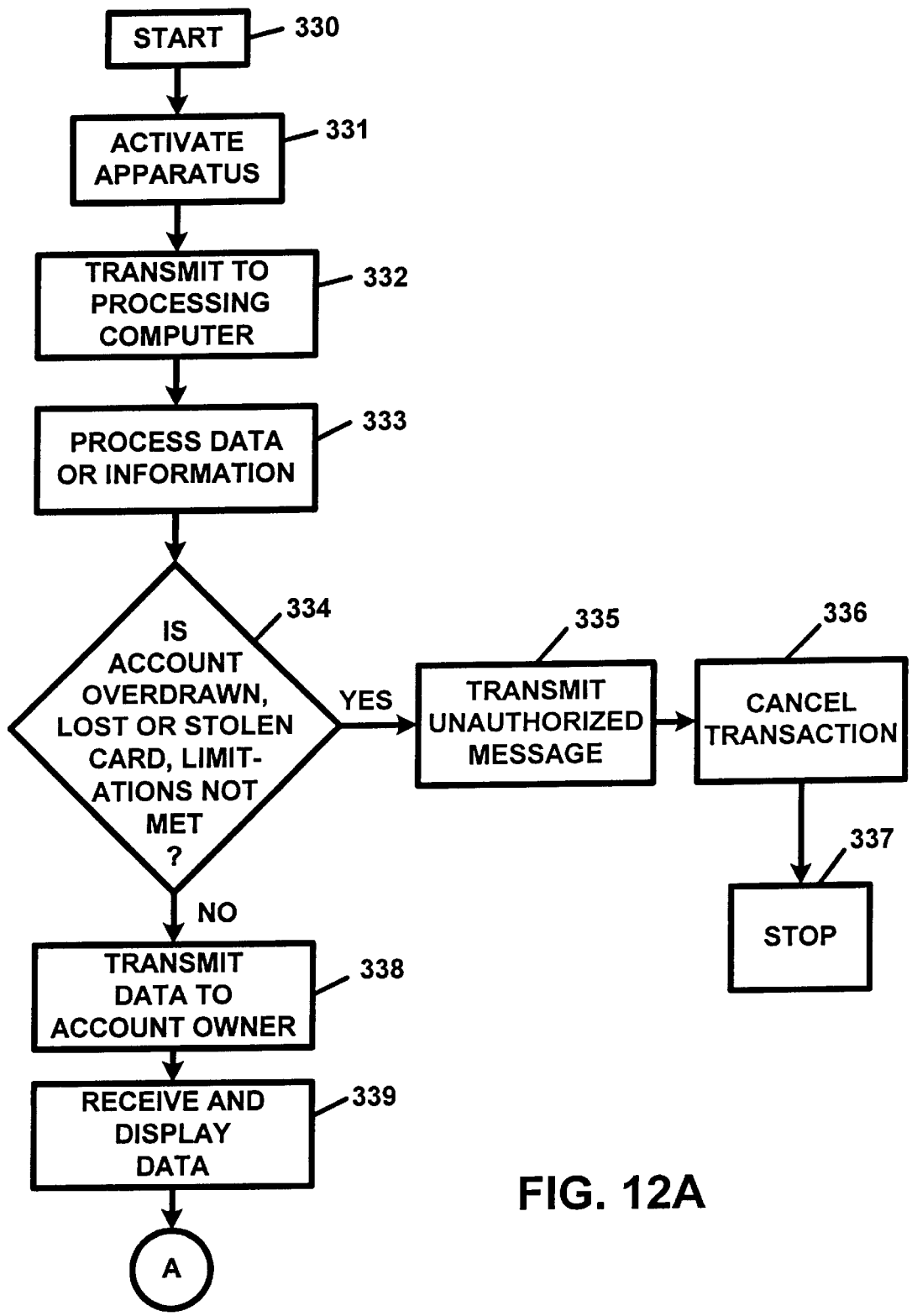
FIGS. 12A, 12B and 12C illustrate the operation of the apparatus of FIG. 10 in flow diagram form.
Figure 12B:
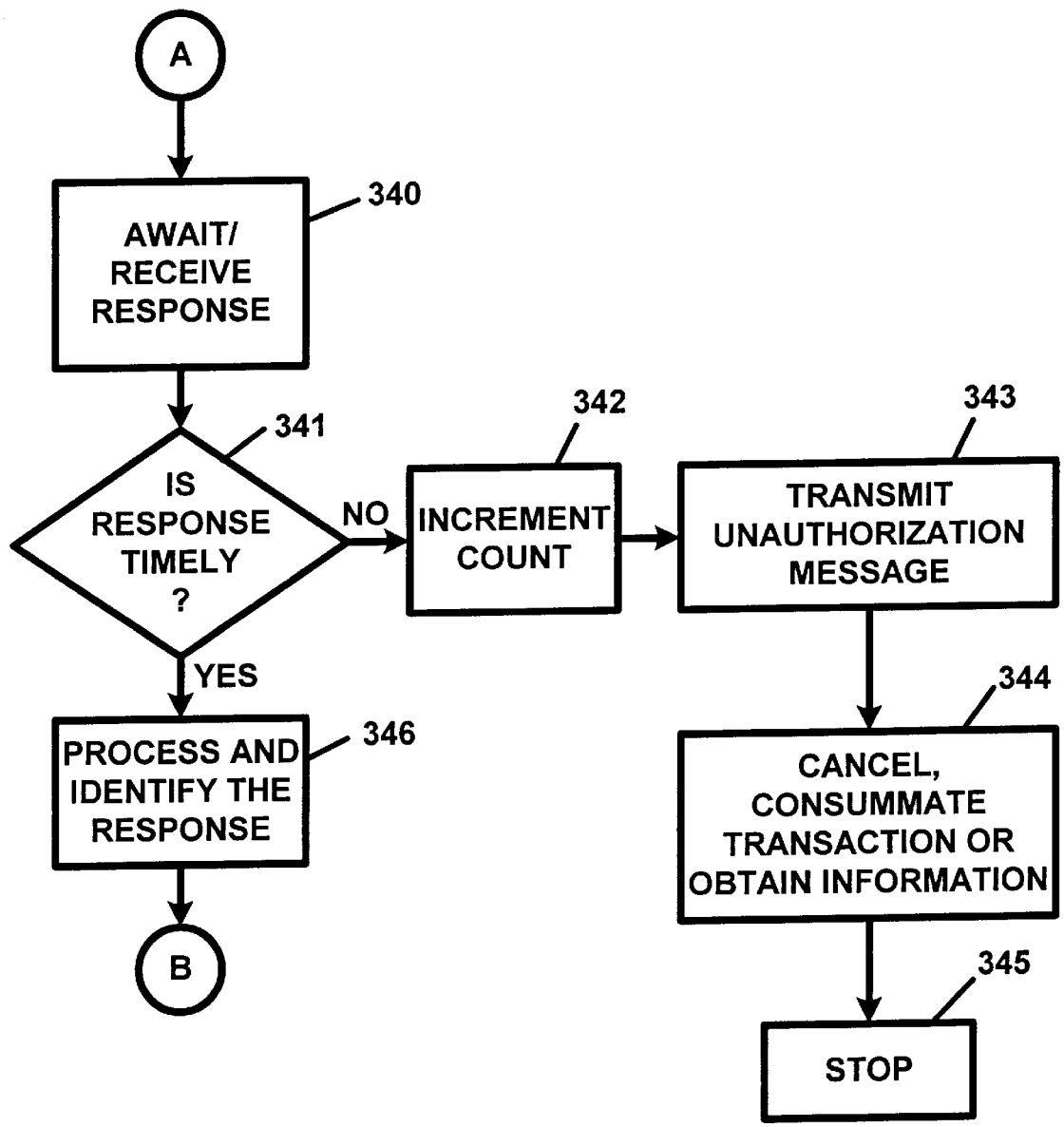
Figure 12C:
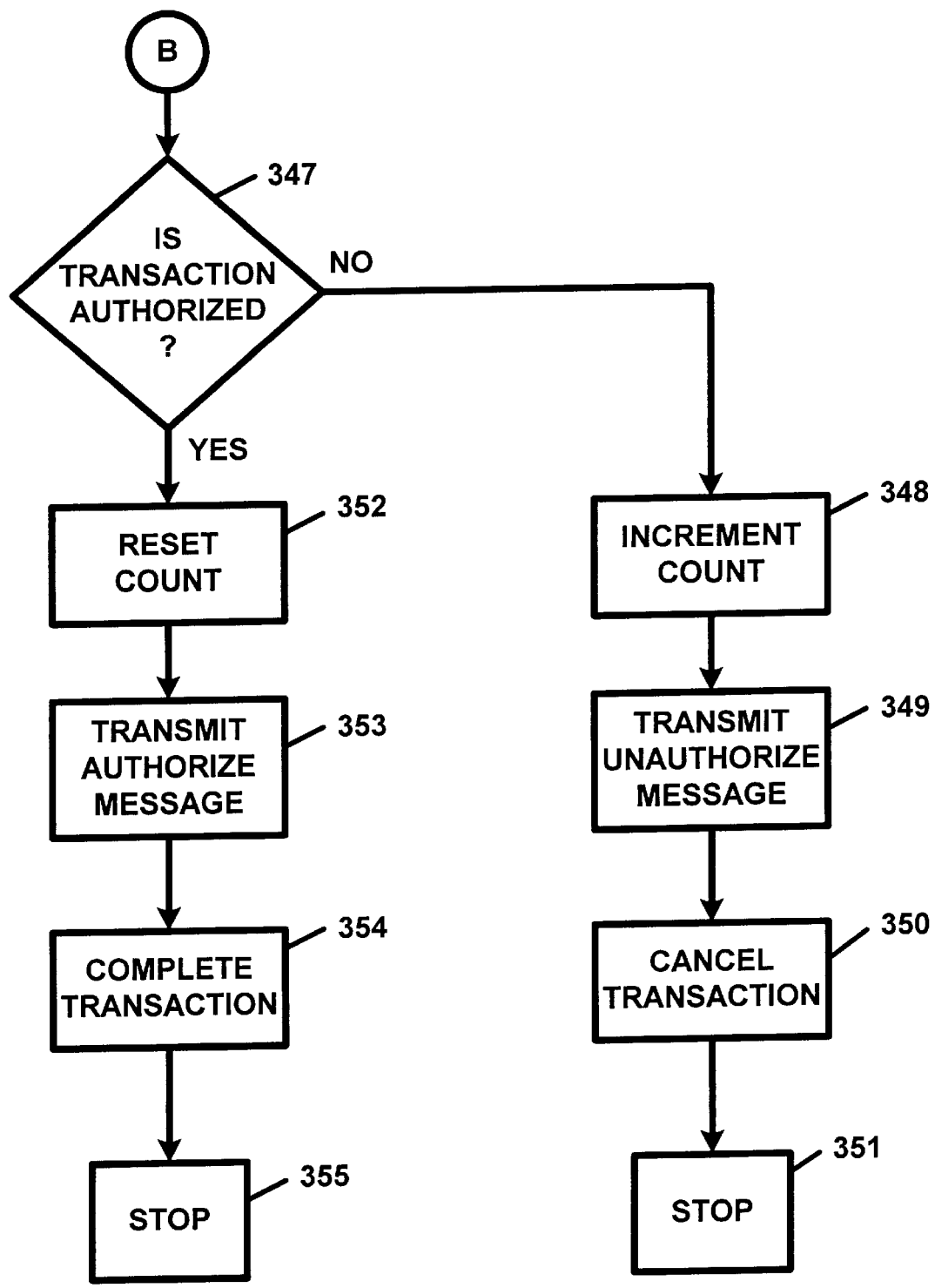

FIGS. 12A, 12B and 12C illustrate the operation of the apparatus 300 in flow diagram form. With reference to FIGS. 12A, 12B and 12C, the operation of the apparatus 300 commences at step 330 when the electronic cash transaction and/or instrument is presented to the electronic cash institution employee, representative and/or when an associated card is placed in a card reader, respectively. At step 331, the employee or representative of the electronic cash account services institution will activate the apparatus, via the electronic cash transaction device 302, in any typical manner, such as by entering account and/or card information, into the electronic cash transaction device 302. This data entry is typically performed by manual data entry and/or via a card reader, depending upon the transaction. For example, if an individual provides an electronic cash account number and amount, the employee or representative will enter the account information and/or transaction information into the electronic cash device 302 for processing. The information and/or data pertinent to the transaction is then transmitted, at step 332, to the central processing computer 303.

The central processing computer 303 will then, at step 333, process the information and/or data pertinent to the transaction and to the particular account. The central processing computer 303 may utilize any of the widely known data processing and/or software routines, which are known to those skilled in that art, in order to process transaction requests and/or authorizations involving the use of the respective account and/or account(s) and/or related account card(s).

The central processing computer 303 will process the information and/or data pertinent to the transaction in conjunction with the account information in order to determine the status of the account (i.e. whether any holds have been placed on the account, such as those prohibiting withdrawals and/or whether the account has been cancelled or de-activated). Further, the central processing computer 303 will then perform a test, at step 334, in order to determine if the transaction amount has reached and/or exceeded the amount available in the account and/or if the account card has been reported lost, stolen, cancelled and/or de-activated, and/or to determine whether any other pre-defined, pre-selected and/or programmed limitation(s) and/or restriction (s) have been met, satisfied and/or reconciled. The central processing computer 303 will also perform a test in order to determine if the predetermined maximum number count of unauthorized transactions, pre-defined in the preferred embodiment to be one (1), has occurred on the account.

The unauthorized transaction count refers to a count of the transactions which are not authorized by the account owner as will be described herein. The authorized transaction count (UNAUTHCT) is a variable which is pre-set to zero (0) at the time the account is opened. Each time an unauthorized transaction occurs, the unauthorized transaction count is incremented by one. Once the unauthorized transaction count reaches a pre-defined limit of, for example, one (1), although it may be pre-defined to be zero (0), the central processing computer 303 will cancel the transaction and de-activate the electronic cash account and/or the electronic cash account card. The central processing computer 303 will then notify the account owner. In this manner, the apparatus 300 will enable the central processing computer 303 of the institution to cancel and/or de-activate the account and/or the account card, either permanently or temporarily, in cases when the account owner may have failed to respond or to reply to transaction notices, which may be the case when the account owner is not aware that the account has been charged, overdrawn, and/or that the account card has been lost or stolen, cancelled or de-activated, duplicated, "cloned", or in other ways utilized without the account owner's knowledge or authorization, or when the account owner is unable to respond or reply to the transaction notices for some other reason(s). This feature of the present invention serves to place a transaction stop limit on the electronic cash account and/or on the use of an associated account card.

If any of the above listed conditions exist (i.e. account overdrawn and/or account card is lost, stolen, cancelled and/or de-activated), the central processing computer 303 will, at step 335, transmit a signal to the electronic cash transaction device 302 indicating that the transaction is not approved and/or is not authorized. The electronic cash device operator or employee may then cancel the transaction at step 336. The employee or representative may then alert the authorities and/or confiscate the account card. In the case when an automated device is utilized as the electronic cash device 302, the device may confiscate the electronic cash card automatically. Upon the completion of step 336, the apparatus will cease operation at step 337.

If, at step 334, the central processing computer 303 determines that the account is not overdrawn or that the electronic cash card is not lost, stolen, cancelled or de-activated, or that the number of unauthorized transactions count (UNAUTHCT) has not reached a predefined limit, and/or that predefined or pre-specified limitations and/or restrictions have been met, the central processing computer 303 will, at step 338, transmit a signal and/or data to the communication device 304 which is located at the account owner.

At step 338, the central processing computer 303 will then also transmit respective signals and/or data to any one or more of the cardholder's designated fax machine 305, personal computer or personal digital assistant 306, telephone 307, telephone answering machine 308, alternate telephone 309, alternate telephone answering machine 310, network computer 311, and/or alternate beeper 312 or alternate pager 313.

The information and/or data transmitted to the communication device 304 includes information and data identifying the transaction and may include the name of the institution where the transaction is taking place, the name of the product or service provider seeking the electronic cash payment or transfer, the account number and/or description, the amount of the transaction, the time of the transaction and the location (i.e. city, town, village, state, country etc.) of the transaction. The information and/or data may also include the phone number of the central processing office and/or computer servicing, and/or the institution handling the account so that the account owner may telephone same in order to authorize or cancel the transaction. The information and/or data may also be supplemented to include a description of the type of transaction.

At step 339, the information and/or data which is transmitted from the central processing computer 303, and received at the communication device 304, is displayed to the account owner on the display device 304E of the communication device 304. The information displayed on the display device 304 may include the name of the institution, the name of the product or service provider seeking the electronic cash payment or transfer the amount of the transaction, the time of the transaction and the location of the transaction. The information and/or data may also include the type of transaction.

The apparatus 300, at step 340, will then wait for the account owner to respond to the transmission. During this time, the account owner may either utilize the reply or two-way pager feature on the communication device 304 in order to either approve, or authorize, the transaction or disapprove of, or void, the transaction. At step 340, the apparatus 300 will receive the reply or response from the account owner. At step 341, the central processing computer 303 will determine if the account owner has made a reply or response within the pre-defined time limit which is chosen, in the preferred embodiment, to be one (1) minute. The account owner may also transmit a signal via an appropriate key or button suspending use of the account or the account card, such as when he or she may first be apprised of the fact that the account is being accessed without authorization, or the use thereof is unauthorized, or that the account card has been lost or stolen.

In instances when the communication device 304 does not have a reply or two-way pager feature, the account owner may simply telephone the central processing office or processing center and/or the institution servicing the electronic cash account so as to personally reply or respond to the authorization request.

If, at step 341, it is determined that the account owner's reply or response was not made within the pre-specified time, chosen in the preferred embodiment to be one (1) minute, the central processing computer 303 will, at step 342, increment the unauthorized transaction count (UNAUTHCT) by one (1) and will, at step 343, transmit a signal and/or data to the electronic cash transaction device 302 indicating that the transaction is not authorized by the account owner. The electronic cash device operator may then, at step 344, either cancel the transaction, proceed to consummate the transaction, and/or attempt to obtain additional information or identification from the customer and/or obtain an alternate account number from which to draw against.

The action taken by the electronic cash transaction device operator may be dictated by the specific agreement in effect between the account owner and the institution which services the electronic cash account(s). Upon the completion of step 344, the operation of the apparatus will cease at step 345. If the account owner should reply or respond to the transaction notice at a later period, this information may then be utilized to approve of or to disapprove and/or to dispute the transaction.

If, at step 341, it is determined that the reply or response was timely, the central processing computer 303 will, at step 346, process and identify the account owner response. At step 347, the central processing computer 303 will determine if the account owner has authorized the transaction. If the account owner's response is to cancel, to disapprove, or to not authorize, the transaction, the central processing computer 303 will, at step 348, increment the unauthorized transaction count (UNAUTHCT) by 1. At this juncture, it is important to note that the unauthorized count (UNAUTHCT) is set to zero at the time of the opening of the account.

After the unauthorized transaction count has been incremented, the central processing computer 303 will, at step 349, transmit a signal and/or data to the electronic cash device 302 which will notify and/or instruct the electronic cash device operator that the transaction is not authorized and should, therefore, be cancelled or voided. The electronic cash device operator may then cancel the transaction at step 350. The electronic cash transaction device operator may then confiscate the account card and/or alert the authorities. In the case of an automated transaction device 302, the device may confiscate the card. Upon the completion of step 350, the apparatus will cease operation at step 357.

If, at step 347, the central processing computer 303 identifies the account owner's reply or response as being one to authorize the transaction, the central processing computer 303 will, at step 357, reset the unauthorized transaction count (UNAUTHCT) to zero (0). The central processing computer 303 will then, at step 353, transmit a signal and/or data to the electronic cash device 302 which will notify and/or instruct the electronic cash device operator, and/or the account card machine, that the transaction is authorized and/or approved. The electronic cash device operator, and/or the account card machine, may then complete the transaction, at step 354. After the transaction has been completed at step 354, the operation of the apparatus 300 will cease at step 355.

In instances when the account owner is a party to the transaction, which may be the case in an electronic cash transaction, the account owner, having the communication device 304 on his or her person, may authorize the transaction at the point or time of the transaction. If the transaction is an overnight or other remotely made transaction, such as in clearing and/or account settling transactions, the account owner may authorize the transaction from his or her remote location.

The account owner may also program and/or set the communication device 304 so as to automatically authorize or disapprove or disallow transactions. In this regard, the communication device 304 may be programmable so as to receive and analyze the transaction information and/or data and reply or respond to same automatically and/or with preset or programmed replies and/or responses. The communication device 304 may also be programmable so as to limit the amounts of transactions. In this regard, the account owner may provide for temporary transaction types and/or amounts.

The communication device 304, in the preferred embodiment, is provided with a memory device for storing any number of transactions so that the account owner may review his or her account activity and/or transactions which have occurred involving his or her electronic cash accounts and/or corresponding account card. In this manner, the account owner may "scroll" through and/or in other ways review account activity. The communication device 304 may also be equipped to service more than one electronic cash accounts and/or account cards. For example, any number and/or types of electronic cash accounts may be serviced with or by a single communication device 304.

The apparatus and method of the present invention provides for the real-time notification of electronic cash and/or digital cash transactions involving various electronic cash and/or digital cash accounts and enables an account owner to monitor, in real-time, activity involving his or her accounts and/or account card(s) associated and/or corresponding therewith.

The apparatus and method of the present invention also provides a means and a mechanism by which to inform an account owner that his or her electronic cash electronic cash account is overdrawn, has been accessed and/or charged against and/or that his or her account card(s) are lost, stolen, cancelled or de-activated and/or provides an indication to the account owner of when and/or where his or her accounts are being accessed in transactions. The account owner may then report the unauthorized activity, and/or the discovery of a lost or stolen account card, and/or cancel and/or de-activate the respective account(s) and/or account card(s).

In other alternate embodiments of the present invention, the apparatus and method of the present invention can be utilized in conjunction with wireless and/or cellular communication devices and/or telephones.

Figure 13:
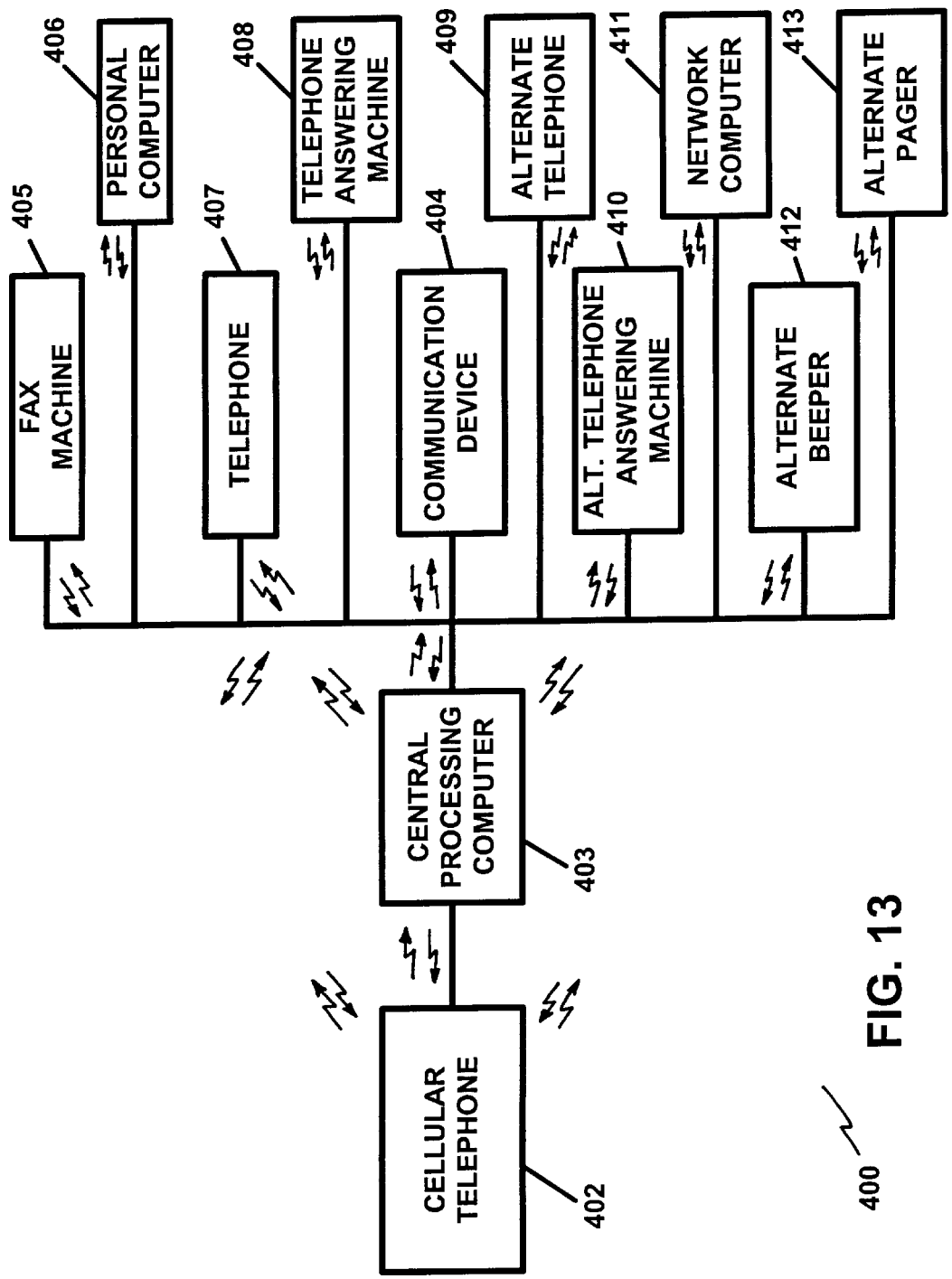
FIG. 13 illustrates a block diagram of an alternate embodiment of the apparatus of the present invention which is utilized in conjunction with a cellular and/or a mobile telephone.

FIG. 13 illustrates a block diagram of an alternate embodiment of the apparatus of the present invention which is utilized in conjunction with a cellular or mobile telephone (hereinafter referred to as "cellular telephone") and/or corresponding cellular telephone account number and/or information related thereto. The apparatus of FIG. 13 is denoted generally by the reference numeral 400. In FIG. 13, the apparatus 400 consists of a cellular telephone 402 which may be any typical cellular and/or mobile telephone. Any other cellular and/or mobile communication device may also be utilized.

The cellular telephone 402 may be any of the widely used and well known wireless telephones, wireless communication devices, cellular telephones and/or mobile communication device(s). In the embodiment of FIG. 13, the cellular telephone 402 serves as the transaction device which is described above in conjunction with the previous embodiments. As is the case with wireless telephones, wireless communication devices, cellular telephones, the cellular telephone may transmit the authorization request and/or notice to a central processing computer. The cellular telephone 402 may, but need not, receive authorization data and/or information from the central processing computer. The cellular telephone 402 may also comprise, or have associated therewith, a keypad for the manual entry of transaction information and/or data, such as the telephone number and various command codes utilized in making or placing a telephone call.

The apparatus 400 also comprises a central processing computer 403 which services any predefined group of wireless telephones, wireless communication devices, cellular telephones or cellular communication devices. For example, the central processing computer 403 may handle all cellular telephone accounts for a given telecommunications company and/or area. The central processing computer 403, for example, may process and maintain records of cellular telephone calls, including billing information, for any number of wireless telephones, wireless communication devices, cellular telephones, cellular telephone accounts, and/or cellular telephone owners which or who are serviced by a particular communications company or central processing office or computer.

The central processing computer 403 may be a mainframe computer, a mini-computer, a micro-computer, a server computer, such as those utilized in conjunction with on-line services and/or in a network environment, and/or any other suitable computer or computer system.

The central processing computer 403 may also process accounts for any of the various cellular and/or mobile communications accounts and/or devices. In the preferred embodiment, the cellular telephone 402 is linked and/or connected to the central processing computer 403 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems, cable television systems, broadband communication systems, as well as any other appropriate communications system. The cellular telephone 402 transmits signals and/or data to the central processing computer 403 as well as receives signals and/or data from the central processing computer 403.

The apparatus 400 also comprises a cellular telephone owner communication device 404 which may receive signals and/or data from either or both of the cellular telephone 402 and/or the central processing computer 403. In the embodiment of FIG. 13, the communication device 404 receives signals and data from the central processing computer 403 with said signals being transmitted via a suitable communication system. In the embodiment of FIG. 13, the communications system utilized for transmitting signals and/or data to the communication device 404 is a wireless telephone network or line and the communication device 404 is a wireless telephone signal receiving device such as a telephone beeper or pager. The communication device 404 or pager receives the wireless telephone signals and/or data from the central processing computer 403 during the authorization procedure as will be described in more detail below.

In the preferred embodiment, the communication device 404 is also equipped with a transmitter for transmitting signals and/or data to the central processing computer 403. In this regard, the central processing computer 403 transmits signals and/or data to the communication device 404 as well as receives signals and/or data from the communication device 404. The communication device 404 may also transmit signals and/or data directly to the cellular telephone 402 and receive signals and/or data directly from the cellular telephone 402.

In the preferred embodiment, signals and/or data which are transmitted by the cellular telephone 402 are received at the central processing computer 403. The cellular telephone 402 also receives signals and/or data from the central processing computer 403. Further, in the alternate embodiment of FIG. 13, the communication device 404 receives signals and/or data from the central processing computer 403 and transmits signals and/or data to the central processing computer 403.

As noted above, the communication device 404 is a wireless device. In this regard, the communication device 404 or pager may be carried by the cellular telephone owner and/or be kept on and/or close to the cellular telephone owner's person so that the central processing computer 403 may transmit signals and/or data to the communication device 404 so as to communicate with the cellular telephone owner at any time.

In the alternate embodiment of FIG. 13, the apparatus 400 also comprises a facsimile (fax) machine 405, a personal computer or personal digital assistant 406, a telephone 402, a telephone answering machine 408, an alternate telephone 409, an alternate telephone answering machine 410, a network computer 411, an alternate beeper 412, and an alternate pager 413.

The central processing computer 403 may be linked with the above fax machine 405, personal computer or personal digital assistant 406, telephone 407 and associated answering machine 408 alternate telephone 409 and associated answering machine 410, network computer 411, alternate beeper 412 and/or alternate pager 413, via any suitable communication system. In the preferred embodiment, a telecommunications link or telephone line or link, which may or may not be a wireless link depending on the device and/or the circumstances, is utilized in order to link the central processing computer 403 with each of the fax machine 405, the personal computer or personal digital assistant 406, the telephone 407 and associated answering machine 408, the alternate telephone 409 and associated answering machine 410, the network computer 411, the alternate beeper 412, and/or the alternate pager 413.

Figure 14:
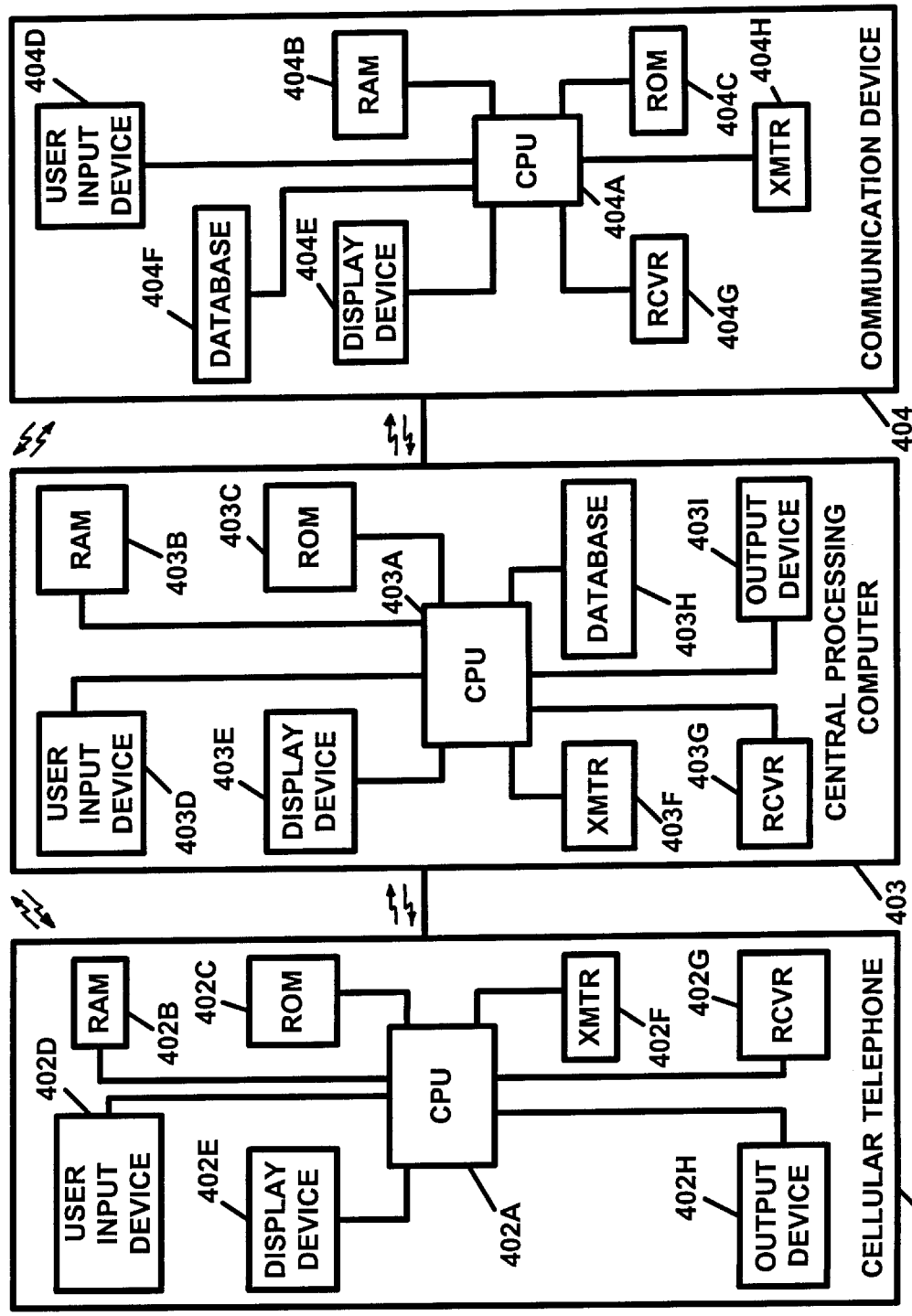
FIG. 14 illustrates the various components of the apparatus of FIG. 13.

FIG. 14 illustrates the various components of the apparatus 400 of FIG. 13. In FIG. 14, the cellular telephone 402, in the preferred embodiment, comprises a central processing unit or CPU 402A, associated random access memory 402B (RAM) and read only memory 402C (ROM) devices, which are also connected to the CPU 402A, a user input device 402D, which is a typically a keypad or other suitable input device for inputting data into the cellular telephone 402 and which is also connected to the CPU 402A, and a display device 402E for displaying information and/or data to a user or operator.

The cellular telephone 402 also comprises a transmitter 402F for transmitting signals during normal telephone operation and/or for transmitting signals and/or data to the central processing computer 403, and/or to the communication device 404 and/or to any other device associated with the account owner or apparatus 400 if desired. The transmitter 402F is also connected to the CPU 402A. The cellular telephone 402 also comprises a receiver 402G for receiving signals during normal telephone operation and/or for receiving signals and/or data from the central processing computer 403, and from the communication device 404 and/or from any other associated device which may be utilized, if desired.

The receiver 402G is also connected to the CPU 402A. The cellular telephone 402 may also comprise a printer 402H or other appropriate output device for outputting data to the user. The printer 402H, if utilized, is also connected to the CPU 402A. In the preferred embodiment, the printer 402H prints receipts corresponding to the transaction and/or information transmitted during the telephone call or transaction.

In FIG. 14, the central processing computer 403, in the preferred embodiment, comprises a central processing unit or CPU 403A, associated random access memory 403B (RAM) and read only memory 403C (ROM) devices, which are connected to the CPU 403A, a user input device 403D, which is a keypad or any other suitable input device for inputting data into the central processing computer 403 and which is also connected to the CPU 403A and a display device 403E for displaying information and/or data to a user or operator.

The central processing computer 403 also comprises a transmitter(s) 403F for transmitting signals and/or data to the cellular telephone 404 and to the communication device 404 and/or to any other device which may be utilized and/or to any one or more of the fax machine 405, personal computer or personal computer or personal digital assistant 406, telephone 407 and associated answering machine 408, alternate telephone 409 and associated answering machine 410, network computer 411, alternate beeper 412, and/or alternate pager 413. The transmitter(s) 403F is also connected to the CPU 403A. The central processing computer 403 also comprises a receiver(s) 403G for receiving signals and/or data from the cellular telephone 404 and from the communication device 404 and/or from any other suitable device which may be utilized in conjunction with the apparatus 400. The receiver(s) 403G is also connected to the CPU 403A.

The central processing computer 403 also comprises a database(s) 403H which contains account information and data pertaining to the cellular telephone owner(s) and/or account(s). The database 403H contains information about the cellular telephone owner, the telephone number, etc., and any other information and/or data necessary to the manage and/or process an account and/or account transaction as described herein. The database 403H may also contain information regarding any limitations and/or restrictions placed on the cellular telephone and/or the use thereof. The database 403H is also connected to the CPU 403A. The central processing computer 403 also comprises a printer 403I or other appropriate output device for outputting information and/or data to a user or operator.

In FIG. 14, the communication device 404, in the preferred embodiment, comprises a central processing unit or CPU 404A, associated random access memory 404B (RAM) and read only memory 404C (ROM) devices, which also connected to the CPU 404A, a user input device 404D, which is a keypad or a plurality of keys and/or switches for inputting data into the communication device 404 and which is also connected to the CPU 404A, and a display device 404E, for displaying information and/or data to the cellular telephone owner, and a database 404F, which are also connected to the CPU 404A.

The communication device 404 also comprises a receiver 404G for receiving signals and/or data from the central processing computer 403 and which is also connected to the CPU 404A, a transmitter 404H for transmitting signals and/or data to the central processing computer 403 and which is also connected to the CPU 404A. In the preferred embodiment, the communication device 404 utilized is a pager with a reply feature and/or device. A two-way pager and/or pager systems may also be utilized for implementing the respective components, and/or systems in the communication device 404/central processing computer 403 combination and/or link.

The apparatus 400 of the present invention, in the preferred embodiment, may be utilized in order provide cellular telephone owner and/or account owner authorization, notification and/or security measures in transactions involving wireless telephones, wireless communication devices, cellular telephones and/or cellular telephone numbers, and any transactions involving same in the manner described below and with reference to FIG. 11. In this manner, the apparatus and method of the present invention may be utilized to obtain cellular telephone owner and/or account owner authorization in a transaction involving wireless telephones, wireless communication devices, cellular telephones and/or cellular telephone numbers.

The apparatus 400 can be utilized in conjunction with an account card or cards which correspond to, or which are associated with cellular device and/or telephone accounts.

Figure 15A:
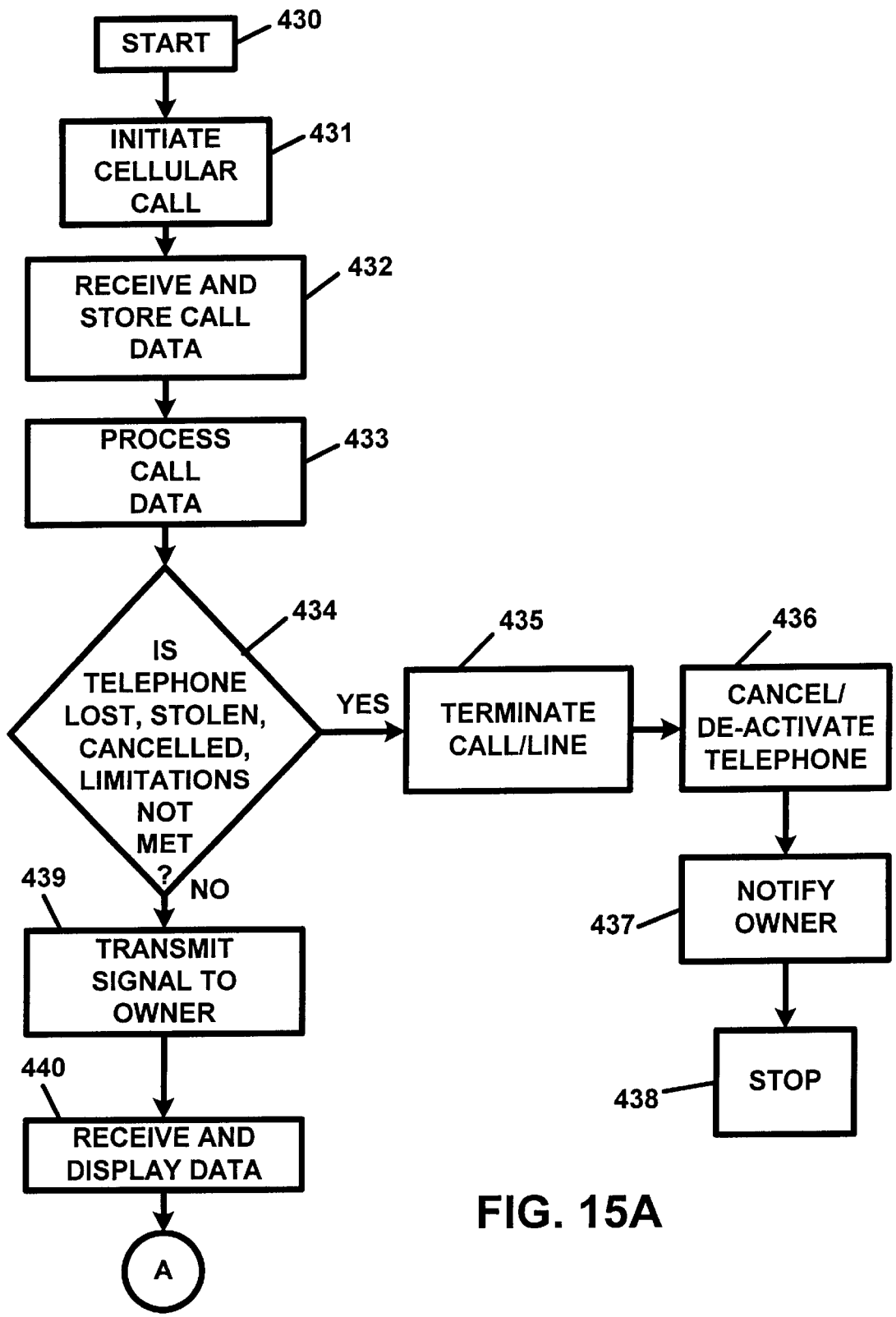
FIGS. 15A, 15B and 15C illustrate the operation of the apparatus of FIG. 13 in flow diagram form.
Figure 15B:
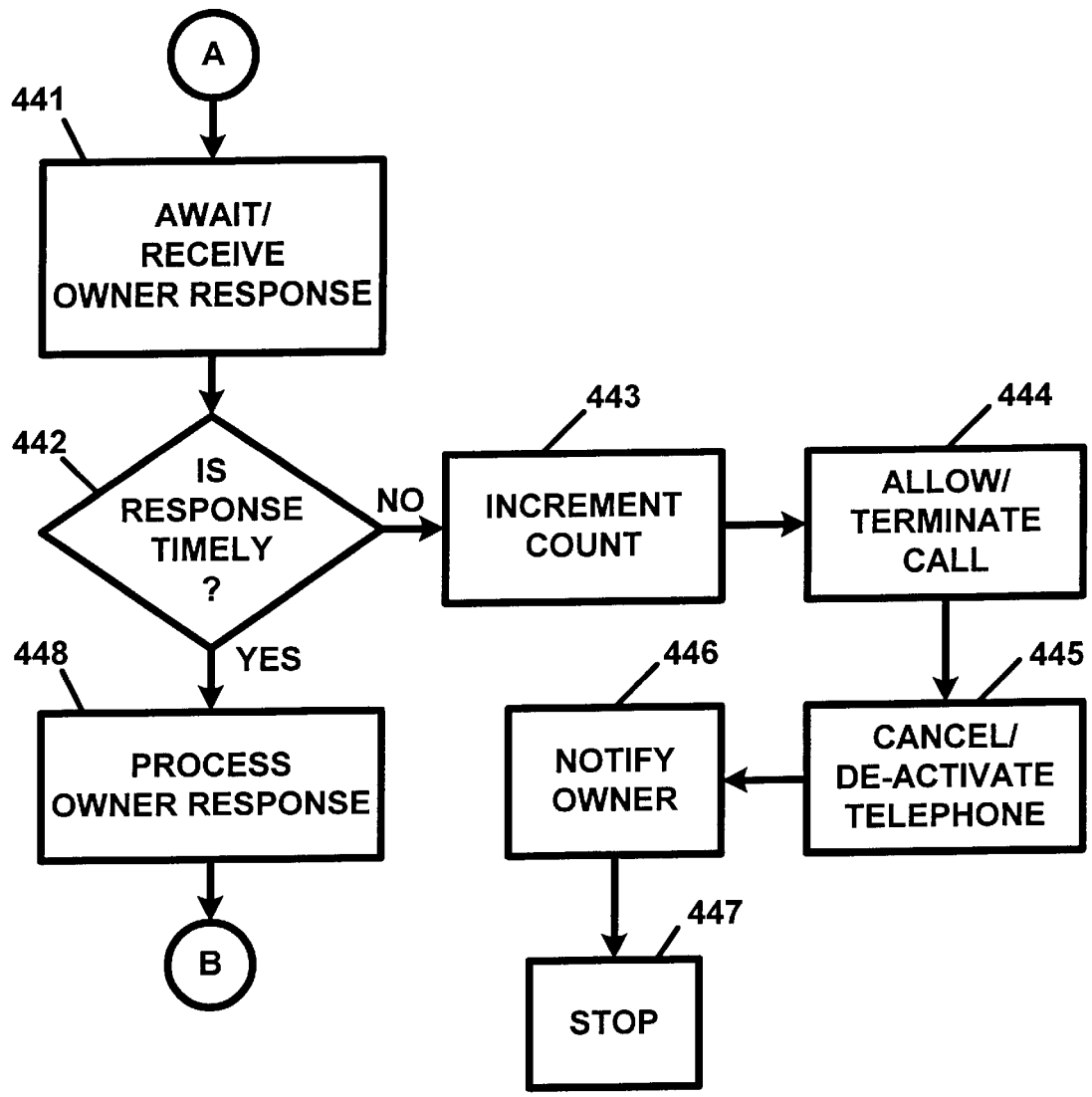
Figure 15C:
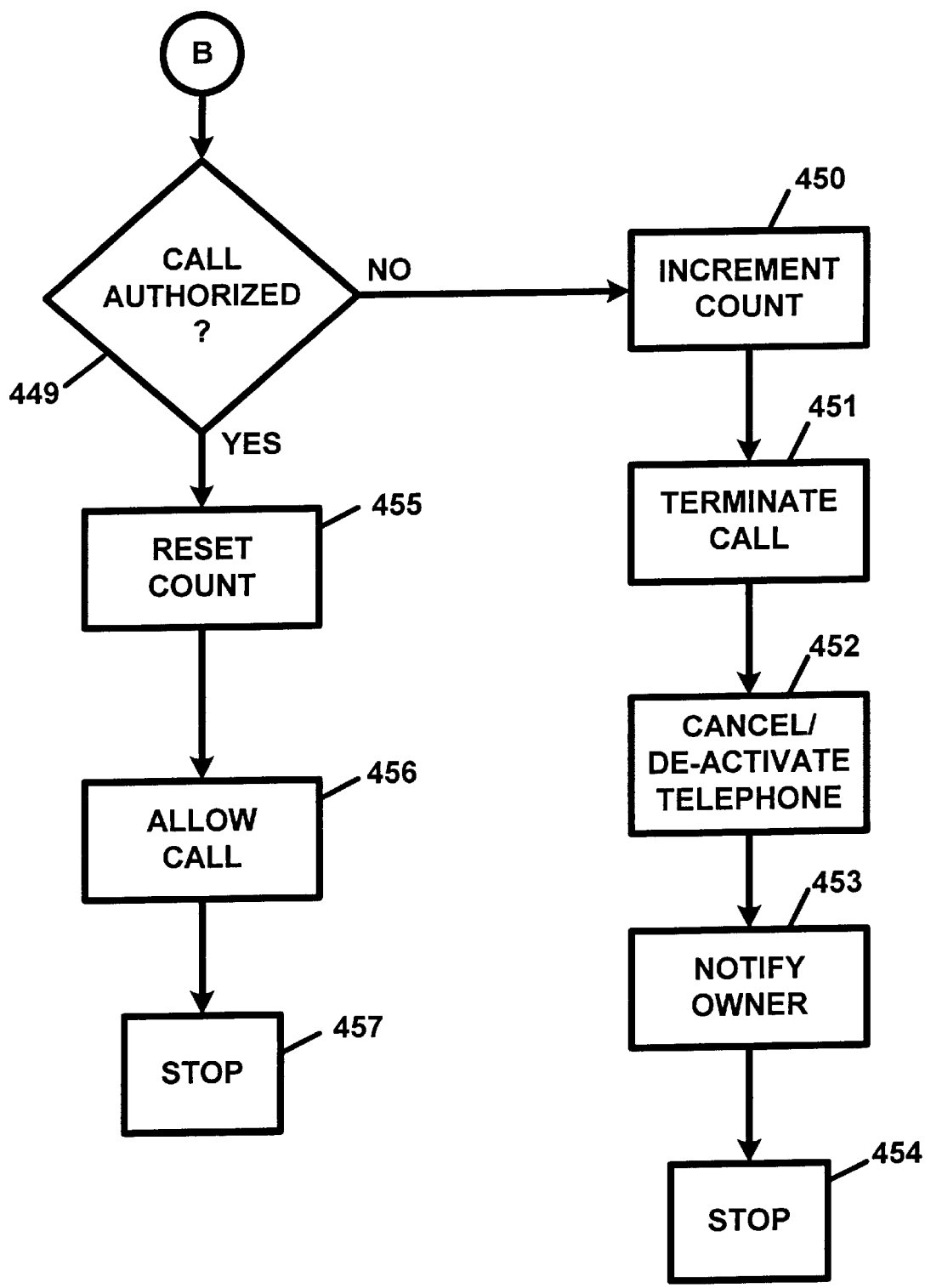

FIGS. 15A, 15B and 15C illustrate the operation of the apparatus 400 of FIG. 13 in flow diagram form. It is important to note, with regards to the apparatus 400 of FIG. 13, that the cellular telephone replaces the transaction device of the previously described embodiments. With reference to FIGS. 15A, 15B and 15C, the operation of the apparatus 400 commences at step 430 when the cellular telephone 404 is utilized to make a cellular telephone call and/or transaction.

The cellular telephone 402 will activate the apparatus 400, at step 431, with the initiation of the cellular telephone call, and/or in any other typical manner, such as when a cellular telephone is utilized to gain access to the telephone network so that the calling connection may be established via the cellular communications network and/or the cell site. Upon the making of the cellular telephone call, at step 431, the cellular telephone 402 will transmit data and/or information, which identifies the calling telephone, to the central processing computer which services the particular cellular telephone or cellular telephone network, so that appropriate billing and/or accounting of telephone usage may be noted and/or processed. In the preferred embodiment, the central processing computer for the particular cellular telephone and/or cellular telephone network is the central processing computer 403. At step 434, the central processing computer will receive and store the data and/or information which is transmitted by the cellular telephone 402. At step 433, the central processing computer 403 will process the data and/or information which is received from the cellular telephone 402.

The central processing computer 403 may utilize any of the widely known data processing and/or software routines, which are known to those skilled in that art, in order to process transaction requests and/or authorizations involving the use of the respective cellular telephone(s) and/or cellular communication device, and/or cellular telephone number. At step 434, the central processing computer 403 will perform a test in order to determine if the cellular telephone is lost, stolen, cancelled or de-activated. If the cellular telephone is determined to be lost, stolen, cancelled or de-activated, the central processing computer 403 will, at step 435, block the telephone call or terminate the call if it has already been connected. The central processing computer 403 will then, at step 436, cancel and/or de-activate the cellular telephone number or account. The central processing computer 403 will then, at step 437, notify the cellular telephone owner that his or her cellular telephone has been cancelled and/or de-activated. The operation of the apparatus will then cease at step 438.

If, at step 434, the central processing computer 403 determines that the cellular telephone is not lost, stolen, cancelled or de-activated, the central processing computer 403 will, at step 439, transmit a signal and/or data to the communication device 402 which is located at the cellular telephone owner. At step 440, the communication device 404 will receive and display the data and/or information which is transmitted from the central processing computer 403. The displayed information, in the preferred embodiment, will include the number called, the time of the call, the destination of the call and the duration of the call, in real-time. The information will remain displayed during the duration of the call so that the cellular telephone owner will be notified continuously throughout the duration of the call.

At step 441, the central processing computer 403 will await the cellular telephone owner's reply or response. If the cellular telephone owner replies or responds, the reply or response data will also be transmitted to, and received by, the central processing computer 403 at step 441. At step 442, the central processing computer 403 will then determine if the cellular telephone owner's response was made within a pre-defined time period, which is chosen, in the preferred embodiment, to be one (1) minute. If at step 442, it is determined that the cellular telephone owner did not reply or respond within the predefined time limit, the central processing computer will, at step 443, increment the unauthorized transaction count (UNAUTHCT) by one (1).

The central processing computer 403 will then, depending upon pre-defined instructions of the cellular telephone owner, at step 444, either allow the telephone call to continue, such as for a pre-defined duration of one (1) minute, so as to allow for cases wherein an emergency condition exists, or terminate the telephone call immediately. The decision to either allow the telephone call to continue or to terminate the telephone call can be made by the cellular telephone owner and/or by the cellular telephone service provider. Upon the completion of step 444, the central processing computer 403 will then, at step 445, cancel and/or de-activate the cellular telephone. Thereafter, the central processing computer 403 will, at step 446, notify the cellular telephone owner that the cellular telephone number or account has been cancelled and/or de-activated. Upon completion of step 446, the apparatus will cease operation at step 447.

If, at step 444, the cellular telephone owner did respond in time, the central processing computer 403 will process the reply or response data and/or information, at step 448. The central processing computer 403 will then determine, at step 449, if the cellular telephone call is authorized by the cellular telephone owner. If, at step 449, the cellular telephone call is unauthorized, the central processing computer will, at step 450, increment the unauthorized transaction count (UNAUTHCT) by one (1). The central processing computer 403 will then, at step 451, terminate the telephone call immediately. Upon the completion of step 451, the central processing computer 403 will then, at step 454, cancel and/or de-activate the cellular telephone. Thereafter, the central processing computer 403 will, at step 453, notify the cellular telephone owner that the cellular telephone has been cancelled and/or de-activated. Upon completion of step 453, the apparatus will cease operation at step 454.

If, at step 449, the central processing computer 403 identifies the cardholder reply or response as being one to authorize the cellular telephone call, the central processing computer 403 will, at step 455, reset the unauthorized transaction count (UNAUTHCT) to zero (0). An unauthorized transaction count (UNAUTHCT) of 0 will signify that any string of unauthorized transactions has now been broken by the cellular telephone owner. The central processing computer 403 will then, at step 456, allow the cellular telephone call to continue uninterrupted. Upon the completion of the cellular telephone call, at step 456, the apparatus 400 will cease operation at step 457.

In instances when the cellular telephone owner is a party to the cellular telephone call and/or transaction, he or she, having the communication device 404 on his or her person, may authorize the call and/or transaction at his or her present location. If the cellular telephone owner has lent out the cellular telephone, he or she may authorize the cellular telephone call and/or transaction from his or her remote location. The cellular telephone owner may also program and/or set the communication device 404 to automatically authorize or disapprove or disallow cellular telephone calls and/or transactions with said selective authorizations being made as to time of day, calling areas, numbers called, and/or call and/or transaction duration. In this regard, the communication device 404 may be programmable so as to receive and analyze the cellular telephone call information and/or data and reply or respond to same automatically and/or with preset or programmed replies and/or responses. The communication device 404 may also be programmable so as to limit the number of cellular telephone calls made from the cellular telephone and/or with the cellular telephone number.

The communication device 404, in the preferred embodiment, is provided with a memory device for storing any number of cellular telephone calls and/or transactions so that the cellular telephone owner may review his or her account activity and/or cellular calls and/or transactions made and/or which have occurred involving his or her cellular telephone. In this manner, the cellular telephone owner may "scroll" through and/or in other ways review account activity. The communication device 404 may also be equipped to service more than one cellular telephone and/or mobile communication device(s).

The apparatus and method of the present invention provides for the real-time notification of cellular and/or mobile telephone usage which enables a cellular telephone owner and/or account owner to monitor, in real-time, activity involving his or her cellular telephone and/or cellular telephone number. The apparatus and method of the present invention also provides a means and a mechanism by which to inform a cellular telephone owner that the cellular telephone is lost or stolen, and/or to provide notification to the cellular telephone owner that his or her cellular telephone number is being utilized in calls and/or transactions, such as when a cellular telephone has been illegally "cloned". The cellular telephone owner may then report the cellular telephone lost or stolen and/or cancel and/or de-activate the cellular telephone number and/or account.

The present invention also provides a means and a mechanism by which to monitor the number of cellular or mobile telephone calls and/or transactions which are unauthorized by the cellular telephone owner and to determine whether or not to de-activate the cellular telephone and/or the cellular telephone number and/or account. In the above manner, the apparatus and method of the present invention provides an apparatus and a method to prevent and/or to drastically limit fraudulent and/or unauthorized use of, and/or the "cloning" of, wireless telephones, wireless communication devices, cellular telephones and/or the unauthorized use of cellular telephone numbers.

The apparatus and method of the present invention may also be utilized in connection with an on-line service and/or on, or over, the Internet and/or the World Wide Web, so as to provide for a means by which the respective cardholders account owner, and/or cellular telephone owner, may utilize the apparatus and method in conjunction with a home and/or a personal computer, a personal communications device, and/or a commercial or industrial computer system (i.e., an internet server computer), and/or any other appropriate device, in any appropriate network, system or medium.

The present invention, in an alternate embodiment, may also be utilized so as to provide authorization, notification and/or security for, and in conjunction with, wireless communication device and/or communication systems wherein a wireless communication device owner and/or account owner may be notified of a transmission and/or an attempted transmission and/or wireless communication transaction made with his or her cellular or mobile telephone and/or with the telephone number and or transmission codes and/or associated signatures and/or data which corresponds to his or her wireless communication device.

The present invention, in an alternate embodiment, may also be utilized so as to provide authorization, notification and/or security for, and in conjunction with, wireless communication devices and/or wireless communication systems wherein a wireless communication device owner and/or account owner may be notified of a transmission and/or an attempted transmission and/or transaction made with his or her wireless communication device and/or with the account and/or telephone number and/or transmission codes and/or associated signatures and/or data which corresponds thereto.

Figure 16:
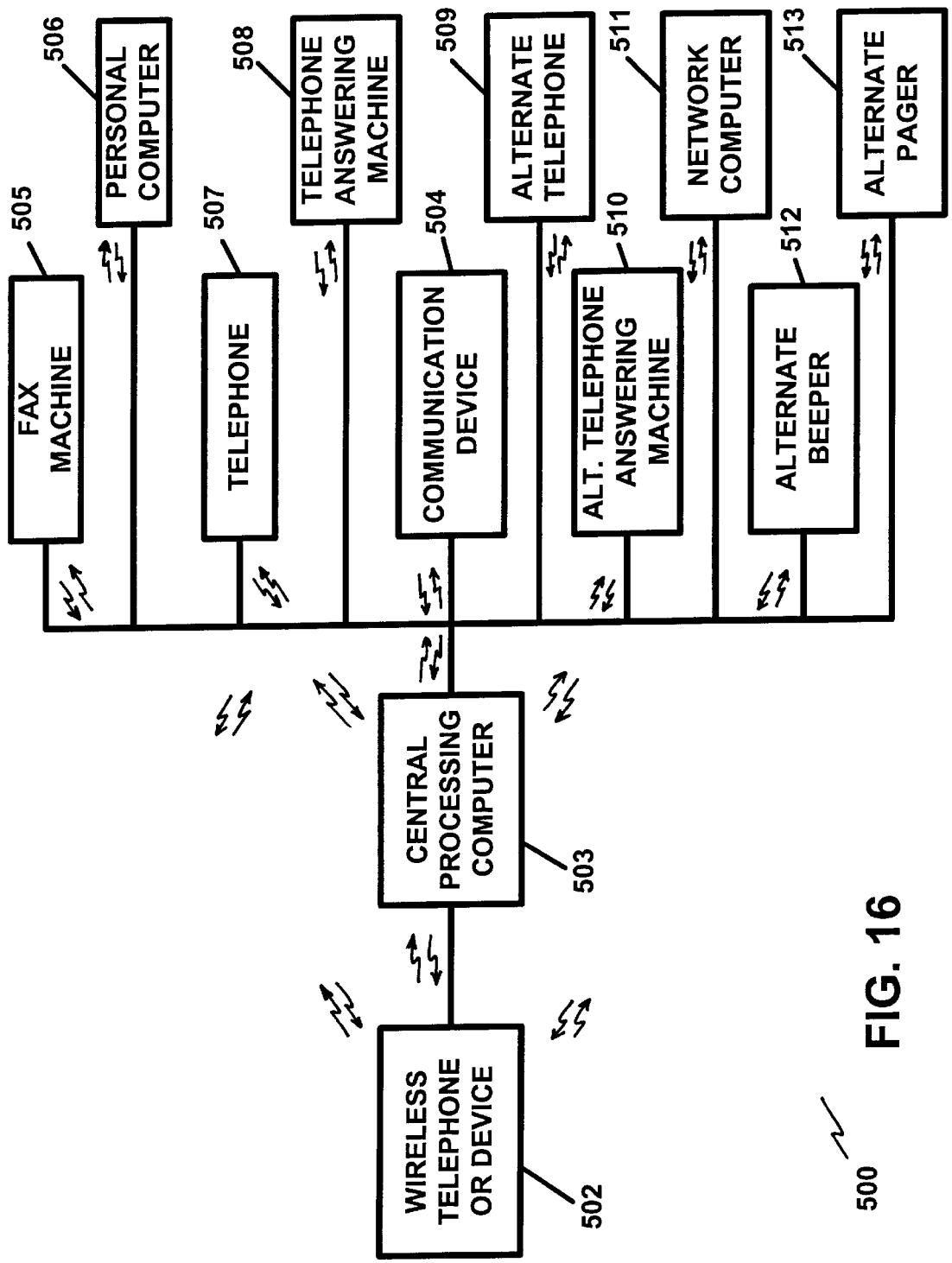
FIG. 16 illustrates a block diagram of an alternate embodiment of the apparatus of the present invention which is utilized in conjunction with a wireless telephone and/or communication device.

FIG. 16 illustrates a block diagram of an alternate embodiment of the apparatus of the present invention which is utilized in conjunction with a wireless communication device and/or telephone and/or corresponding wireless device and/or telephone account number and/or information related thereto which utilize any suitable wireless communication technology, including, but not limited to, telephone communication systems, personal communication services systems, digital communication systems, cable television transmission systems and broadband communication systems. The apparatus of FIG. 16 is denoted generally by the reference numeral 500. In FIG. 16, the apparatus 500 consists of a wireless device or telephone 502 which may be any typical wireless or mobile device or telephone. Any other wireless and/or mobile communication device may also be utilized. In this regard, wireless and/or mobile communication device includes, personal computers, laptop computers, palm-top computers, hand-held computers, portable facsimile machines, personal digital assistants, etc.

The wireless telephone 502 may be any of the widely used and well known wireless devices and/or telephones and/or mobile communication device(s). In the embodiment of FIG. 16, the wireless telephone 502 serves as the transaction device which is described above in conjunction with the previous embodiments. As is the case with wireless devices and/or telephones, the wireless device or telephone may transmit the authorization request and/or notice to a central processing computer. The wireless device or telephone 502 (hereinafter "wireless telephone") may, but need not, receive authorization data and/or information from the central processing computer. The wireless telephone 502 may also comprise, or have associated therewith, a keypad for the manual entry of transaction information and/or data, such as the telephone number and various command codes utilized in making or placing a telephone call.

The apparatus 500 also comprises a central processing computer 503 which services any predefined group of wireless telephones or wireless communication devices. For example, the central processing computer 503 may handle all wireless telephone accounts for a given telecommunications company and/or area. The central processing computer 503, for example, may process and maintain records of wireless telephone calls, including billing information, for any number of wireless telephones, wireless telephone accounts, and/or wireless telephone owners which or who are serviced by a particular communications company or central processing office or computer.

The central processing computer 503 may be a mainframe computer, a mini-computer, a micro-computer, a personal computer and/or a server computer, such as those utilized in conjunction with on-line services and/or in a network environment, and/or any other suitable computer or computer system.

The central processing computer 503 may also process accounts for any of the various wireless and/or mobile communications accounts and/or devices. In the preferred embodiment, the wireless telephone 502 is linked and/or connected to the central processing computer 503 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems, cable television communication systems, and/or broadband communication systems, as well as any other appropriate communications system. The wireless telephone 502 transmits signals and/or data to the central processing computer 503 as well as receives signals and/or data from the central processing computer 503.

The apparatus 500 also comprises a wireless telephone owner communication device 504 which may receive signals and/or data from either or both of the wireless telephone 502 and/or the central processing computer 503. In the embodiment of FIG. 16, the communication device 504 receives signals and data from the central processing computer 503 with said signals being transmitted via a suitable communication system. In the embodiment of FIG. 16, the communications system utilized for transmitting signals and/or data to the communication device 504 is a wireless telephone network or line and the communication device 504 is a wireless telephone signal receiving device such as a telephone beeper or pager. The communication device 504 or pager receives the wireless telephone signals and/or data from the central processing computer 503 during the authorization procedure as will be described in more detail below.

In the preferred embodiment, the communication device 504 is also equipped with a transmitter for transmitting signals and/or data to the central processing computer 503. In this regard, the central processing computer 503 transmits signals and/or data to the communication device 504 as well as receives signals and/or data from the communication device 504. The communication device 504 may also transmit signals and/or data directly to the wireless telephone 504 and receive signals and/or data directly from the wireless telephone 502.

In the preferred embodiment, signals and/or data which are transmitted by the wireless telephone 502 are received at the central processing computer 503. The wireless telephone 502 also receives signals and/or data from the central processing computer 503. Further, in the alternate embodiment of FIG. 16, the communication device 504 receives signals and/or data from the central processing computer 503 and transmits signals and/or data to the central processing computer 503.

As noted above, the communication device 504 is a wireless device. In this regard, the communication device 504 or pager may be carried by the wireless telephone owner and/or be kept on and/or close to the wireless telephone owner's person so that the central processing computer 503 may transmit signals and/or data to the communication device 504 so as to communicate with the wireless telephone owner at any time.

In the alternate embodiment of FIG. 16, the apparatus 500 also comprises a facsimile (fax) machine 505, a personal computer or personal digital assistant 506, a telephone 507, a telephone answering machine 508, an alternate telephone 509, an alternate telephone answering machine 510, a network computer 511, an alternate beeper 512, and an alternate pager 513.

The central processing computer 503 may be linked with the above fax machine 505, personal computer or personal digital assistant 506, telephone 507 and associated answering machine 508, alternate telephone 509 and associated answering machine 510, network computer 511, alternate beeper 512 and/or alternate pager 513, via any suitable communication system. In the preferred embodiment, a telecommunications link or telephone line or link, which may or may not be a wireless link depending on the device and/or the circumstances, is utilized in order to link the central processing computer 503 with each of the fax machine 505, the personal computer or personal digital assistant 506, the telephone 507 and associated answering machine 508, the alternate telephone 509 and associated answering machine 510, the network computer 511, the alternate beeper 512, and/or the alternate pager 513.

Figure 17:
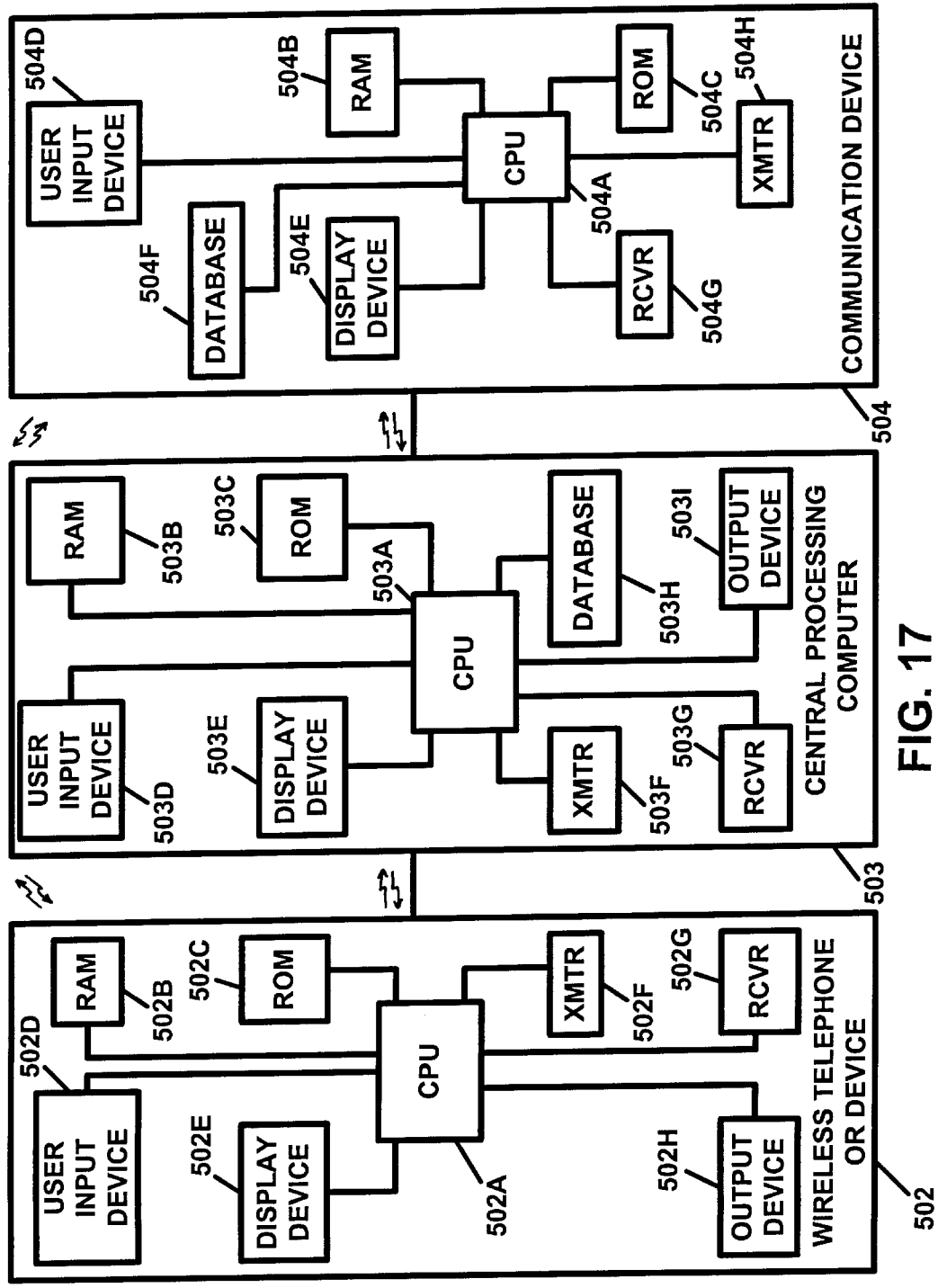
FIG. 17 illustrates the various components of the apparatus of FIG. 16.

FIG. 17 illustrates the various components of the apparatus 500 of FIG. 16. In FIG. 17, the wireless telephone. 504, in the preferred embodiment, comprises a central processing unit or CPU 504A, associated random access memory 504B (RAM) and read only memory 504C (ROM) devices, which are also connected to the CPU 504A, a user input device 504D, which is a typically a keypad or other suitable input device for inputting data into the wireless telephone 504 and which is also connected to the CPU 504A, and a display device 504E for displaying information and/or data to a user or operator.

The wireless telephone 502 also comprises a transmitter 502F for transmitting signals during normal telephone operation and/or for transmitting signals and/or data to the central processing computer 503, and/or to the communication device 504 and/or to any other device associated with the account owner or apparatus 500 if desired. The transmitter 502F is also connected to the CPU 502A. The wireless telephone 502 also comprises a receiver 502G for receiving signals during normal telephone operation and/or for receiving signals and/or data from the central processing computer 503, and from the communication device 502 and/or from any other associated device which may be utilized, if desired.

The receiver 502G is also connected to the CPU 502A. The wireless telephone 502 may also comprise a printer 502H or other appropriate output device for outputting data to the user. The printer 502H, if utilized, is also connected to the CPU 502A. In the preferred embodiment, the printer 502H prints receipts corresponding to the transaction and/or information transmitted during the telephone call or transaction.

In FIG. 17, the central processing computer 503, in the preferred embodiment, comprises a central processing unit or CPU 503A, associated random access memory 503B (RAM) and read only memory 503C (ROM) devices, which are connected to the CPU 503A, a user input device 503D, which is a keypad or any other suitable input device for inputting data into the central processing computer 503 and which is also connected to the CPU 503A and a display device 503E for displaying information and/or data to a user or operator.

The central processing computer 503 also comprises a transmitter(s) 503F for transmitting signals and/or data to the wireless telephone 502 and to the communication device 504 and/or to any other device which may be utilized and/or to any one or more of the fax machine 505, personal computer 506, telephone 507 and associated answering machine 508, alternate telephone 509 and associated answering machine 510, network computer 511, alternate beeper 512, and/or alternate pager 513. The transmitter(s) 503F is also connected to the CPU 503A. The central processing computer 503 also comprises a receiver(s) 503G for receiving signals and/or data from the wireless telephone 502 and from the communication device 504 and/or from any other suitable device which may be utilized in conjunction with the apparatus 500. The receiver(s) 503G is also connected to the CPU 503A.

The central processing computer 503 also comprises a database(s) 503H which contains account information and data pertaining to the wireless telephone owner(s) and/or account(s). The database 503H contains information about the wireless telephone owner, the telephone number, etc., and any other information and/or data necessary to the manage and/or process an account and/or account transaction as described herein. The database 503H may also contain information regarding any limitations and/or restrictions placed on the wireless telephone and/or the use thereof. The database 503H is also connected to the CPU 503A. The central processing computer 503 also comprises a printer 503I or other appropriate output device for outputting information and/or data to a user or operator.

In FIG. 17, the communication device 504, in the preferred embodiment, comprises a central processing unit or CPU 504A, associated random access memory 504B (RAM) and read only memory 504C (ROM) devices, which also connected to the CPU 504A, a user input device 504D, which is a keypad or a plurality of keys and/or switches for inputting data into the communication device 504 and which is also connected to the CPU 504A, and a display device 504E, for displaying information and/or data to the wireless telephone owner, and a database 504F, which are also connected to the CPU 504A.

The communication device 504 also comprises a receiver 504G for receiving signals and/or data from the central processing computer 503 and which is also connected to the CPU 504A, a transmitter 504H for transmitting signals and/or data to the central processing computer 503 and which is also connected to the CPU 504A. In the preferred embodiment, the communication device 504 utilized is a pager with a reply feature and/or device. A two-way pager and/or pager systems may also be utilized for implementing the respective components, and/or systems in the communication device 504/central processing computer 503 combination and/or link.

The apparatus 500 of the present invention, in the preferred embodiment, may be utilized in order provide wireless telephone owner and/or account owner authorization, notification and/or security measures in transactions involving wireless telephones and/or wireless telephone numbers, and any transactions involving same in the manner described below and with reference to FIG. 17. In this manner, the apparatus and method of the present invention may be utilized to obtain wireless telephone owner and/or account owner authorization in a transaction involving wireless telephones and/or wireless telephone numbers.

The apparatus 500 can be utilized in conjunction with an account card or cards which correspond to, or which are associated with wireless device and/or telephone accounts.

Figure 18A:
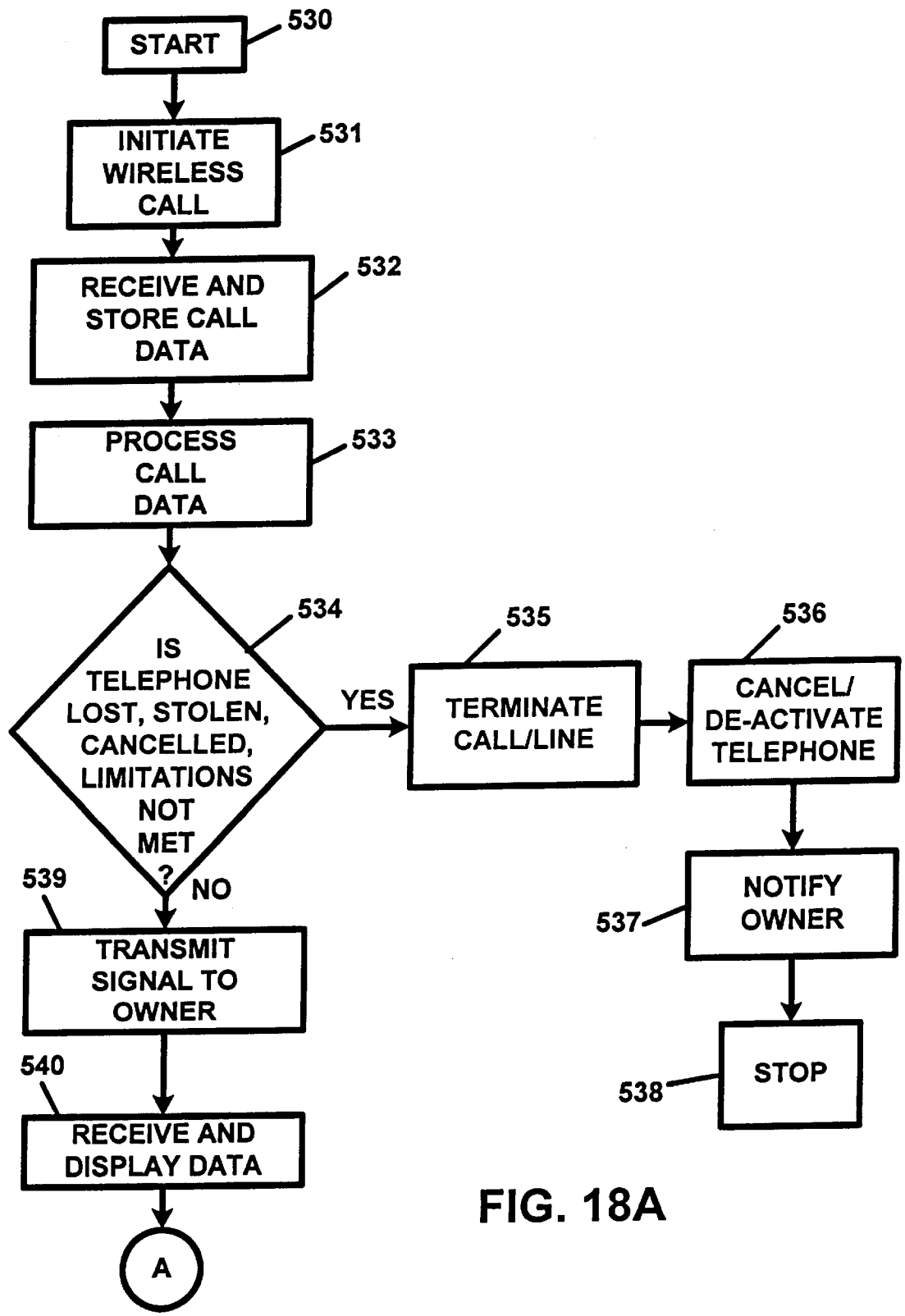
FIGS. 18A, 18B and 18C illustrate the operation of the apparatus of FIG. 16 in flow diagram form.
Figure 18B:
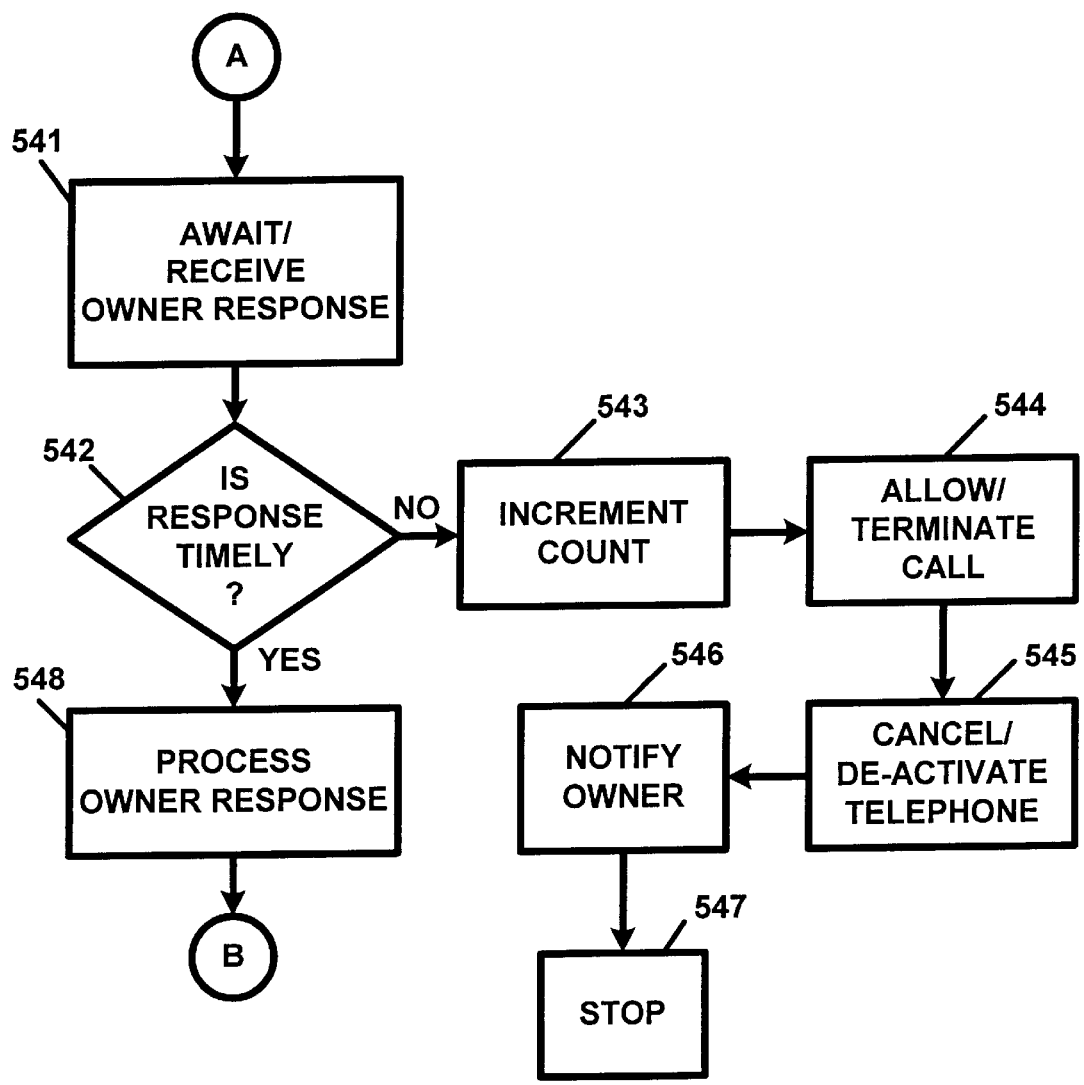
Figure 18C:
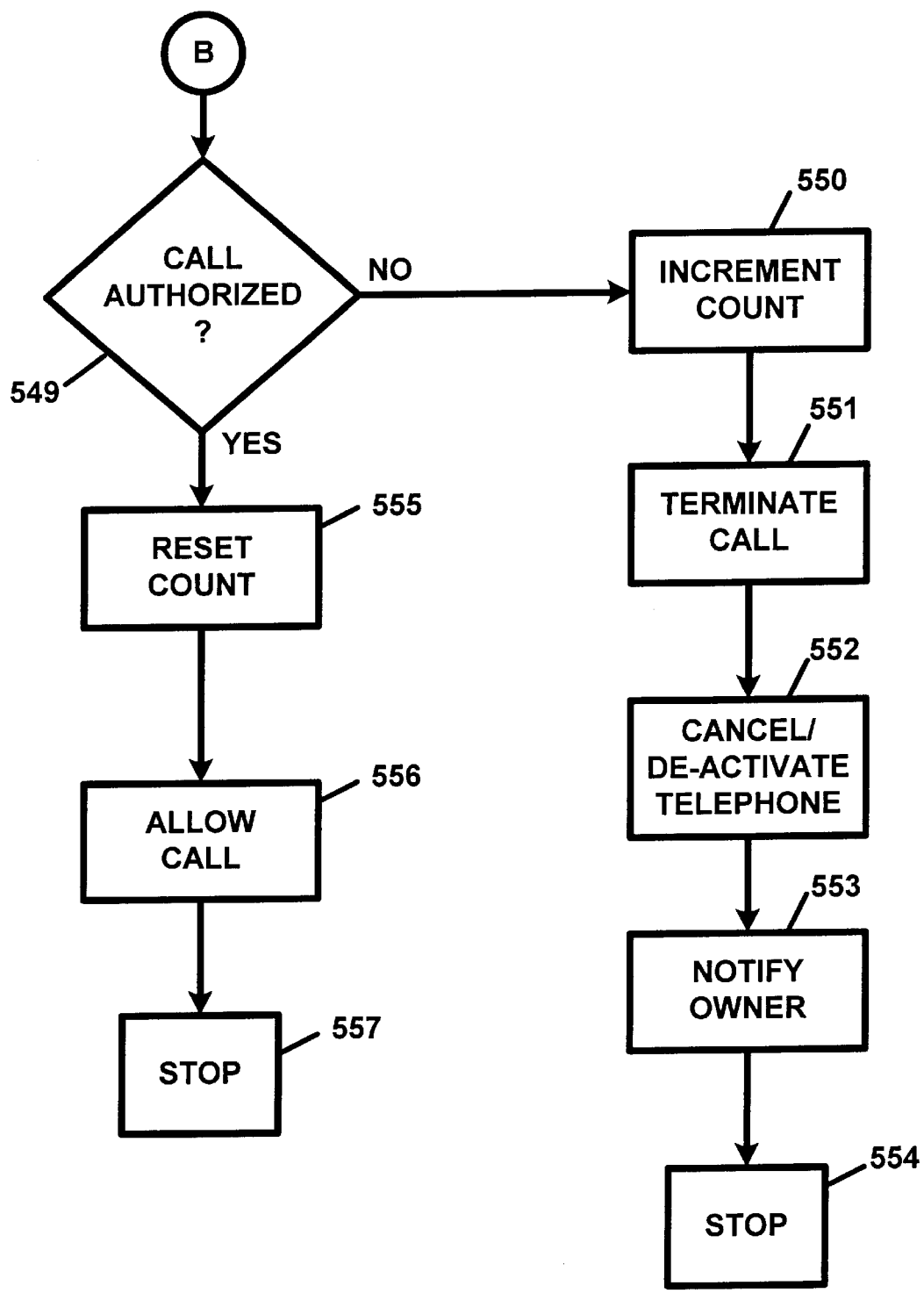

FIGS. 18A, 18B and 18C illustrate the operation of the apparatus 500 of FIG. 16 in flow diagram form. It is important to note, with regards to the apparatus 500 of FIG. 16, that the wireless telephone serves as a transaction device. With reference to FIGS. 18A, 18B and 18C, the operation of the apparatus 500 commences at step 530 when the wireless telephone 502 is utilized to make a wireless telephone call and/or transaction.

The wireless telephone 502 will activate the apparatus 500, at step 531, with the initiation of the wireless telephone call, and/or in any other typical manner, such as when a wireless telephone is utilized to gain access to the telephone network so that the calling connection may be established via the wireless communications network. Upon the making of the wireless telephone call, at step 531, the wireless telephone 502 will transmit data and/or information, which identifies the calling telephone, to the central processing computer which services the particular wireless telephone or wireless telephone network, so that appropriate billing and/or accounting of telephone usage may be noted and/or processed. In the preferred embodiment, the central processing computer for the particular wireless telephone and/or wireless telephone network is the central processing computer 503. At step 532, the central processing computer will receive and store the data and/or information which is transmitted by the wireless telephone 502. At step 533, the central processing computer 503 will process the data and/or information which is received from the wireless telephone 502.

The central processing computer 503 may utilize any of the widely known data processing and/or software routines, which are known to those skilled in that art, in order to process transaction requests and/or authorizations involving the use of the respective wireless telephone(s) and/or wireless communication device and/or wireless telephone number. At step 534, the central processing computer 503 will perform a test in order to determine if the wireless telephone is lost, stolen, cancelled or de-activated. If the wireless telephone is determined to be lost, stolen, cancelled or de-activated, the central processing computer 503 will, at step 535, block the telephone call or terminate the call if it has already been connected. The central processing computer 503 will then, at step 536, cancel and/or de-activate the wireless telephone number or account. The central processing computer 503 will then, at step 537, notify the wireless telephone owner that his or her wireless telephone has been cancelled and/or de-activated. The operation of the apparatus will then cease at step 538.

If, at step 534, the central processing computer 503 determines that the wireless telephone is not lost, stolen, cancelled or de-activated, the central processing computer 503 will, at step 539, transmit a signal and/or data to the communication device 504 which is located at the wireless telephone owner. At step 540, the communication device 504 will receive and display the data and/or information which is transmitted from the central processing computer 503. The displayed information, in the preferred embodiment, will include the number called, the time of the call, the destination of the call and the duration of the call, in real-time. The information will remain displayed during the duration of the call so that the wireless telephone owner will be notified continuously throughout the duration of the call.

At step 541, the central processing computer 503 will await the wireless telephone owner's reply or response. If the wireless telephone owner replies or responds, the reply or response data will also be transmitted to, and received by, the central processing computer 503 at step 541. At step 542, the central processing computer 503 will then determine if the wireless telephone owner's response was made within a pre-defined time period, which is chosen, in the preferred embodiment, to be one (1) minute. If at step 542, it is determined that the wireless telephone owner did not reply or respond within the predefined time limit, the central processing computer will, at step 543, increment the unauthorized transaction count (UNAUTHCT) by one (1).

The central processing computer 503 will then, depending upon pre-defined instructions of the wireless telephone owner, at step 544, either allow the telephone call to continue, such as for a pre-defined duration of one (1) minute, so as to allow for cases wherein an emergency condition exists, or terminate the telephone call immediately. The decision to either allow the telephone call to continue or to terminate the telephone call can be made by the wireless telephone owner and/or by the wireless telephone service provider. Upon the completion of step 544, the central processing computer 503 will then, at step 545, cancel and/or de-activate the wireless telephone. Thereafter, the central processing computer 503 will, at step 546, notify the wireless telephone owner that the wireless telephone number or account has been cancelled and/or de-activated. Upon completion of step 546, the apparatus will cease operation at step 547.

If, at step 542, the wireless telephone owner did respond in time, the central processing computer 503 will process the reply or response data and/or information, at step 548. The central processing computer 503 will then determine, at step 549, if the wireless telephone call is authorized by the wireless telephone owner. If, at step 549, the wireless telephone call is unauthorized, the central processing computer will, at step 550, increment the unauthorized transaction count (UNAUTHCT) by one (1). The central processing computer 503 will then, at step 551, terminate the telephone call immediately. Upon the completion of step 551, the central processing computer 503 will then, at step 552, cancel and/or de-activate the wireless telephone. Thereafter, the central processing computer 503 will, at step 553, notify the wireless telephone owner that the wireless telephone has been cancelled and/or de-activated. Upon completion of step 553, the apparatus will cease operation at step 554.

If, at step 549, the central processing computer 503 identifies the wireless telephone owner's reply or response as being one to authorize the wireless telephone call, the central processing computer 503 will, at step 555, reset the unauthorized transaction count (UNAUTHCT) to zero (0). An unauthorized transaction count (UNAUTHCT) of 0 will signify that any string of unauthorized transactions has now been broken by the wireless telephone owner. The central processing computer 503 will then, at step 556, allow the wireless telephone call to continue uninterrupted. Upon the completion of the wireless telephone call, at step 556, the apparatus 500 will cease operation at step 557.

In instances when the wireless telephone owner is a party to the wireless telephone call and/or transaction, he or she, having the communication device 504 on his or her person, may authorize the call and/or transaction at his or her present location. If the wireless telephone owner has lent out the wireless telephone, he or she may authorize the wireless telephone call and/or transaction from his or her remote location. The wireless telephone owner may also program and/or set the communication device 504 to automatically authorize or disapprove or disallow wireless telephone calls and/or transactions with said selective authorizations being made as to time of day, calling areas, numbers called, and/or call and/or transaction duration. In this regard, the communication device 504 may be programmable so as to receive and analyze the wireless telephone call information and/or data and reply or respond to same automatically and/or with preset or programmed replies and/or responses. The communication device 504 may also be programmable so as to limit the number of wireless telephone calls made from the wireless telephone and/or with the wireless telephone number.

The communication device 504, in the preferred embodiment, is provided with a memory device for storing any number of wireless telephone calls and/or transactions so that the wireless telephone owner may review his or her account activity and/or wireless calls and/or transactions made and/or which have occurred involving his or her wireless telephone. In this manner, the wireless telephone owner may "scroll" through and/or in other ways review account activity. The communication device 504 may also be equipped to service more than one wireless telephone and/or mobile communication device(s).

The apparatus and method of the present invention provides for the real-time notification of wireless and/or mobile telephone and/or wireless communication device usage which enables a wireless telephone and/or wireless communication device owner and/or account owner to monitor, in real-time, activity involving his or her wireless telephone and/or wireless telephone number and/or wireless communication device. The apparatus and method of the present invention also provides a means and a mechanism by which to inform a wireless telephone owner and/or wireless communication device owner that the wireless telephone is lost or stolen, and/or to provide notification to the wireless telephone owner and/or wireless communication device owner that his or her wireless telephone number and/or wireless communication device owner is being utilized in calls and/or transactions, such as when a wireless device or telephone has been illegally "cloned". The wireless telephone owner and/or wireless communication device owner may then report the wireless telephone or wireless communications device lost or stolen and/or cancel and/or de-activate the wireless telephone number and/or account.

The present invention also provides a means and a mechanism by which to monitor the number of wireless telephone calls and/or transactions which are unauthorized by the wireless telephone owner and to determine whether or not to de-activate the wireless telephone and/or the wireless telephone number and/or account. In the above manner, the apparatus and method of the present invention provides an apparatus and a method to prevent and/or to drastically limit fraudulent and/or unauthorized use of, and/or the "cloning" of, wireless telephones and/or wireless communication devices and/or the unauthorized use of wireless telephone numbers.

While the embodiment of the present invention is described above in conjunction with the use of wireless telephones, the present invention of FIG. 18, in alternate embodiments, can be utilized in conjunction with any wireless communication device including personal computers, personal digital assistants, facsimile machines and other wireless communication devices which work in conjunction with a wireless communication network.

Figure 19:
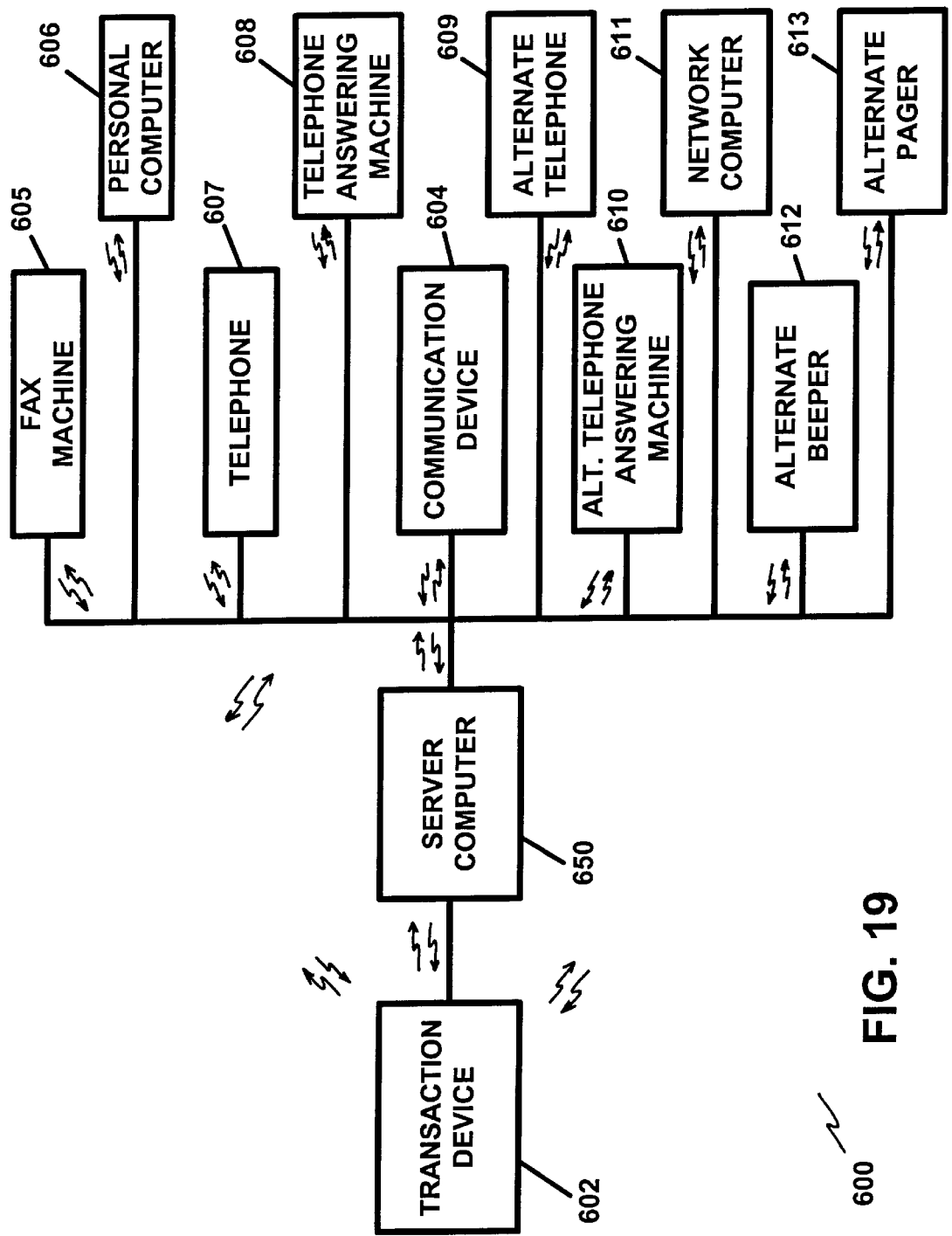
FIG. 19 illustrates yet another alternate embodiment of the present invention wherein the apparatus of the present invention is utilized on, or over, an on-line service, the INTERNET and/or the World Wide Web or other suitable communication network or medium.

FIG. 19 illustrates yet another alternate embodiment of the present invention wherein the apparatus and method of any of the embodiments described herein may be utilized on, or over, an on-line service, the Internet, and/or the World Wide Web, and/or any other suitable communication network or medium. In FIG. 19, the apparatus, which is denoted generally by the reference numeral 600, comprises a transaction device 602, which may be a transaction device or a wireless or cellular telephone or communication device, depending upon the application, a server computer 650, which is a central processing computer for processing data and/or information in an on-line, and/or Internet, and/or World Wide Web, communication environment, network, or medium.

The server computer 650 may be a mainframe computer, a mini-computer, a micro-computer, a server computer, such as those utilized in conjunction with on-line services and/or in a network environment, and/or any other suitable computer or computer system. The server computer 650, in the preferred embodiment, should have associated therewith a suitable receiver(s) or transmitter(s) which may be a fax/modem and/or any other device(s) which are well known to those skilled in the art for providing communications and/or a link with a server computer in such a network environment.

The apparatus of FIG. 19 also comprises a communications device 604 which may comprise a home and/or a personal computer, a laptop or a notebook computer and any one or more of the herein-described personal communications devices so that the individual may access the apparatus 600, and in particular, the server computer 650, at any time and from any location. Basically, the embodiment of FIG. 19 serves to replace the central processing computer of the previously described embodiments with a server computer for utilization on, or over, an on-line service, the Internet, the World Wide Web, and/or any other suitable communications network or medium. The apparatus of FIG. 19 operates and is utilized in the same, in similar and/or an analogous, manner as described herein in conjunction with the previously described embodiments.

Figure 20:
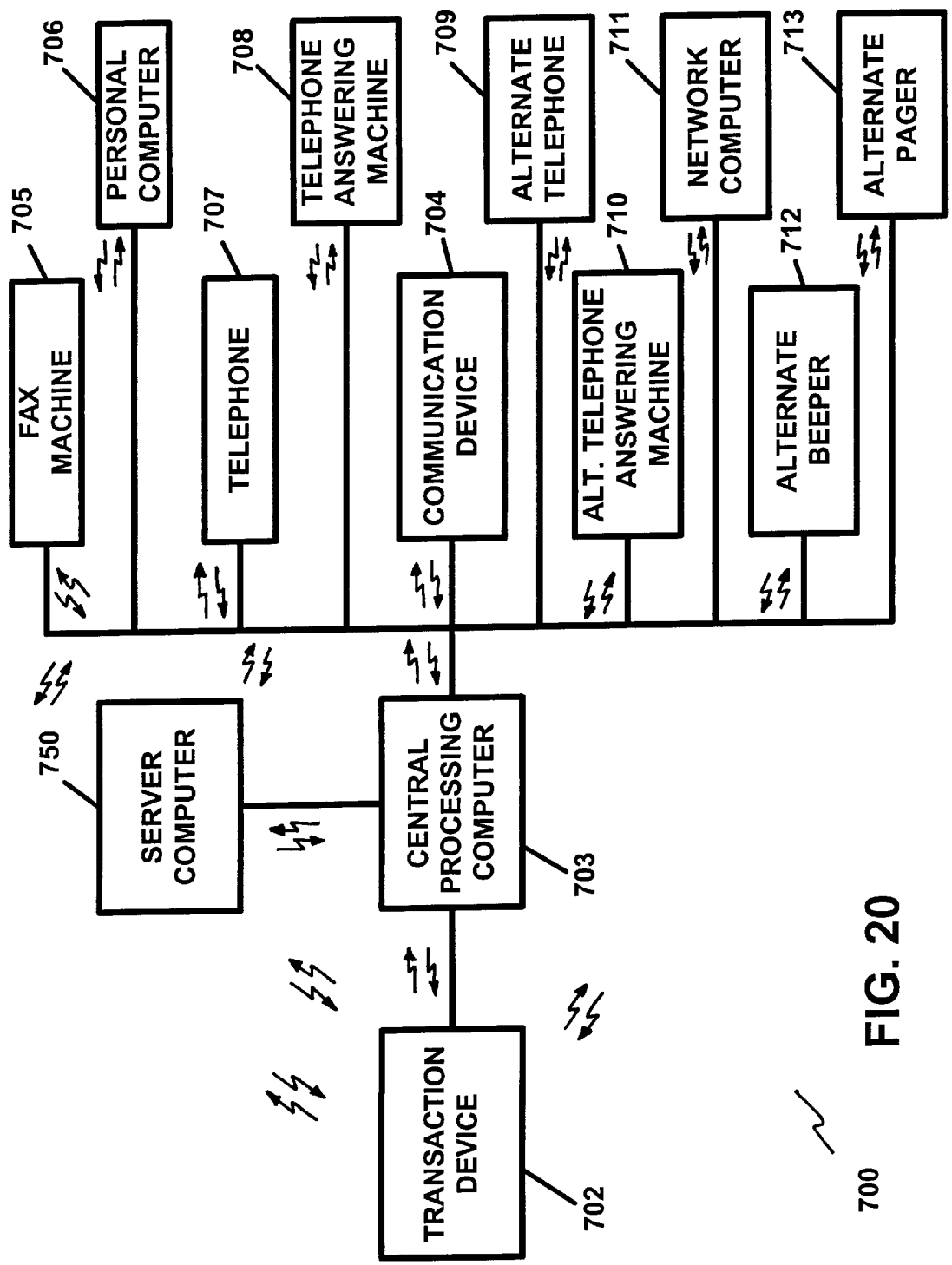
FIG. 20 illustrates yet another alternate embodiment of the present invention which is also utilized in conjunction with an on-line service and/or on, or over, the INTERNET and/or the World Wide Web or the suitable communication network or medium.

FIG. 20 illustrates yet another alternate embodiment of the present invention, wherein the present invention is also utilized in conjunction with an on-line service and/or on, or over, the Internet and/or the World Wide Web, and/or any other suitable communication network or medium. In FIG. 20, the apparatus, which is denoted generally by the reference numeral 700, comprises a transaction device 702, which may be a transaction device and/or a wireless or cellular telephone and/or communications device, depending upon the application.

The apparatus of FIG. 20 also comprises a central processing computer 703 which provides processing and/or control over the apparatus 700 in the manner described above in conjunction with the previously described embodiments. The apparatus 700 also comprises a server computer 750. The central processing computer 703 and/or the server computer 750 may be a mainframe computer, a mini-computer, a micro-computer, a server computer, such as those utilized in conjunction with on-line services and/or in a network environment, and/or any other suitable computer or computer system.

The apparatus 700 of FIG. 20 also comprises a communications device(s) 704 such as those described herein and in conjunction with the apparatus 500 of FIG. 16. The apparatus also comprises a server computer 750 which may either perform parallel operations and/or processing of the data and/or information which is performed and/or processed by the central processing computer 703 and/or may simply receive the data and/or information processed by the central processing computer 703. In any event, the server computer 750 provides the means by which the data and/or information, which is provided by the apparatus, can be accessed and or utilized via an on-line service and/or on, or over, the Internet, and/or the World Wide Web, and/or any other communications network or medium.

The server computer 750 should have associated therewith a suitable receiver(s) or transmitter(s) which may be a fax/modern and/or any other device(s) which are well known to those skilled in the art for providing communications and/or a link with a server computer in such a network environment. The apparatus of FIG. 20 also comprises a communications device 704 which may comprise a home and/or a personal computer, a laptop or a notebook computer, and/or any one or more of the herein described personal communications devices so that the individual may access the apparatus, and in particular, the server computer 750, at any time and from any location. The apparatus of FIG. 20 is utilized and/or operates in the same, a similar and/or an analogous, manner as any of the embodiments described herein.

Applicant hereby incorporates by reference herein all of the methods and/or techniques for providing information and/or data over on-line service and/or on, or over, the Internet, and/or the World Wide Web, and/or any other suitable communication network or medium, along with client/server and/or Web Site technology and methods and/or techniques utilized in conjunction therewith, which are known as of the filing date of the present application. Further, Applicant also hereby incorporates by reference herein those techniques for providing electronic-mail and information transfer, including push technology techniques, which are known as of the filing date of the present application.

In any and/or all of the embodiments described herein, each and every one the components of the apparatus, which include, but which are not limited to, the described transaction devices, wireless telephones, wireless communication devices, cellular telephones and/or other cellular communications devices, central processing computers, server computers, if utilized, and any of the various communications devices, may transmit and/or receive signals and/or data, and/or be capable or transmitting and/or receiving signals and/or data, to and from any and all of the other apparatus components which may be utilized in conjunction therewith, in and for a given embodiment. In this regard, it is important to note, with respect to the embodiments described herein, that each and every component involved in the transmission and/or reception of signals, data and/or information, may include an associated transmitter, receiver and/or suitable communication device.

The communication system or medium should provide for the transmission and/or for the reception of a multitude of remote electrical, electronic, electromagnetic, and/or other suitable signals, over long distances and/or in a mobile and/or a wireless communications environment. Telephone signals and telephone communication devices can be utilized in the present invention as well as personal computers and associated peripheral devices which may be utilized with telecommunications and/or other suitable communication systems and/or mediums.

The apparatus and method of the present invention may operate over any appropriate communications system, network and/or medium and/or other suitable communications systems, including radio signal, optical, satellite, digital, digital satellite, and/or other communications systems. The communications system utilized may operate anywhere in the electromagnetic and/or radio frequency spectrum. As noted above, the present invention may also be utilized in conjunction with a satellite communications system, in which case, the receivers and transmitters which are utilized in conjunction with the apparatus should be satellite communication receivers and transmitters, respectively.

Similarly, the present invention may be utilized in conjunction with cable television communication systems and/or broadband communication systems. The associated receiver(s) may also be a satellite dish receiver(s).

In this regard, the cardholder, account owner or wireless or cellular device or telephone owner may utilize the apparatus and method of the present invention to its fullest capabilities over an on-line service and/or on, or over, the Internet, and/or the World Wide Web, and/or any other suitable communication network or medium. In this manner, the embodiments described herein, and other alternate embodiments, may allow the cardholder, account owner or wireless or cellular device or telephone owner to utilize the apparatus and/or to monitor the operation of the apparatus over the on-line service and/or on, or over, the Internet, and/or the World Wide Web, and/or any other communication network or medium, from any suitable computer or device, and/or from any location.

The system receiver(s) may also be utilized in conjunction with a home and/or a personal computer and/or other personal communications device(s) and/or apparatuses which may be utilized with an associated receiver or equivalent peripheral device(s). The apparatus may also be utilized in conjunction with a computer network such as an on-line service and/or on, or over, the Internet, and/or the World Wide Web, by employing any appropriate server computer and/or an associated Web Site and/or Web Site technology in conjunction with an appropriate communication medium and communication equipment.

In any of the above described embodiments, the present invention may be utilized in conjunction with any suitable communication device(s) and/or communication system(s). In this manner, the present invention may be utilized in conjunction with a telephone, a line-connected and/or a permanent telephone, a touch-tone telephone, a cordless telephone and/or a cellular or mobile telephone, a home and/or a personal computer having associated telecommunication devices or other suitable peripheral device(s), such as a modem and/or a fax/modem, and/or other suitable personal communication devices which can operate over an appropriate communications system, and/or other suitable communications systems and/or mediums, including radio signal, optical, satellite, digital, cable television, broadband and/or other communications systems and/or mediums.

Any suitable communication system and/or medium may be utilized. Personal communication service (PCS) systems and devices, including stationary, portable and/or hand-held devices, may also be utilized. Digital signal communications devices and systems may also be utilized. Televisions, interactive and/or digital televisions, personal communication devices, personal communication services (PCS) devices, personal digital assistants, wireless telephones, wireless communication devices, cellular telephones, digital telephones, display telephones, video telephones, display wireless telephones, wireless communication devices, cellular telephones and electronically equipped watches and/or other devices and/or effects and/or accessories, may also be utilized for performing user interactive control, monitoring, authorization, notification and/or security functions in conjunction with the present invention.

It should be noted that the telephone/telephone beeper or pager system, including two-way pager systems, may be replaced with any other type of transmitter/receiver combination or transceiver, electronic or otherwise, which provides for the transmission and reception of a multitude of remote electrical, electronic, electromagnetic, and/or other suitable signals, over long distances and/or in a mobile and/or a wireless communications environment. As noted above, a personal computer system which may be adapted to such operation, or a personal communication device(s) or personal communication services (PCS) device(s) may also be utilized for, or in, any of the transmitter/receiver system combinations described herein. Two-way pagers and reply pagers may also be utilized for any, or in any, of the transmitter/receiver system combinations described herein.

The communication device(s) utilized in the present invention, as well as the associated transaction device and/or wireless or cellular communications device(s) and/or associated central processing computer may be personal communication services (PCS) devices and/or other suitable communications devices. A television, appropriately equipped to receive and/or to transmit signals may also be utilized. It is also envisioned that digital televisions, interactive televisions, personal communications devices, personal communication services (PCS) devices, personal digital assistants, digital telephones, display telephones, electronically equipped watches, wireless telephones, wireless communication devices, cellular telephones and/or display wireless telephones, wireless communication devices, cellular telephones may also be utilized in conjunction with the present invention.

It is also important to note that the communication device(s), in any of the embodiments described herein may be a home and/or a personal computer having associated therewith an appropriate receiver(s) and transmitter(s) such as, for example, a fax/modem.

It is important to note that the telephone/telephone beeper system, described above, may be replaced with any remote transmitter/receiver system, such as by a remote transmitter, i.e., a television-type remote control unit, which control unit would require a user interface feature and which has the capability to remotely transmit a multitude of signals over long distances to an associated receiver. A two-way pager, a reply pager, or any other appropriate two-way communication device may also be utilized. A home and/or a personal computer, with requisite peripheral devices, a personal communication device and/or a personal communication services (PCS) device may also be utilized. Digital communications devices, interactive televisions and/or digital televisions may also be utilized. It is also envisioned that digital televisions, interactive televisions, personal communications devices, personal communications services (PCS) devices, personal digital assistants, display telephones, video telephones, electronically equipped watches and/or other effects or accessories, wireless telephones, wireless communication devices, cellular telephones, display wireless telephones, wireless communication devices, cellular telephones, may also be utilized.

The apparatus of the present invention may be designed or programmed to telephone an owner, user, operator, occupant, or other authorized central office individual or other authorized individual, at a primary phone number, at an alternate or forwarding phone number and/or at a business phone number, send a beeper or pager message to the individual or central office and/or send a facsimile message, an electronic mail message, a voice mail message and/or an answering service message to, or for, the individual or central office. In this manner, the apparatus may report a theft and/or a malfunction situation to the interested individual(s) by utilizing multiple notification and/or reporting avenues and/or schemes so as to provide and ensure that the interested individual(s) are in fact notified as soon as possible. The multiple notification transmissions may be sequentially and/or simultaneously performed.

The apparatus and method of the present invention may also be programmable for programmed and/or automatic activation, self-activation, programmed and/or automatic operation and/or self-operation. The apparatus and method of the present invention may provide for an immediate, as well as for a deferred, control, monitoring and/or security function, and/or response thereto, so as to provide for the immediate and/or the deferred control, activation, de-activation, programming, monitoring and/or security, etc., of any one or more the herein described credit cards, charge cards, debit cards, currency cards, "smart" cards, electronic currency cards, banking, brokerage, digital cash and/or financial accounts and associated transaction cards, and/or wireless telephones, wireless communication devices, cellular telephones and/or cellular or mobile communications devices, and/or any other suitable application in and for which the present invention may be utilized.

In any of the herein-described embodiments, the communications devices and associated transaction devices and/or cellular communications devices and associated central processing computers, may be devices for receiving, and transmitting, respectively, radio signals, satellite communication signals, telecommunications signals, optical communication signals and/or other signals and/or those signals, including digital signals, which are utilized in conjunction with personal communication devices and/or personal communication services (PCS) devices. The devices utilized should, however, be of the same type and/or operate compatibly with the corresponding transmitters and receivers of the apparatus of the present invention.

The present invention may also be equipped with, and be utilized in conjunction with, hardware and software necessary for providing self-monitoring functions, automatic control and/or responses to occurrences, providing automatic notice of an occurrence and/or a situation to an owner, user and/or authorized individual. In this regard, any and all of the embodiments described above may comprise a monitoring device, a triggering device and/or any other suitable device for detecting an occurrence and/or a transaction which may warrant providing notice to the respective cardholder, account owner and/or wireless or cellular device or telephone owner. In this regard, the apparatus may provide for an appropriate signal, data and/or information transmission to the central processing computer, and/or server computer, if utilized. The signal, data and/or information may be conveyed in the form of a communication transmission, depending upon the communication medium utilized, a telephone call, a voice message, a beeper and/or a pager message, an electronic mail message, a fax transmission, and/or any other mode of communication which may be utilized in conjunction with any of the embodiments described herein.

The present invention, in any of the embodiments described herein, may be designed to be user-friendly. In this regard, the present invention may be menu-driven, and/or its operation may be menu-selected, from audio menus, visual menus, or both audio and visual menus.

While the present invention has been illustrated and described as being utilized in conjunction with providing notice and for obtaining authorizations with regard to transactions involving credit cards, charge cards, debit cards, and/or currency or "smart" cards, banking, digital cash and/or financial accounts, and/or in conjunction with cellular and/or mobile telephones, it is also envisioned that the present invention may be utilized in any similar type of transactional activity, such as purchasing and/or sale activity over an on-line service, the Internet, and/or the World Wide Web and/or in any other type of transaction wherein frequent notice and/or account holder authorization may be utilized to guard against theft and/or fraud and/or unauthorized transactions.

The apparatus of the present invention may be accessed at any time by the respective cardholder, account owner and/or wireless or cellular device or telephone owner and/or wireless or cellular communications device owner so as to obtain information regarding activity on his or her respective account. The respective cardholder, account owner and/or wireless or cellular telephone owner and/or wireless or cellular communications device owner may access the apparatus and, in particular, the central processing computer, and/or the server computer, if utilized, so as to obtain transaction records regarding any transaction, group or string of transactions, transactions by goods and/or service type, transactions by dollar amount, etc.

The respective cardholder, account owner, and/or wireless or cellular telephone owner and/or wireless or cellular communications device owner may also obtain, via the central processing computer, and/or the server computer, if utilized, periodic transaction records showing all transactions for a given week, which may by provided weekly, bi-weekly, monthly, yearly, and/or for any given and/or desired time period and/or interval. The apparatus and, in particular, the central processing computer, and/or the server computer, if utilized, may be designed and/or programmed so as to automatically and/or periodically provide and/or transmit any of the above-described account and/or transaction information to the respective cardholder, account owner and/or wireless or cellular telephone owner and/or wireless or cellular communications device owner, by transmitting same to the respective communications device, which may be any of the devices described herein which are utilized as the communications device.

The apparatus and, in particular, the central processing computer, and/or the server computer, if utilized, may also be designed and or programmed to transmit any of the above-described account information and/or transaction information to any one or all of the respective cardholder's, account owner's, and/or wireless or cellular telephone owner's and/or wireless or cellular communications device owner's facsimile (fax) machine, personal computer, personal digital assistant, telephone, telephone answering machine, alternate telephone, alternate telephone answering machine, network computer, and/or alternate beeper or pager. Such multiple notification transmissions, if utilized, may be performed sequentially and/or simultaneously.

The central processing computer may be linked with a fax machine, personal computer, personal digital assistants, telephone, associated answering machine, alternate telephone and associated answering machine, network computer, and/or alternate beeper or pager via any suitable communication system. The telecommunications link or telephone line or link, which may or may not be a wireless link, depending on the device and/or the circumstances, is utilized in order to link the central processing computer with each of the fax machine, the personal computer, the personal digital assistant, the telephone, the associated answering machine, the alternate telephone, the alternate telephone answering machine, the network computer, and/or the alternate beeper or pager.

In any of the herein-described and/or envisioned embodiments, the respective central processing computer which is utilized may comprise a plurality of computers and/or computer systems. Further, the respective central processing computer may be the processing computer for processing account information, and/or for servicing, and/or monitoring, the respective account(s) activity, and/or the central processing computer may be a separate and/or distinct computer or computer system which is associated with and/or linked with the processing computer.

In any of the herein-described and/or envisioned embodiments, the respective communication device which may be utilized may operate independently of, and/or in conjunction with, a central service and/or a communications service. For example, a beeper or pager may be utilized in conjunction with a corresponding beeper or pager communications service, which communications service may serve to relay signals, data and/or information, to, and from, the beeper or pager, whichever the case may be. The communication device which may be utilized may also be capable of transmitting signals, data and/or information, directly to, and receiving signals, data and/or information, directly from, a component(s) of the apparatus, without the need for a central service and/or a communications service and/or a relay system.

The apparatus and method of the present invention may provide for transmitting signals, data and/or information to the cardholder, account owner and/or wireless or cellular device or telephone owner via transmissions made to, and received at a television, radio, car radio, computer and/or other communication device which receives signals transmitted via any suitable communication system. In this manner, for example, a cardholder, account owner and/or cellular telephone owner may be notified by having signals, data and/or information transmitted to their television, radio, car radio, computer, etc., in such a manner so as to interrupt the normal operation of same, so as to convey the information and/or message to the cardholder, account owner and/or wireless or cellular device or telephone owner, in real-time and/or upon the occurrence of the event triggering or giving rise to same.

In any and/or all of the above described embodiments, the apparatus may be programmed and/or be programmable by the respective cardholder, account owner and/or wireless or cellular device or telephone owner or for his or her account. In conjunction with the use of credit cards, charge cards, debit cards, currency cards, electronic money cards, electronic cash cards and/or digital cash cards, the cardholder may program the central processing computer, and/or the server computer, if utilized, so as to change the credit limits on his or her account, periodically and/or at any desired time. For example, a cardholder having a credit card with a $10,000 dollar credit limit, but who very seldom utilizes his or her card for much more than $500 dollars during a monthly billing period, may program the apparatus and, in particular, the central processing computer, or server computer, if utilized, so as to temporarily reduce his or her credit limit.

If the cardholder should then desire to make a major purchase with his or her credit card of, for example, a purchase in the amount of $8500, the cardholder may, prior to the transaction, reprogram the central processing computer and/or server computer, if utilized, so as to temporarily increase his or her temporary credit limit. The apparatus may then be programmed so that, after the major purchase has been made, the apparatus may revert operation back to the reduced credit limit.

The cardholder may program the central processing computer, and/or the server computer, if utilized, via the communication device, which may be any one or more of the devices described herein. The cardholder may also perform the above-described programming via a touch-tone telephone. In the same manner, the cardholder may program the apparatus so as to limit the types of transactions involving, and/or the goods and/or services which may be purchased with, his or her card, and/or the stores, goods and/or service providers which may be authorized to accept the card, limits on the dollar amounts of transactions pertaining to each authorized vendor, seller and/or service provider, daily spending limits, the vendors, sellers, and/or service providers with which the card may be utilized, the geographical area or location within which the card may be utilized, and/or authorized times for card usage (i.e. specific days, dates, times of day, times of month, year, etc.), and/or any other limitations and/or restrictions regarding amount of transaction, parties involved, geographical area, and or times of allowed usage. In a similar manner, the cardholder may similarly program the apparatus as described above in conjunction with the use of any of the herein-described cards.

In a similar manner, a cardholder of an electronic cash card, currency card, and/or "smart" card may program the apparatus so as to limit the types of transactions involving, and/or the goods and/or services which may be purchased with, his or her card, and/or the stores or service providers which may be authorized to accept the card, limits on the dollar amounts of transactions pertaining to each authorized vendor, seller and/or service provider, daily spending limits, the vendors, sellers, and/or service providers with which the card may be utilized, the geographical area or location within which the card may be utilized, and/or authorized times for card usage (i.e. specific days, dates, times of day, times of month, year, etc.), and/or any other limitations and/or restrictions regarding amount of transaction, parties involved, geographical area, and or times of allowed usage.

In the case of financial accounts, brokerage accounts, savings accounts, checking accounts, and/or automated teller machine accounts, the account owner may program the apparatus and, in particular, the central processing computer, and/or the server computer, if utilized, so as to limit the amount of any one transaction or transactions, individuals who may make the transactions, proof of identity of which the types of proof may be specified, specific banks, financial and/or brokerage institutions authorized to accept and/or perform transactions for the account, the nature of the transactions, geographical areas and/or location within which banks, financial and brokerage institutions which may be authorized to accept and/or perform transactions with the account, specific purchases and/or trades which can be made in conjunction with the account, specific securities which may be purchased and/or traded in conjunction with the account, specific times of day, specific days, dates and/or time of the month in, or on, which transactions may be authorized, limits of charge-backs, returned item amount withdrawals, maintenance and/or other fee charge withdrawals, etc. and/or authorized times for account usage (i.e. specific days, dates, times of day, times of month, year, etc.), and/or any other limitations and/or restrictions regarding amount of transaction, parties involved, securities involved, geographical area, and or times of allowed usage.

With regards to any of the cards and/or accounts described herein, such as, for example, automated teller machine accounts, it is also possible to specify and programmably change personal identification numbers and/or any other access code(s) and provide for various personal identification numbers and/or access codes for different locations, different automated teller machines, different days, different times and/or different transaction amounts.

In the cases of wireless telephones, wireless communication devices, cellular telephones and/or cellular communications devices, the wireless or cellular device or telephone owner and/or communication device owner may program the apparatus and, in particular, the central processing computer, and/or the server computer, if utilized, so as to limit the phone numbers which may be called, and/or the numbers from which incoming calls may be accepted and/or received, the geographical areas and/or locations which may be called and/or accessed or from which calls may be received, the times of day, specific days, dates, times of month or year, during which the wireless or cellular device or telephone and/or communication device may be utilized, specific transactions which may be allowed, specific phone numbers which may be called, specific time durations for a transaction and/or phone call and/or any authorized times for wireless or cellular device or telephone and/or wireless or cellular communication device usage (i.e. specific days, dates, times of day, times of month, year, etc.), and/or any other limitations and/or restrictions, regarding amount and type of transaction, parties involved, geographical area, and or times of allowed usage.

The present invention may also be utilized so as to provide financial transaction and/or wireless communication device authorization, notification and/or security for any number and/or types of accounts, including credit card accounts, charge card accounts, debit card accounts, currency card accounts, or "smart" card accounts, electronic money or electronic cash accounts and/or other transaction card accounts, financial accounts, brokerage accounts, savings accounts, checking accounts, automated teller machine accounts, wireless or cellular device or telephone accounts and/or wireless or cellular communication device accounts. In this manner, the apparatus may comprise a communication device or communications devices which may receive and/or transmit signals, data and/or information, for any number and/or types of the above accounts, and/or devices, and/or for each of the respective accounts and/or devices utilized, from and to the respective central processing computer and/or central processing computers for the respective accounts and/or devices. In this manner, an individual may utilize a single communication device so as to monitor all of his or her accounts and/or devices and/or types of accounts.

The apparatus and method of the present invention provides for the real-time notification of financial transactions involving credit cards, charge cards, debit cards, currency cards or "smart" cards, electronic money cards, electronic cash cards and/or digital cash cards, which enables a cardholder to monitor, in real-time, activity involving his or her card(s) and the corresponding accounts. The apparatus and method of the present invention also provides a means and a mechanism by which to inform a cardholder that his or her card(s) are lost, stolen, or is being utilized in an unauthorized manner and provides an indication to the cardholder of when and where his or her card(s) is being utilized in transactions. The cardholder may then report the card lost or stolen and/or cancel and/or de-activate the card. The apparatus and method of the present invention provides the same, and/or analogous, features and/or functions for banking, financial, brokerage, electronic and/or digital cash accounts and/or for wireless or cellular device or telephone accounts.

While the communications device(s) described above are described, in each of the respective embodiments, as being utilized for specific uses (i.e. credit and other cards transactions, banking, financial, brokerage, electronic and/or digital cash transactions, and/or wireless or cellular device or telephone transactions, the communication device(s) may also be adapted and/or programmed for use in all of these aforementioned transactions so that an individual may utilize a single communication device for all of the above described and/or envisioned transaction types.

It is envisioned that the apparatus and method of the present invention may be utilized in conjunction with other apparatuses and methods in the prior art, and that the present invention may be incorporated with these known apparatuses and methods so as to improve upon them and so as to further define additional applications for the present invention.

Applicant hereby incorporates by reference herein the following United States patents: U.S. Pat. No. 5,173,594 which teaches a system for printing personalized charge-card service receipts at remote locations; U.S. Pat. No. 5,479,510 which teaches an automated data card payment verification method; U.S. Pat. No. 5,473,667 which teaches a paging system with third party authorization; U.S. Pat. No. 3,723,655 which teaches a credit authorization terminal; U.S. Pat. No. 5,485,510 which teaches a secure credit/debit card authorization; U.S. Pat. No. 5,406,619 which teaches a universal authentication device for use over telephone lines; U.S. Pat. No. 5,444,616 which teaches financial transaction systems and methods utilizing a multireader transaction terminal; U.S. Pat. No. 5,513,250 which teaches telephone based credit card protection; U.S. Pat. No. 4,485,300 which teaches a loss control system; U.S. Pat. No. 4,758,714 which teaches a point-of-sale mechanism; U.S. Pat. No. 4,947,027 which teaches a system for identifying authorized use of credit cards; U.S. Pat. No. 5,357,563 which teaches a data card terminal for receiving authorizations from remote locations; U.S. Pat. No. 5,444,763 which teaches a translation and connection device for radio frequency point of sale transaction system; U.S. Pat. No. 5,243,645 which teaches an automatic system for forwarding of calls; U.S. Pat. No. 3,938,090 which teaches a terminal apparatus; U.S. Pat. No. 5,642,419 which teaches a method for acquiring and revalidating an electronic credential; U.S. Pat. No. 5,621,797 which teaches an electronic ticket presentation and transfer method; U.S. Pat. No. 5,557,518 which teaches trusted agents for open electronic commerce; U.S. Pat. No. 5,455,407 which teaches an electronic-monetary system; U.S. Pat. No. 5,453,601 which teaches an electronic-monetary system; U.S. Pat. No. 5,511,121 which teaches efficient electronic money; U.S. Pat. No. 5,224,162 which teaches an electronic cash system; U.S. Pat. No. 4,977,595 which teaches a method and apparatus for implementing electronic cash; U.S. Pat. No. 5,623,547 which teaches a value transfer system; U.S. Pat. No. 5,438,184 which teaches a method and apparatus for electronic cash transactions; U.S. Pat. No. 5,534,683 which teaches a system for conducting transactions with a multifunctional card having an electronic purse; U.S. Pat. No. 5,521,362 which teaches an electronic purse card having multiple storage memories to prevent fraudulent usage and method therefor; U.S. Pat. No. 5,221,838 which teaches an electronic wallet; U.S. Pat. No. 5,030,806 which teaches a transaction system of the electronic purse type; U.S. Pat. No. 4,992,646 which teaches a transaction system of the electronic purse type; and U.S. Pat. No. 4,877,950 which teaches an electronic purse device.

While the present invention has been described and illustrated in various preferred and alternate embodiments, such descriptions are merely illustrative of the present invention and are not to be construed to be limitations thereof. In this regard, the present invention encompasses any and all modifications, variations and/or alternate embodiments with the scope of the present invention being limited only by the claims which follow.

What is claimed is:

1. An apparatus for providing account security, comprising:
   a receiver for receiving one of a limitation and a restriction on usage of an electronic money account, wherein said one of a limitation and a restriction are received from an account holder;
   a memory device for storing said one of a limitation and a restriction; and
   a processor for processing a transaction on the electronic money account in conjunction with said one of a limitation and a restriction,
   wherein said processor generates a first signal, and further wherein said first signal contains information for one of approving and disapproving the transaction.

2. The apparatus of claim 1, wherein said one of a limitation and a restriction are received from the account holder in real-time.

3. The apparatus of claim 1, further comprising:
   a transmitter for transmitting a notification signal to a communication device associated with the account holder, wherein the communication device is one of a device for receiving said notification signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

4. The apparatus of claim 1, wherein said transaction involves at least one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

5. The apparatus of claim 1, wherein said first signal contains information regarding one of transaction type, type of one of good, service, security, stock, bond, and derivative instrument, involved in the transaction, transaction amount, location of transaction, time of transaction, and one of an individual and an entity involved in the transaction.

6. The apparatus of claim 1, further comprising:
   means for counting a number of unauthorized transactions which occur on the account; and
   means for one of canceling the transaction and de-activating the account.

7. The apparatus of claim 1, wherein said one of a limitation and a restriction is at least one of a limitation and a restriction involving at least one of a type of transaction, one of an individual, an entity, and an institution, authorized to perform a transaction on the account, a financial institution authorized to perform a transaction on the account, type of one of good, service, security, stock, bond, and derivative instrument, authorized to be involved in the transaction, transaction amount limit, account daily spending limit, authorized geographic location for account transaction, authorized transaction time, and one of a temporary and a permanent one of a limitation and a restriction on account usage.

8. The apparatus of claim 1, further comprising:
   a receiver for receiving a reply signal, wherein said reply signal contains information for one of approving and disapproving the transaction.

9. A method for providing account security, comprising:
   receiving one of a limitation and a restriction on usage of an electronic money account, wherein said one of a limitation and a restriction are received from an account holder;
   storing said one of a limitation and a restriction;
   processing a transaction on the electronic money account in conjunction with said one of a limitation and a restriction; and
   generating a first signal, wherein said first signal contains information for one of approving and disapproving the transaction.

10. The method of claim 9, wherein said one of a limitation and a restriction are received from the account holder in real-time.

11. An apparatus for providing account security, comprising:
    a receiver for receiving one of a limitation and a restriction on usage of a brokerage account, wherein said one of a limitation and a restriction are received from an account holder in real-time;
    a memory device for storing said one of a limitation and a restriction; and
    a processor for processing a transaction on the brokerage account in conjunction with said one of a limitation and a restriction,
    wherein said processor generates a first signal, and further wherein said first signal contains information for one of approving and disapproving the transaction.

12. The apparatus of claim 11, further comprising:
    a transmitter for transmitting a notification signal to a communication device associated with the account holder, wherein the communication device is one of a device for receiving said notification signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

13. The apparatus of claim 11, wherein said transaction involves at least one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

14. The apparatus of claim 11, wherein said first signal contains information regarding one of transaction type, type of one of good, service, security, stock, bond, and derivative instrument, involved in the transaction, transaction amount, location of transaction, time of transaction, and one of an individual and an entity involved in the transaction.

15. The apparatus of claim 11, further comprising:

means for counting a number of unauthorized transactions which occur on the account; and means for one of canceling the transaction and de-activating the account.

16. The apparatus of claim 11, wherein said one of a limitation and a restriction is at least one of a limitation and a restriction involving at least one of a type of transaction, one of an individual, an entity, and an institution, authorized to perform a transaction on the account, a financial institution authorized to one of perform a transaction on the account, type of one of good, service, security, stock, bond, and derivative instrument, authorized to be involved in the transaction, transaction amount limit, account daily spending limit, authorized geographic location for account transaction, authorized transaction time, and one of a temporary and a permanent one of a restriction and a limitation on account usage.

17. The apparatus of claim 11, further comprising:

a receiver for receiving a reply signal, wherein said reply signal contains information for one of approving and disapproving the transaction.

18. A method for providing account security, comprising:

receiving one of a limitation and a restriction on usage of a brokerage account, wherein said one of a limitation and a restriction are received from an account holder in real-time;

storing said one of a limitation and a restriction;

processing a transaction on the brokerage account in conjunction with said one of a limitation and a restriction; and generating a first signal, wherein said first signal contains information for one of approving and disapproving the transaction.

19. An apparatus for providing account security, comprising:

a processor for processing a first signal, wherein said first signal contains information corresponding to a transaction occurring on an electronic money account, and further wherein said processor one of generates and transmits a second signal, wherein said second signal contains information for providing a notification of the transaction; and a transmitter for transmitting said second signal one of to the account holder and to a communication device associated with the account holder, wherein said second signal provides notification of the transaction.

20. The apparatus of claim 19, further comprising:

a receiver for receiving said first signal.

21. The apparatus of claim 19, further comprising:

an input device for inputting said first signal into said apparatus.

22. The apparatus of claim 19, further comprising:

a communication device for receiving said second signal, wherein said communication device is one of a device for receiving said second signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

23. The apparatus of claim 19, wherein said transaction involves one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

24. The apparatus of claim 19, wherein said first signal contains information regarding one of transaction type, type of one of good, service, security, stock, bond, and derivative instrument, authorized to be involved in the transaction, transaction amount, location of transaction, time of transaction, and one of an individual and an entity involved in the transaction.

25. The apparatus of claim 19, further comprising:

means for counting a number of unauthorized transactions which occur on the account; and means for one of canceling the transaction and de-activating the account.

26. The apparatus of claim 19, wherein said processor processes said first signal in conjunction with at least one of type of transaction, type of one of good, service, security, stock, bond, and derivative instrument, authorized to be involved in the transaction, a financial institution authorized to perform a transaction on the account, transaction amount limit, account daily spending limit, authorized geographic location for account transaction, authorized transaction time, and one of a temporary and a permanent one of a restriction and a limitation on account usage.

27. The apparatus of claim 19, further comprising:

a receiver for receiving a reply signal from one of the account holder and an entity authorized to approve the transaction, wherein said reply signal contains information for one of approving and disapproving the transaction.

28. The apparatus of claim 19, wherein said communication device comprises:

a display device for displaying information corresponding to the transaction.

29. The apparatus of claim 22, wherein said communication device one of at least one of generates and transmits a third signal for one of approving and disapproving the transaction, is programmed for automatically at least one of generating and transmitting said third signal in response to said first signal, is programmed to automatically respond to said first signal with one of a preprogrammed and a pre-set response, and is programmed for one of approving and disapproving the transaction according to one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, authorized transaction time, and one of a temporary and a permanent one of a limitation and a restriction on account usage.

30. The apparatus of claim 22, wherein at least one of said apparatus and said communication device further comprises:
a memory device for storing one of an account usage limitation and an account usage restriction for one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, and authorized transaction time period.

31. A method for providing account security, comprising:
processing a first signal, wherein said first signal contains information corresponding to a transaction occurring on an electronic money account;
one of generating and transmitting a second signal, wherein said second signal contains information for providing a notification of the transaction; and
transmitting said second signal one of to the account holder and to a communication device associated with the account holder, wherein said second signal provides notification of the transaction.

32. An apparatus for providing account security, comprising:
a processor for processing a first signal, wherein said first signal contains information corresponding to a transaction occurring on a brokerage account, and further wherein said processor one of generates and transmits a second signal, wherein said second signal contains information for providing a notification of the transaction; and
a transmitter for transmitting said second signal one of to the account holder and to a communication device associated with the account holder, wherein said second signal provides notification of the transaction, and further wherein said second signal is transmitted over a communication network directly one of to the account holder and to the communication device associated with the account holder.

33. The apparatus of claim 32, further comprising:
a receiver for receiving said first signal.

34. The apparatus of claim 32, further comprising:
an input device for inputting said first signal into said apparatus.

35. The apparatus of claim 32, further comprising:
a communication device for receiving said second signal, wherein said communication device is one of a device for receiving said second signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

36. The apparatus of claim 32, wherein said transaction involves one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

37. The apparatus of claim 32, wherein said first signal contains information regarding one of transaction type, type of one of good, service, security, stock, bond, and derivative instrument, authorized to be involved in the transaction, transaction amount, location of transaction, time of transaction, and one of an individual and an entity involved in the transaction.

38. The apparatus of claim 32, further comprising:
means for counting a number of unauthorized transactions which occur on the account; and
means for one of canceling the transaction and de-activating the account.

39. The apparatus of claim 32, wherein said processor processes said first signal in conjunction with at least one of type of transaction, type of one of good, service, security, stock, bond, and derivative instrument, authorized to be involved in the transaction, a financial institution authorized to perform a transaction on the account, transaction amount limit, account daily spending limit, authorized geographic location for account transaction, authorized transaction time, and one of a temporary and a permanent one of a limitation and a restriction on account usage.

40. The apparatus of claim 32, further comprising:
a receiver for receiving a reply signal from one of the account holder and an entity authorized to approve the transaction, wherein said reply signal contains information for one of approving and disapproving the transaction.

41. The apparatus of claim 32, wherein said communication device comprises:
a display device for displaying information corresponding to the transaction.

42. The apparatus of claim 35, wherein said communication device one of at least one of generates and transmits a third signal for one of approving and disapproving the transaction, is programmed for automatically at least one of generating and transmitting said third signal in response to said first signal, is programmed to automatically respond to said first signal with one of a preprogrammed and a pre-set response, and is programmed for one of approving and disapproving the transaction according to one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, authorized transaction time, and one of a temporary and a permanent one of a limitation and a restriction on account usage.

43. The apparatus of claim 35, wherein at least one of said apparatus and said communication device further comprises:
a memory device for storing one of an account usage limitation and an account usage restriction for one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, and authorized transaction time period.

44. A method for providing account security, comprising:

processing a first signal, wherein said first signal contains information corresponding to a transaction occurring on a brokerage account;

one of generating and transmitting a second signal, wherein said second signal contains information for providing a notification of the transaction; and transmitting said second signal one of to the account holder and to a communication device associated with the account holder, wherein said second signal provides notification of the transaction, and further wherein said second signal is transmitted over a communication network directly one of to the account holder and to the communication device associated with the account holder.

45. An apparatus for providing account security, comprising:

means for receiving one of a limitation and a restriction on usage of an electronic money account, wherein said one of a limitation and a restriction are received from an account holder;

means for storing said one of a limitation and a restriction; and means for processing a transaction on the electronic money account in conjunction with said one of a limitation and a restriction, wherein said processing means generates a first signal, and further wherein said first signal contains information for one of approving and disapproving the transaction.

46. An apparatus for providing account security, comprising:

means for receiving one of a limitation and a restriction on usage of a brokerage account, wherein said one of a limitation and a restriction are received from an account holder in real-time;

means for storing said one of a limitation and a restriction; and means for processing a transaction on the brokerage account in conjunction with said one of a limitation and a restriction, wherein said processing means generates a first signal, and further wherein said first signal contains information for one of approving and disapproving the transaction.

47. An apparatus for providing account security, comprising:

means for processing a first signal, wherein said first signal contains information corresponding to a transaction occurring on an electronic money account, and further wherein said processing means one of generates and transmits a second signal, wherein said second signal contains information for providing a notification of the transaction; and means for transmitting said second signal one of to the account holder and to a communication device associated with the account holder, wherein said second signal provides notification of the transaction.

48. An apparatus for providing account security, comprising:

means for processing a first signal, wherein said first signal contains information corresponding to a transaction occurring on a brokerage account, and further wherein said processing means one of generates and transmits a second signal, wherein said second signal contains information for providing a notification of the transaction; and means for transmitting said second signal one of to the account holder and to a communication device associated with the account holder, wherein said second signal provides notification of the transaction, and further wherein said second signal is transmitted over a communication network directly one of to the account holder and to the communication device associated with the account holder.

49. The apparatus of claim 1, wherein transaction one of data and information is stored in said memory device, and further wherein said processor processes said transaction one of data and information and generates a transaction record, wherein said transaction record contains information regarding transaction activity occurring on the account during one of a time period and a time interval, and further wherein said apparatus further comprises:

a transmitter for transmitting said transaction record one of to the account holder and to a communication device associated with the account holder.

50. The apparatus of claim 11, wherein transaction one of data and information is stored in said memory device, and further wherein said processor processes said transaction one of data and information and generates a transaction record, wherein said transaction record contains information regarding transaction activity occurring on the account during one of a time period and a time interval, and further wherein said apparatus further comprises:

a transmitter for transmitting said transaction record one of to the account holder and to a communication device associated with the account holder.

51. The apparatus of claim 19, further comprising:

a memory device for storing transaction one of data and information, wherein said processor processes said transaction one of data and information and generates a transaction record, wherein said transaction record contains information regarding transaction activity occurring on the account during one of a time period and a time interval, and further wherein said transmitter transmits said transaction record to one of the account holder and a communication device associated with the account holder.

52. The apparatus of claim 32, further comprising:

a memory device for storing transaction one of data and information, wherein said processor processes said transaction one of data and information and generates a transaction record, wherein said transaction record contains information regarding transaction activity occurring on the account during one of a time period and a time interval, and further wherein said transmitter transmits said transaction record to one of the account holder and the communication device associated with the account holder.

53. The method of claim 9, further comprising:

transmitting a notification signal to a communication device associated with the account holder, wherein the communication device is one of a device for receiving said notification signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

54. The method of claim 9, wherein said transaction involves at least one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

55. The method of claim 9, wherein said first signal contains information regarding one of transaction type, type of one of good, service, security, stock, bond, and derivative instrument, involved in the transaction, transaction amount, location of transaction, time of transaction, and one of an individual and an entity involved in the transaction.

56. The method of claim 9, further comprising:
counting a number of unauthorized transactions which occur on the account; and
one of canceling the transaction and de-activating the account.

57. The method of claim 9, wherein said one of a limitation and a restriction is at least one of a limitation and a restriction involving at least one of a type of transaction, one of an individual, an entity, and an institution, authorized to perform a transaction on the account, a financial institution authorized to perform a transaction on the account, type of one of good, service, security, stock, bond, and derivative instrument, authorized to be involved in the transaction, transaction amount limit, account daily spending limit, authorized geographic location for account transaction, authorized transaction time, and one of a temporary and a permanent one of a limitation and a restriction on account usage.

58. The method of claim 53, further comprising:
receiving a reply signal, wherein said reply signal contains information for one of approving and disapproving the transaction.

59. The method of claim 18, further comprising:
transmitting a notification signal to a communication device associated with the account holder, wherein the communication device is one of a device for receiving said notification signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

60. The method of claim 18, wherein said transaction involves at least one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

61. The method of claim 18, wherein said first signal contains information regarding one of transaction type, type of one of good, service, security, stock, bond, and derivative instrument, involved in the transaction, transaction amount, location of transaction, time of transaction, and one of an individual and an entity involved in the transaction.

62. The method of claim 18, further comprising:
counting a number of unauthorized transactions which occur on the account; and
one of canceling the transaction and de-activating the account.

63. The method of claim 18, wherein said one of a limitation and a restriction is at least one of a limitation and a restriction involving at least one of a type of transaction, one of an individual, an entity, and an institution, authorized to perform a transaction on the account, a financial institution authorized to one of perform a transaction on the account, type of one of good, service, security, stock, bond, and derivative instrument, authorized to be involved in the transaction, transaction amount limit, account daily spending limit, authorized geographic location for account transaction, authorized transaction time, and one of a temporary and a permanent one of a restriction and a limitation on account usage.

64. The method of claim 59, further comprising:
receiving a reply signal, wherein said reply signal contains information for one of approving and disapproving the transaction.

65. The method of claim 31, further comprising:
receiving said second signal with the communication device, wherein the communication device is one of a device for receiving said second signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

66. The method of claim 31, wherein said transaction involves one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

67. The method of claim 31, wherein said first signal contains information regarding one of transaction type, type of one of good, service, security, stock, bond, and derivative instrument, authorized to be involved in the transaction, transaction amount, location of transaction, time of transaction, and one of an individual and an entity involved in the transaction.

68. The method of claim 31, further comprising:

counting a number of unauthorized transactions which occur on the account; and one of canceling the transaction and de-activating the account.

69. The method of claim 31, further comprising:

processing said first signal in conjunction with at least one of type of transaction, type of one of good, service, security, stock, bond, and derivative instrument, authorized to be involved in the transaction, a financial institution authorized to perform a transaction on the account, transaction amount limit, account daily spending limit, authorized geographic location for account transaction, authorized transaction time, and one of a temporary and a permanent one of a restriction and a limitation on account usage.

70. The method of claim 31, further comprising:

receiving a reply signal from one of the account holder and an entity authorized to approve the transaction, wherein said reply signal contains information for one of approving and disapproving the transaction.

71. The method of claim 31, further comprising:

displaying information corresponding to the transaction.

72. The method of claim 31, further comprising:

one of generating and transmitting a third signal for one of approving and disapproving the transaction according to one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, authorized transaction time, and one of a temporary and a permanent one of a limitation and a restriction on account usage.

73. The method of claim 31, further comprising:

storing one of an account usage limitation and an account usage restriction for one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, and authorized transaction time period.

74. The method of claim 44, further comprising:

receiving said second signal with the communication device, wherein the communication device is one of a device for receiving said second signal, a telephone, a beeper, a pager, a two-way pager, a reply pager, a home computer, a personal computer, a personal communication device, a personal communication services device, a digital communication device, a television, an interactive television, a digital television, a personal digital assistant, a display telephone, a radio, a car radio, a video telephone, a watch, a cellular telephone, a wireless telephone, a mobile telephone, a display cellular telephone, and a facsimile machine.

75. The method of claim 44, wherein said transaction involves one of a good, a service, cash, a cash instrument, a cash derivative, a security, a stock, a bond, a derivative instrument, a stock derivative, a bond derivative, a commodity, a mutual fund share, a future, an option, an index fund, a future derivative, an option derivative, an index fund derivative, electronic money, electronic cash, electronic currency, digital money, digital cash, digital currency, an electronic money account, a digital money account, an electronic money checking account, an electronic money savings account, an automated teller machine account, a clearing transaction, a check clearing transaction, an account charging transaction, and a charge-back transaction.

76. The method of claim 44, wherein said first signal contains information regarding one of transaction type, type of one of good, service, security, stock, bond, and derivative instrument, authorized to be involved in the transaction, transaction amount, location of transaction, time of transaction, and one of an individual and an entity involved in the transaction.

77. The method of claim 44, further comprising:

counting a number of unauthorized transactions which occur on the account; and one of canceling the transaction and de-activating the account.

78. The method of claim 44, further comprising:

processing said first signal in conjunction with at least one of type of transaction, type of one of good, service, security, stock, bond, and derivative instrument, authorized to be involved in the transaction, a financial institution authorized to perform a transaction on the account, transaction amount limit, account daily spending limit, authorized geographic location for account transaction, authorized transaction time, and one of a temporary and a permanent one of a limitation and a restriction on account usage.

79. The method of claim 44, further comprising:

receiving a reply signal from one of the account holder and an entity authorized to approve the transaction, wherein said reply signal contains information for one of approving and disapproving the transaction.

80. The method of claim 44, further comprising:

displaying information corresponding to the transaction.

81. The apparatus of claim 44, further comprising:

one of generating and transmitting a third signal for one of approving and disapproving the transaction according to one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, authorized transaction time, and one of a temporary and a permanent one of a limitation and a restriction on account usage.

82. The method of claim 44, further comprising:

storing one of an account usage limitation and an account usage restriction for one of type of transaction, type of one of good, service, security, stock, bond, and derivative instrument, authorized to be involved in the transaction, one of a goods provider, a service provider, a bank, and a financial institution, authorized to perform a transaction on the account, transaction amount limit, account daily spending limit, authorized geographic location for account transaction, and authorized transaction time period.

83. The method of claim 9, further comprising:

storing transaction one of data and information;

processing said transaction one of data and information;

generating a transaction record, wherein said transaction record contains information regarding transaction activity occurring on the account during one of a time period and a time interval; and transmitting said transaction record one of to the account holder and to a communication device associated with the account holder.

84. The method of claim 18, further comprising:

storing transaction one of data and information;

processing said transaction one of data and information;

generating a transaction record, wherein said transaction record contains information regarding transaction activity occurring on the account during one of a time period and a time interval; and transmitting said transaction record one of to the account holder and to a communication device associated with the account holder.

85. The method of claim 31, further comprising:

storing transaction one of data and information;

processing said transaction one of data and information;

generating a transaction record, wherein said transaction record contains information regarding transaction activity occurring on the account during one of a time period and a time interval; and transmitting said transaction record one of to the account holder and to the communication device associated with the account holder.

86. The method of claim 44, further comprising:

storing transaction one of data and information;

processing said transaction one of data and information;

generating a transaction record, wherein said transaction record contains information regarding transaction activity occurring on the account during one of a time period and a time interval; and transmitting said transaction record one of to the account holder and to the communication device associated with the account holder.

\* \* \* \* \*